US012712623B2

(12) United States Patent
Mouser et al.

(10) Patent No.: US 12,712,623 B2
(45) Date of Patent: Aug. 18, 2026

(54) REPEATER WITH CARRIER-SPECIFIC INFORMATION

(71) Applicant: Wilson Electronics, LLC, St. George, UT (US)

(72) Inventors: Michael James Mouser, Wylie, TX (US); Stephen Todd Fariss, Frisco, TX (US); Dale Robert Anderson, Colleyville, TX (US); Christopher Ken Ashworth, Toquerville, UT (US); Ilesh V. Patel, Euless, TX (US); Glen Raggio, Mesquite, TX (US); William Gerald Sarver, Plano, TX (US); Philip Anthony Weaver, Plano, TX (US); Douglas Edward Bohls, Allen, TX (US)

(73) Assignee: Wilson Electronics, LLC, St. George, UT (US)

( * ) Notice: Subject to any disclaimer, the term of this patent is extended or adjusted under 35 U.S.C. 154(b) by 285 days.

(21) Appl. No.: 18/501,694

(22) Filed: Nov. 3, 2023

(65) Prior Publication Data

US 2024/0154685 A1 May 9, 2024

Related U.S. Application Data

(60) Provisional application No. 63/422,778, filed on Nov. 4, 2022.

(51) Int. Cl.

| | |
|---|---|
| ***H04B 7/155*** | (2006.01) |
| ***H04L 5/14*** | (2006.01) |
| ***H04W 8/18*** | (2009.01) |

(52) U.S. Cl.
CPC .......... *H04B 7/15507* (2013.01); *H04L 5/14* (2013.01); *H04W 8/18* (2013.01)

(58) Field of Classification Search
CPC ......... H04B 7/15507; H04L 5/14; H04W 8/18
See application file for complete search history.

(56) References Cited

U.S. PATENT DOCUMENTS

| | | | | |
|---|---|---|---|---|
| 11,387,893 | B2 * | 7/2022 | Mouser | H04B 7/15542 |
| 2016/0360500 | A1 * | 12/2016 | Kim | H04W 88/085 |
| 2017/0055215 | A1 * | 2/2017 | Cook | H04W 52/0229 |
| 2020/0389227 | A1 * | 12/2020 | Zhan | H04B 7/15535 |

* cited by examiner

*Primary Examiner* — Erika A Washington
(74) *Attorney, Agent, or Firm* — Thorpe North & Western, LLP.

(57) ABSTRACT

A technology is described for a repeater comprising a modem configured to function as a time division duplex (TDD) uplink/downlink modem configured as a scanning sync detection module (SDM) configured to determine an UL/DL configuration information and scan channels for monitoring information. The modem can be configured to: identify one or more frequency ranges associated with a plurality of cellular carriers; scan the one or more frequency ranges; identify monitoring information that includes cellular carrier specific information for the one or more frequency ranges associated with the plurality of cellular carriers; and provide the monitoring information to the repeater for communication to the remote server.

17 Claims, 57 Drawing Sheets

1600 identify one or more frequency ranges associated with a plurality of cellular carriers — 1610 scan the one or more frequency ranges — 1620 identify cellular carrier specific information for the one or more frequency ranges associated with the plurality of cellular carriers — 1630 provide the cellular carrier specific information to the repeater — 1640

2800e

| TDD Subframe Configuration | DwPTS (Symbols) | Guard Period (Symbols) | UpPTS (Symbols) | Time (ms) | Velocity of light (km/s) | Round Trip Distance (km) | Cell radius (km) |
|---|---|---|---|---|---|---|---|
| 0 | 3 | 10 | 1 | 0.7 | 300000 | 214 | 107 |
| 1 | 9 | 4 | 1 | 0.3 | 300000 | 86 | 43 |
| 2 | 10 | 3 | 1 | 0.2 | 300000 | 64 | 32 |
| 3 | 11 | 2 | 1 | 0.1 | 300000 | 43 | 21 |
| 4 | 12 | 1 | 1 | 0.1 | 300000 | 21 | 11 |
| 5 | 3 | 9 | 2 | 0.6 | 300000 | 193 | 96 |
| 6 | 9 | 3 | 2 | 0.2 | 300000 | 64 | 32 |
| 7 | 10 | 2 | 2 | 0.1 | 300000 | 43 | 21 |
| 8 | 11 | 1 | 2 | 0.1 | 300000 | 21 | 11 |

FIG. 28e

REPEATER WITH CARRIER-SPECIFIC INFORMATION

PRIORITY CLAIMS AND RELATED APPLICATIONS

This application is a Continuation in Part of Co-Pending application Ser. No. 16/383,233, entitled "Repeater with Integrated Modem for Remote Monitoring" filed on Apr. 12, 2019 which claims the benefit of U.S. Provisional Application Ser. No. 62/660,052, filed Apr. 19, 2018, Co-Pending application Ser. No. 16/885,218, entitled "Multiplex Time Division Duplex Sync Detection Module" filed on May 27, 2020 which claims the benefit of U.S. Provisional Application Ser. No. 62/854,279, filed May 29, 2019, and Co-Pending Application Ser. No. 17/135,856, entitled "Repeater with Carrier Specific Information" filed on Dec. 28, 2020 which claims the benefit of U.S. Provisional Patent Application Ser. No. 62/955,749, filed Dec. 31, 2019 and U.S. Provisional Patent Application Ser. No. 63/036,932, filed Jun. 9, 2020, each of which are hereby incorporated by reference in their entirety herein.

BACKGROUND

Repeaters can be used to increase the quality of wireless communication between a wireless device and a wireless communication access point, such as a cell tower. Repeaters can increase the quality of the wireless communication by amplifying, filtering, and/or applying other processing techniques to uplink and downlink signals communicated between the wireless device and the wireless communication access point.

As an example, the repeater can receive, via an antenna, downlink signals from the wireless communication access point. The repeater can amplify the downlink signal and then provide an amplified downlink signal to the wireless device. In other words, the repeater can act as a relay between the wireless device and the wireless communication access point. As a result, the wireless device can receive a stronger signal from the wireless communication access point. Similarly, uplink signals from the wireless device (e.g., telephone calls and other data) can be received at the repeater. The repeater can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 28*e* depicts the special subframe guard period and number of orthogonal frequency division multiplexing (OFDM) symbols in accordance with an example;

Figure 1:
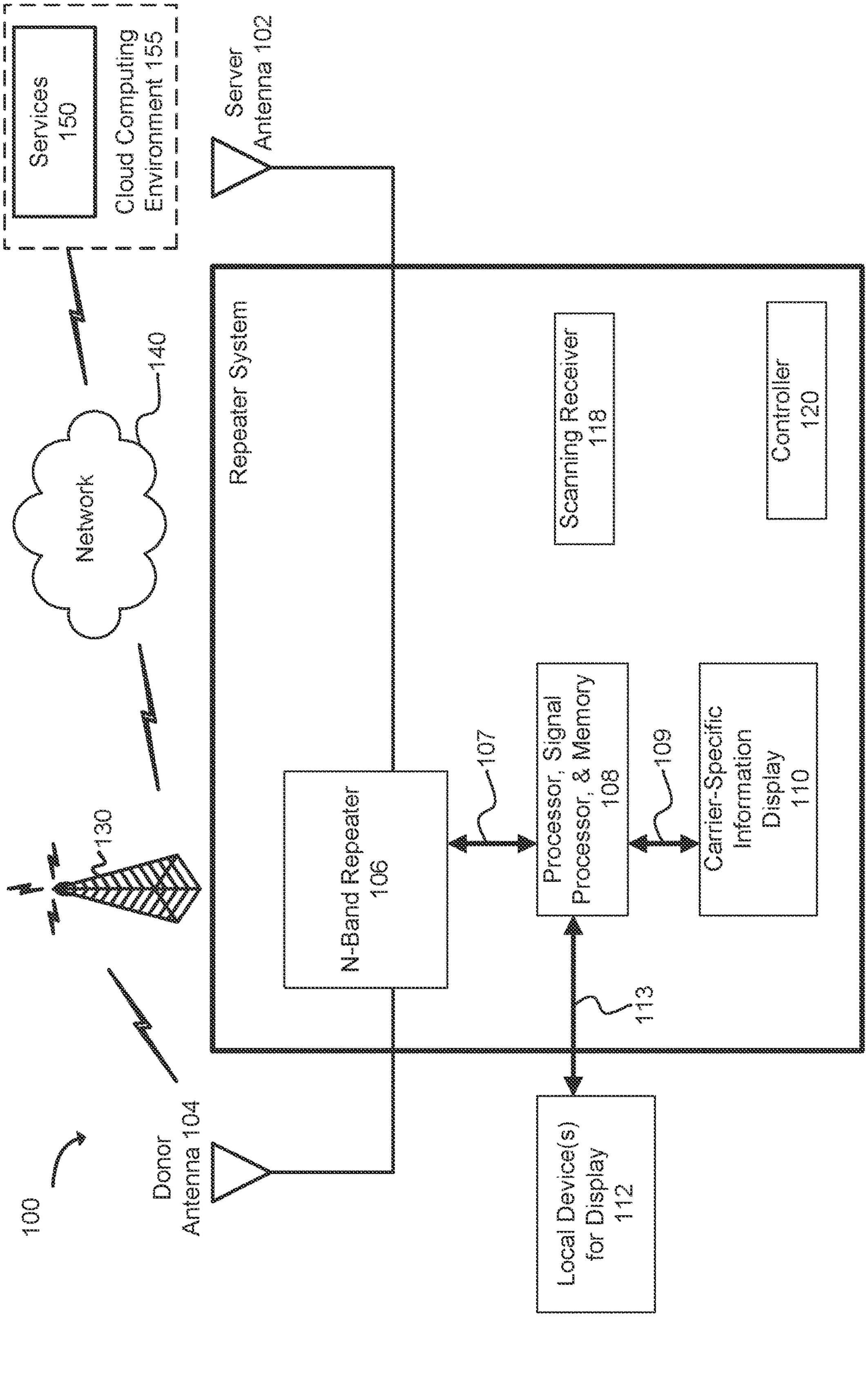
FIG. 1 illustrates a wideband repeater system configured to provide services via a cloud-computing environment in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Repeaters can increase the quality of wireless communication between a wireless device and a wireless communication access point by amplifying, filtering, or applying other processing techniques to uplink and downlink signals communicated between the wireless device and the wireless communication access point.

Repeaters can be difficult for a user to install and maintain in subsequent operation. For example, during installation of the repeater, a user may not have adequate information or experience to determine why the repeater is unable to properly operate. In such a scenario, the user can call a technician at a remote location to provide installation assistance. However, the technician might have to go to the installation location to finish installation when the user is unable to provide sufficient information or adequately follow directions. Repeaters can also be difficult for a user to properly operate subsequent to installation. For example, antenna positioning, oscillation mitigation, near-far resolution, and interference resolution may be difficult for a user to properly address without the assistance of a technician.

Repeaters typically do not remotely provide all of the information that can be used for assistance in installation and subsequent operation. For example, carrier-specific information may not be shown remotely to a user or a technician. Without remote access to the carrier-specific information, neither users nor technicians can install or maintain the operation of a repeater without difficulty.

In some instances, a customer may want to receive carrier-specific information from various cellular carriers without buying an individual subscriber identify module (SIM) card for each cellular carrier or entering into a lengthy and expensive contract with each cellular carrier.

Therefore, remote monitoring and reporting of carrier-specific information can reduce the difficulty involved in installation and maintenance of repeaters. In the case of consumer signal boosters, remote monitoring can be included as part of a subscription service. Such a subscription service can be implemented when carrier-specific information can be communicated from a repeater to a network or a display. In one example, the carrier-specific information can be communicated via: a repeater with signal processing capabilities; a scanning receiver; or a local device in communication with the repeater.

In one example, as illustrated in FIG. 1, a repeater system can comprise: an n-band repeater 106, one or more processors and memory 108, and a carrier-specific information display 110. The one or more processors and memory 108 can be configured to be coupled to a local device 112 (e.g., a user equipment (UE)) via a wired or wireless interface 113.

The n-band repeater 106 can comprise a donor port and a server port. The donor port can be configured to be connected to a donor antenna 104. The server port can be configured to be connected to a server antenna 102.

The n-band repeater 106 can comprise: one or more downlink amplification and filtering paths, and one or more uplink amplification and filtering paths. Each of the one or more downlink amplification and filtering paths can be configured to pass one or more frequency ranges of a downlink direction. Each of the one or more uplink amplification and filtering paths can be configured to pass one or more frequency ranges of an uplink direction. The n-band repeater can be configured to operate on n frequency bands, wherein n is a positive integer.

In one example, the repeater system can be a wideband repeater system configured to provide services 150 via a cloud-computing environment 155. The one or more processors and memory 108 can be configured to communicate with the n-band repeater 106 via an interface 107. The one or more processors and memory 108 can be configured to communicate with a carrier-specific information display 110 via an interface 109.

In one example, "wideband" can include the FCC definition of wideband for a consumer signal booster, as defined by the United States Federal Communication Commission, or another state or national entity in a specific country. In an example, a "wideband repeater" can be configured to operate simultaneously on one or more frequencies in an area for a plurality of commercial mobile radio services (CMRS) licensees, wherein a plurality of uplink and downlink bands can be configured.

In one example, the repeater system can comprise: a scanning receiver 118 and a controller 120. The scanning receiver 118 can be one or more of a modem, a field-programmable gate array (FPGA), or an application-specific integrated circuit (ASIC). The scanning receiver 118 can be configured to be coupled to the one or more processors and memory 108. The scanning receiver 118 can be configured to scan one or more of the n bands of the n-band booster 106. The scanning receiver 118 can be configured to communicate carrier specific information for the one or more of the n bands to a base station 130 for communication to a server located in the cloud-computing environment 155 via a network 140.

In one example, the scanning receiver 118 can be configured to identify one or more frequency ranges associated with a plurality of cellular carriers. The scanning receiver 118 can be further configured to scan the one or more frequency ranges. The scanning receiver 118 can be further configured to identify cellular carrier specific information for the one or more frequency ranges associated with the plurality of cellular carriers. The scanning receiver 118 can be further configured to provide the cellular carrier specific information to the repeater. In one example, the scanning receiver 118 can be configured to scan the one or more frequency ranges of the plurality of cellular carriers without a subscriber identify module (SIM) card.

In one example, the carrier specific information can include carrier-specific information for a plurality of carriers in each band of the one or more of the n bands of the n-and repeater. The carrier specific information can be determined from one or more of a downlink signal received via the donor port, an uplink signal received via the server port, or the one or more processors and memory 108. The carrier-specific information can include one or more of: a carrier name, one or more operating frequencies, one or more channels, a direction of a cell tower from the n-band repeater, a location of a cell tower for the n-band repeater, a time and date of transmission, a reference signal received power (RSRP), a reference signal received quality (RSRQ), a received signal strength indicator (RSSI), an arbitrary strength unit (ASU), a reference signal (RS) signal to noise ratio (SNR) (RSSNR), an evolved-UMTS Terrestrial Radio Access Network (E-UTRAN) cell identifier (ED), or a tracking area code (TAC).

In one example, the controller 120 can be configured to communicate with the one or more processors and memory 108 and the cloud-computing environment 155. The controller 120 can be configured to control services 150 provided by the wideband repeater system via the server in the cloud computing environment 155 using one or more encryption keys.

In one example, a method for providing n-band repeater services 150 via a cloud-computing environment 155 can comprise: coupling one or more bands of an n-band repeater 106 in a received signal to a scanning receiver 118. The method can further comprise: determining the carrier specific information for the one or more bands. The method can further comprise: communicating the carrier-specific information for the n-band repeater 106 to a server in a cloud-computing environment 155. The method can further comprise: controlling display of the carrier-specific information using one or more encryption keys associated with a subscription service. Controlling the display of the carrier-specific information can include controlling the communication of the carrier-specific information. In one example, the carrier-specific information may only be communicated to a user with an appropriate encryption key for the subscription service. The method can further comprise: controlling the n-band repeater 106 via the cloud-computing environment 155 using the one or more encryption keys associated with the subscription service. For example, control information may only be communicated from the cloud-computing environment 155 to the n-band repeater 106 or repeater system 100 when a user has an appropriate encryption key for the subscription service.

Figure 2:
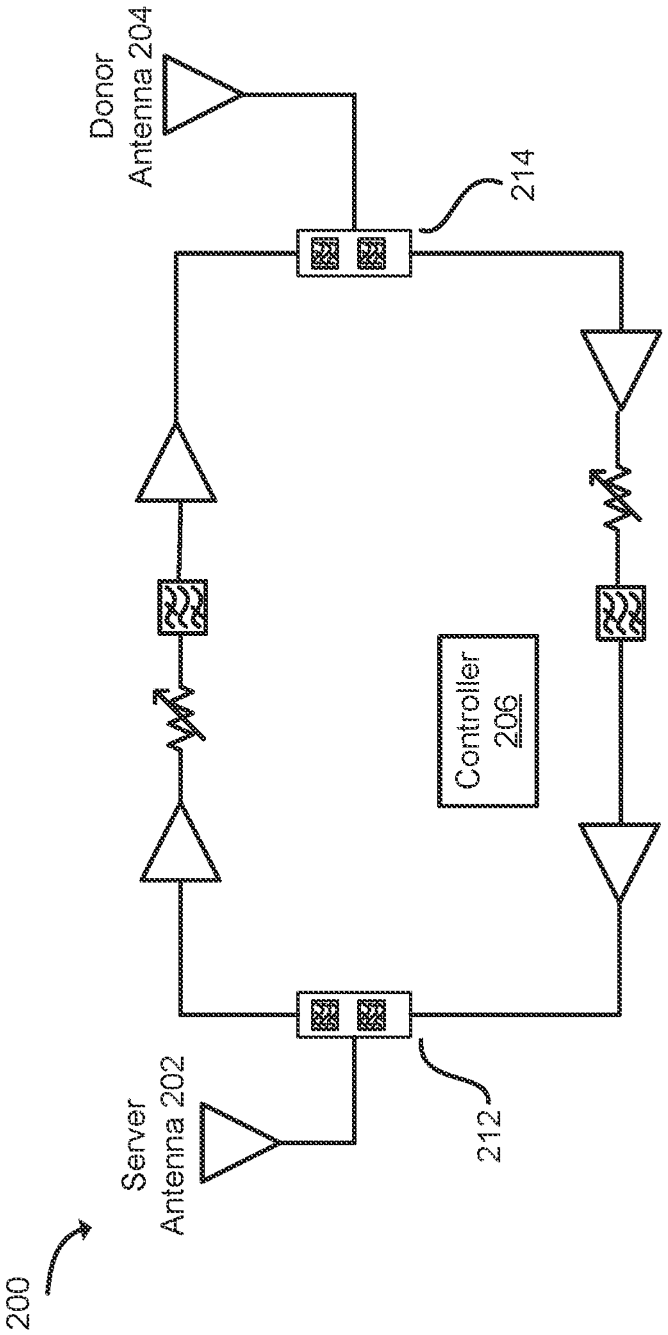
FIG. 2 illustrates a repeater in accordance with an example.

In an example, as illustrated in FIG. 2, a bi-directional repeater system can comprise a repeater 200 connected to a donor antenna 204 and a server antenna 202. The repeater 200 can include a donor antenna port that can be internally coupled to a second duplexer (or diplexer or multiplexer or circulator or splitter) 214. The repeater 200 can include a server antenna port that can also be coupled to a first duplexer (or diplexer or multiplexer or circulator or splitter) 212. Between the two duplexers, 214 and 212, can be two paths: a first path and a second path. The first path can comprise a low noise amplifier (LNA) with an input coupled to the first duplexer 212, a variable attenuator coupled to an output of the LNA, a filter coupled to the variable attenuator, and a power amplifier (PA) coupled between the filter and the second duplexer 214. The LNA can amplify a lower power signal without degrading the signal to noise ratio. The PA can adjust and amplify the power level by a desired amount. A second path can comprise an LNA with an input coupled to the second duplexer 214, a variable attenuator coupled to an output of the LNA, a filter coupled to the variable attenuator, and a PA coupled between the filter and the first duplexer 212. The first path can be a downlink amplification path or an uplink amplification path. The second path can be a downlink amplification path or an uplink amplification path. The repeater 200 can also comprise a controller 206. In one example, the controller 206 can include one or more processors and memory.

In some embodiments the controller 206 can adjust the gain of the first path and/or the second path based on wireless communication conditions. If included in the repeater 200, the controller 206 can be implemented by any suitable mechanism, such as a program, software, function, library, software as a service, analog or digital circuitry, or any combination thereof. The controller 206 can also include a processor coupled to memory. The processor can include, for example, a microprocessor, microcontroller, digital signal processor (DSP), application specific integrated circuit (ASIC), a Field Programmable Gate Array (FPGA), or any other digital or analog circuitry configured to interpret and/or to execute program instructions and/or to process data. In some embodiments, the processor can interpret and/or execute program instructions and/or process data stored in the memory. The instructions can include instructions for adjusting the gain of the first path and/or the second path. For example, the adjustments can be based on radio frequency (RF) signal inputs.

The memory can include any suitable computer readable media configured to retain program instructions and/or data for a period of time. By way of example, and not limitation, such computer readable media can include tangible computer readable storage media including random access memory (RAM), read only memory (ROM), electrically erasable programmable read only memory (EEPROM), a compact disk (CD) ROM or other optical disk storage, magnetic disk storage or other magnetic storage devices, flash memory devices (e.g., solid state memory devices) or any other storage medium which can be used to carry or store desired program code in the form of computer executable instructions or data structures and which can be accessed by a general purpose or special purpose computer. Combinations of the above can also be included within the scope of computer readable media. Computer executable instructions can include, for example, instructions and data that cause a general purpose computer, special purpose computer, or special purpose processing device to perform a certain function or group of functions.

Figure 3:
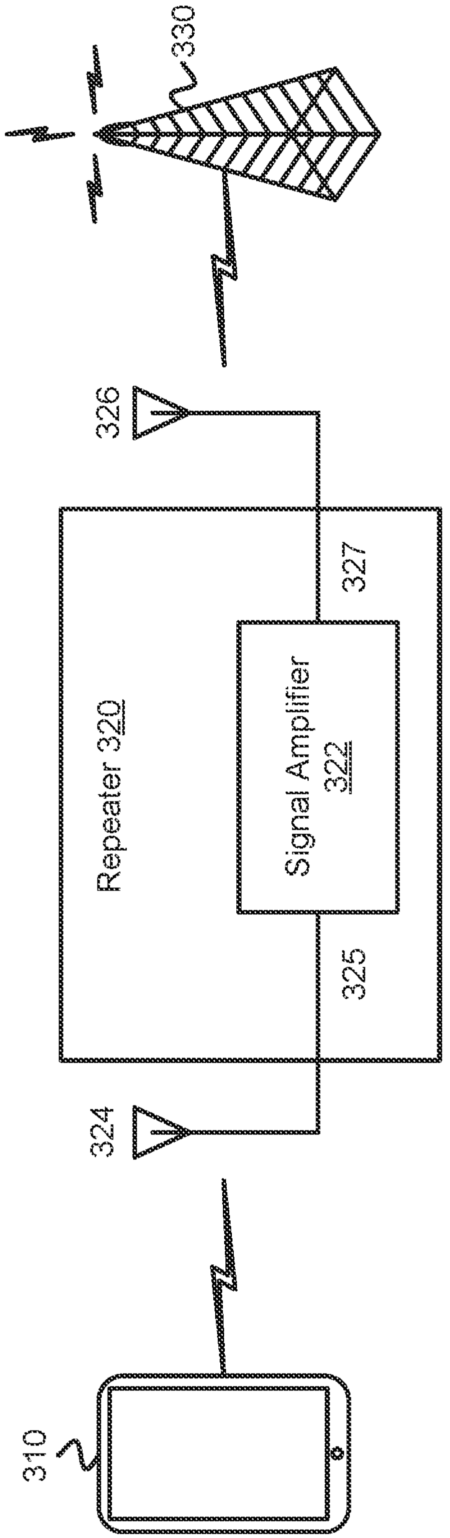
FIG. 3 illustrates a repeater in communication with a user equipment (UE) and a base station (BS) in accordance with an example.

FIG. 3 illustrates an exemplary repeater 320 in communication with a wireless device 310 and a base station 330. The repeater 320 (also referred to as a cellular signal amplifier) can increase the quality of wireless communication by amplifying, filtering, and/or applying other processing techniques via a signal amplifier 322 to uplink signals communicated from the wireless device 310 to the base station 330 and/or downlink signals communicated from the base station 330 to the wireless device 310. In other words, the repeater 320 can amplify or boost uplink signals and/or downlink signals bi-directionally. In one example, the repeater 320 can be at a fixed location, such as in a home or office. Alternatively, the repeater 320 can be attached to a mobile object, such as a vehicle or a wireless device 310. The repeater can be a signal booster, such as a cellular signal booster.

In one configuration, the repeater 320 can be configured to be connected to a device antenna 324 (e.g., an inside antenna, server antenna, or a coupling antenna) and a node antenna 326 (e.g., an outside antenna or donor antenna). The node antenna 326 can receive the downlink signal from the base station 330. The downlink signal can be provided to the signal amplifier 322 via a second coaxial cable 327 or other type of wired, wireless, optical, or radio frequency connection operable to communicate radio frequency signals. The signal amplifier 322 can include one or more radio signal amplifiers for amplification and filtering of cellular signals. The downlink signal that has been amplified and filtered can be provided to the device antenna 324 via a first coaxial cable 325 or other type of radio frequency connection operable to communicate radio frequency signals. The device antenna 324 can communicate the downlink signal that has been amplified and filtered to the wireless device 310.

Similarly, the device antenna 324 can receive an uplink signal from the wireless device 310. The uplink signal can be provided to the signal amplifier 322 via the first coaxial cable 325 or other type of wired, wireless, optical, or radio frequency connection operable to communicate radio frequency signals. The signal amplifier 322 can include one or more radio signal amplifiers for amplification and filtering of cellular signals. The uplink signal that has been amplified and filtered can be provided to the node antenna 326 via the second coaxial cable 327 or other type of wired, wireless, optical, or radio frequency connection operable to communicate radio frequency signals. The node antenna 326 can communicate the uplink signal that has been amplified and filtered to a node, such as a base station 330.

In one embodiment, the device antenna 324 and the node antenna 326 can be integrated as part of the repeater 320. Alternatively, the repeater 320 can be configured to be connected to a separate device antenna 324 or node antenna 326. The device antenna and the node antenna may be provided by a different provider than the repeater 320.

In one example, the repeater 320 can send uplink signals to a node and/or receive downlink signals from the node. While FIG. 3 shows the node as a base station 330, this is not intended to be limiting. The node can comprise a wireless wide area network (WWAN) access point (AP), a base station (BS), an evolved Node B (eNB), a next generation Node B (gNB), a new radio base station (NR BS), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one example, the repeater 320 can include a battery to provide power to various components, such as the signal amplifier 322, the device antenna 324, and the node antenna 326. The battery can also power the wireless device 310 (e.g., phone or tablet). Alternatively, the repeater 320 can receive power from the wireless device 310.

In one configuration, the repeater 320 can be a Federal Communications Commission (FCC)-compatible consumer repeater. As a non-limiting example, the repeater 320 can be compatible with FCC Part 20 or 47 Code of Federal Regulations (C.F.R.) Part 20.21 (Apr. 18, 2018). In addition, the handheld booster can operate on the frequencies used for the provision of subscriber-based services under parts 22 (Cellular), 24 (Broadband PCS), 27 (AWS-1, 700 megahertz (MHz) Lower A-E Blocks, and 700 MHz Upper C Block), and 90 (Specialized Mobile Radio) of 47 C.F.R. The repeater 320 can be configured to automatically self-monitor its operation to ensure compliance with applicable noise and gain limits. The repeater 320 can either self-correct or shut down automatically if the repeater's operations violate the regulations defined in 47 CFR Part 20.21. While a repeater that is compatible with FCC regulations is provided as an example, it is not intended to be limiting. The repeater can be configured to be compatible with other governmental regulations based on the location where the repeater is configured to operate.

In one configuration, the repeater 320 can enhance the wireless connection between the wireless device 310 and the base station 330 (e.g., cell tower) or another type of wireless wide area network (WWAN) access point (AP) by amplifying desired signals relative to a noise floor. The repeater 320 can boost signals for cellular standards, such as the Third Generation Partnership Project (3GPP) Long Term Evolution (LTE) Release 8, 9, 10, 11, 12, 13, 14, 15, or 16 standards or Institute of Electronics and Electrical Engineers (IEEE) 802.16. In one configuration, the repeater 320 can boost signals for 3GPP LTE Release 16.3.0 (September 2019) or other desired releases.

The repeater 320 can boost signals from the 3GPP Technical Specification (TS) 36.101 (Release 16 Sep. 2019) bands or LTE frequency bands. For example, the repeater 320 can boost signals from the LTE frequency bands: 2, 4, 5, 12, 13, 17, 25, and 26. In addition, the repeater 320 can boost selected frequency bands based on the country or region in which the repeater is used, including any of bands 1-53, 65-76, 85, 87, or 88, or other bands, as disclosed in 3GPP TS 36.104 V16.3.0 (September 2019), and depicted in Table 1:

TABLE 1

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 (NOTE 1) | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz 845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23[1] | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD (NOTE 2) |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD (NOTE 2) |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD (NOTE 3, NOTE 4) |

TABLE 1-continued

| LTE Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD (NOTE 8) |
| 50 | 1432 MHz-1517 MHz | 1432 MHz-1517 MHz | TDD |
| 51 | 1427 MHz-1432 MHz | 1427 MHz-1432 MHz | TDD |
| 52 | 3300 MHz-3400 MHz | 3300 MHz-3400 MHz | TDD |
| 53 | 2483.5 MHz-2495 MHz | 2483.5 MHz-2495 MHz | TDD |
| 65 | 1920 MHz-2010 MHz | 2110 MHz-2200 MHz | FDD |
| 66 | 1710 MHz-1780 MHz | 2110 MHz-2200 MHz | FDD (NOTE 5) |
| 67 | N/A | 738 MHz-758 MHz | FDD (NOTE 2) |
| 68 | 698 MHz-728 MHz | 753 MHz-783 MHz | FDD |
| 69 | N/A | 2570 MHz-2620 MHz | FDD (NOTE 2) |
| 70 | 1695 MHz-1710 MHz | 1995 MHz-2020 MHz | FDD[6] |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD (NOTE 2) |
| 76 | N/A | 1427 MHz-1432 MHz | FDD (NOTE 2) |
| 85 | 698 MHz-716 MHz | 728 MHz-746 MHz | FDD |
| 87 | 410 MHz-415 MHz | 420 MHz-425 MHz | FDD |
| 88 | 412 MHz-417 MHz | 422 MHz-427 MHz | FDD |

NOTE 1:
Band 6, 23 are not applicable.
NOTE 2:
Restricted to E-UTRA operation when carrier aggregation is configured. The downlink operating band is paired with the uplink operating band (external) of the carrier aggregation configuration that is supporting the configured Pcell.
NOTE 3:
This band is an unlicensed band restricted to licensed-assisted operation using Frame Structure Type 3.
NOTE 4:
Band 46 is divided into four sub-bands as in Table 5.5-1A.
NOTE 5:
The range 2180-2200 MHz of the DL operating band is restricted to E-UTRA operation when carrier aggregation is configured.
NOTE 6:
The range 2010-2020 MHz of the DL operating band is restricted to E-UTRA operation when carrier aggregation is configured and TX-RX separation is 300 MHz. The range 2005-2020 MHz of the DL operating band is restricted to E-UTRA operation when carrier aggregation is configured and TX-RX separation is 295 MHz.
NOTE 7:
Void
NOTE 8:
This band is restricted to licensed-assisted operation using Frame Structure Type 3.

In another configuration, the repeater 320 can boost signals from the 3GPP Technical Specification (TS) 38.104 (Release 16 Sep. 2019) bands or 5G frequency bands. In addition, the repeater 320 can boost selected frequency bands based on the country or region in which the repeater is used, including any of bands n1-n86 in frequency range 1 (FR1), n257-n261 in frequency range 2 (FR2), or other bands, as disclosed in 3GPP TS 38.104 V16.1.0 (September 2019), and depicted in Table 2 and Table 3:

TABLE 2

| NR operating band | Uplink (UL) operating band BS receive/UE transmit $F_{UL,\ low}$-$F_{UL,\ high}$ | Downlink (DL) operating band BS transmit/UE receive $F_{DL,\ low}$-$F_{DL,\ high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |

TABLE 2-continued

| NR operating band | Uplink (UL) operating band BS receive/UE transmit $F_{UL,\ low}$-$F_{UL,\ high}$ | Downlink (DL) operating band BS transmit/UE receive $F_{DL,\ low}$-$F_{DL,\ high}$ | Duplex mode |
|---|---|---|---|
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n48 | 3550 MHz-3700 MHz | 3550 MHz-3700 MHz | TDD |

TABLE 2-continued

| NR operating band | Uplink (UL) operating band BS receive/UE transmit $F_{UL,\ low}$-$F_{UL,\ high}$ | Downlink (DL) operating band BS transmit/UE receive $F_{DL,\ low}$-$F_{DL,\ high}$ | Duplex mode |
|---|---|---|---|
| n50 | 1432 MHz-1517 MHz | 1432 MHz-1517 MHz | TDD |
| n51 | 1427 MHz-1432 MHz | 1427 MHz-1432 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| n89 | 824 MHz-849 MHz | N/A | SUL |
| [n90] | 2496 MHz-2690 MHz | 2496 MHz-2690 MHz | TDD |

TABLE 3

| NR operating band | Uplink (UL) and Downlink (DL) operating band BS transmit/receive UE transmit/receive $F_{UL,\ low}$-$F_{UL,\ high}$ $F_{DL,\ low}$-$F_{DL,\ high}$ | Duplex mode |
|---|---|---|
| n257 | 26500 MHz-29500 MHz | TDD |
| n258 | 24250 MHz-27500 MHz | TDD |
| n260 | 37000 MHz-40000 MHz | TDD |
| n261 | 27500 MHz-28350 MHz | TDD |

Figure 4:
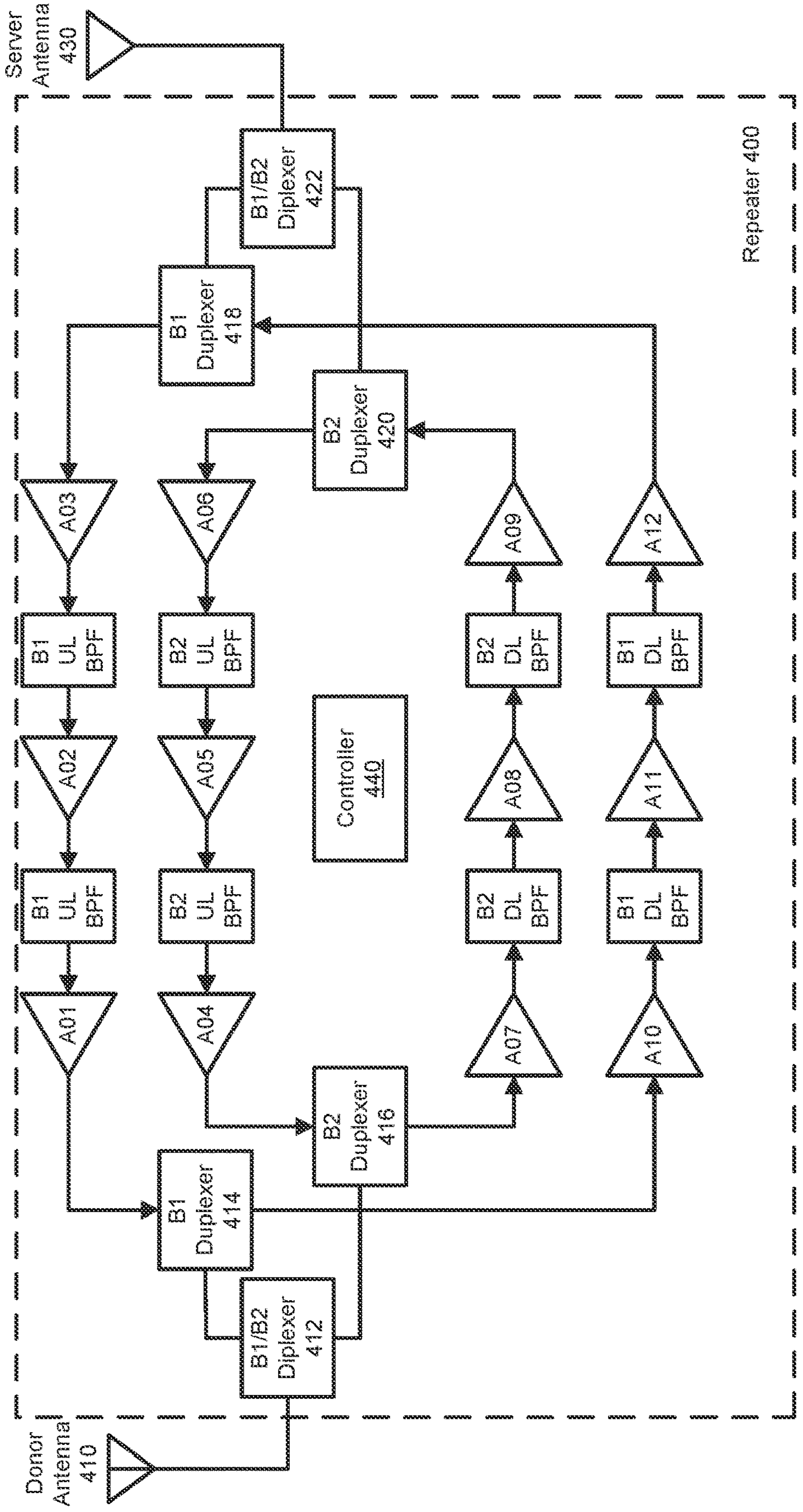
FIG. 4 illustrates a frequency division duplex (FDD) multiband repeater in accordance with an example.

As illustrated in FIG. 4, in another example, a repeater can be configured as a multiband bi-directional FDD wireless signal booster 400 configured to amplify an uplink signal and a downlink signal in multiple bands or channels using a separate signal path for one or more uplink frequency bands or channels and one or more downlink frequency bands or channels. In one embodiment, adjacent bands can be included on a same signal path.

A donor antenna 410, or an integrated node antenna, can receive a downlink signal. For example, the downlink signal can be received from a base station. The downlink signal can be provided to a first B1/B2 diplexer 412, wherein B1 represents a first frequency band and B2 represents a second frequency band. The first B1/B2 diplexer 412 can direct selected portions of a received signal to a B1 downlink signal path and a B2 downlink signal path. A downlink signal that is associated with B1 can travel along the B1 downlink signal path to a first B1 duplexer 414. A portion of the received signal that is within the B2 can travel along the B2 downlink signal path to a first B2 duplexer 416. After passing the first B1 duplexer 414, the downlink signal can travel through a series of amplifiers (e.g. A10, A11, and A12) and downlink bandpass filters (e.g. B1 DL BPF) to a second B1 duplexer 418. In addition, the B2 downlink signal passing through the B2 duplexer 416, can travel through a series of amplifiers (e.g. A07, A08, and A09) and downlink band pass filters (e.g. B2 DL BPF) to a second B2 duplexer 420. At this point, the downlink signals (B1 or B2) have been amplified and filtered in accordance with the type of amplifiers and BPFs included in the multiband bi-directional wireless signal booster 400. The downlink signals from the second B1 duplexer 418 or the second B2 duplexer 420, respectively, can be provided to a second B1/B2 diplexer 422. The second B1/B2 diplexer 422 can direct the B1/B2 amplified downlink signal to a server antenna 430, or an integrated device antenna. The server antenna 430 can communicate the amplified downlink signal to a wireless device, such as a UE.

In another example, the server antenna 430 can receive an uplink (UL) signal from a wireless device. The uplink signal can include a first frequency range, such as a Band 1 signal and a second frequency range, such as a Band 2 signal. The uplink signal can be provided to the second B1/B2 diplexer 422. The second B1/B2 diplexer 422 can direct the signals, based on their frequency, to a B1 uplink signal path and a B2 uplink signal path. An uplink signal that is associated with B1 can travel along the B1 uplink signal path to a second B1 duplexer 418, and an uplink signal that is associated with B2 can travel along the B2 uplink signal path to a second B2 duplexer 420. The second B1 duplexer 418 can direct the B1 uplink signal to travel through a series of amplifiers (e.g. A01, A02, and A03) and uplink bandpass filters (B1 UL BPF) to the first B1 duplexer 414. In addition, the second B2 duplexer 420 can direct the B2 uplink signal to travel through a series of amplifiers (e.g. A04, A05, and A06) and downlink band pass filters (B2 UL BPF) to the first B2 duplexer 416. At this point, the uplink signals (B1 and B2) have been amplified and filtered in accordance with the type of amplifiers and BPFs included in the bi-directional wireless signal booster 400. The uplink signals from the first B1 duplexer 414 and the first B2 duplexer 416, respectively, can be provided to the first B1/B2 diplexer 412. The first B1/B2 diplexer 412 can direct the B1 and B2 amplified uplink signals to the donor antenna 410, or an integrated device antenna. The donor antenna 410, or donor antenna, can communicate the amplified uplink signals to a base station.

In another example, the repeater 400 can further comprise a controller 440. The controller 440 can be configured to communicate with the one or more processors, signal processors, or memory and be used to control one or more devices within the repeater 400.

Figure 5A:
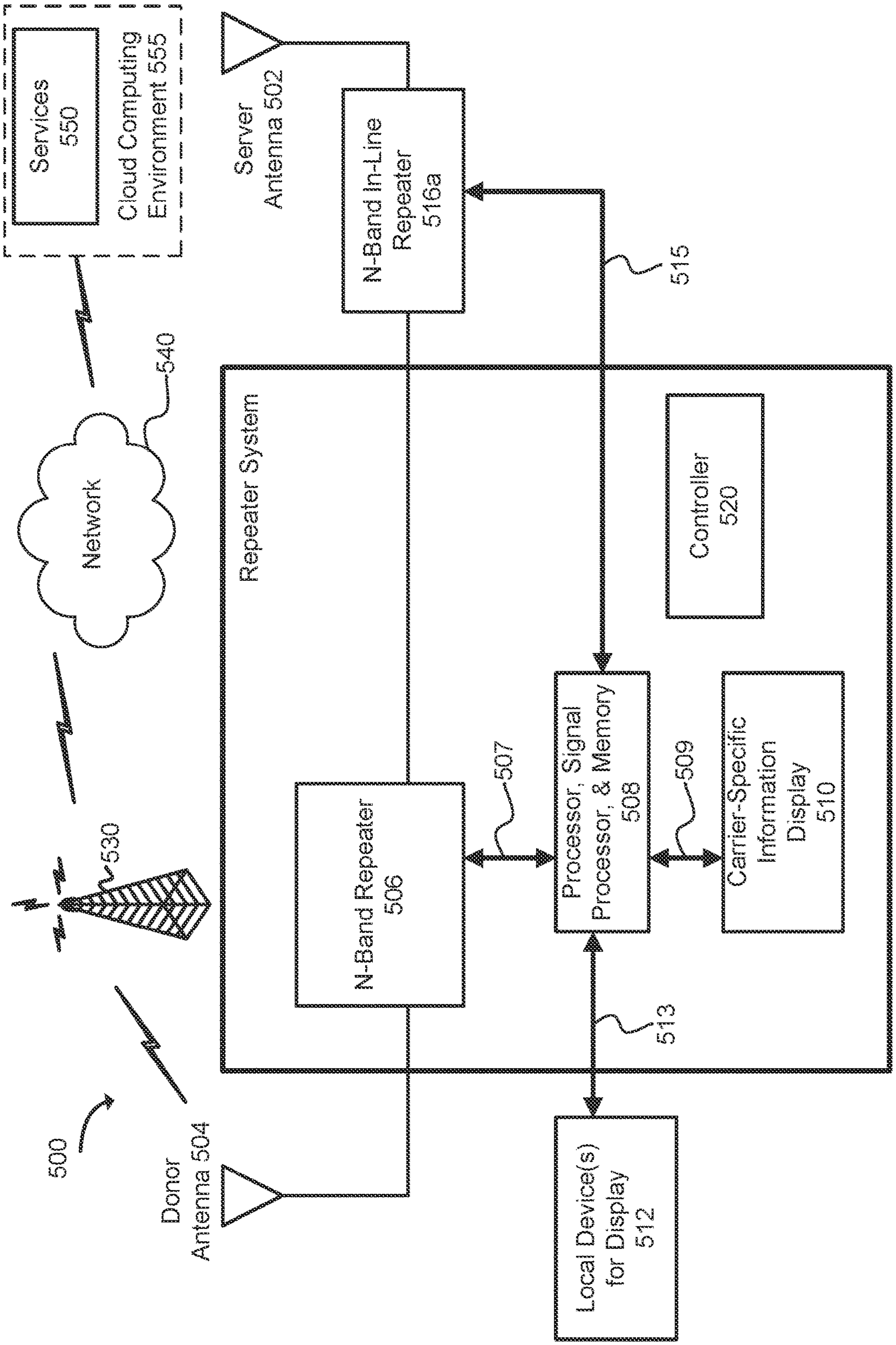
FIG. 5*a* illustrates a repeater system configured to provide services via a cloud-computing environment in accordance with an example.

In another example, as illustrated in FIG. 5*a*, a wideband repeater system 500 can be configured to provide services 550 via a cloud-computing environment 555. The wideband repeater system 500 can comprise: an n-band repeater 506; one or more processors, signal processors, or memory 508; and a carrier-specific information display 510. For purposes of this disclosure, the terms "cloud-computing environment" and "computing service environment" can be deemed interchangeable.

In another example, the one or more processors, signal processors, or memory 508 can be configured to be connected to a local device for display 512 via a wired or wireless interface 513. The one or more processors, signal processors, or memory 508 can be configured to be connected to a carrier-specific information display 510 via a wired or wireless interface 509. The one or more processors, signal processors, or memory 508 can be configured to be connected to the n-band repeater 506 via an interface 507. The one or more processors, signal processors, or memory 508 can be configured to be connected to an n-band in-line repeater 516*a* via a wired or wireless interface 515.

In another example, the n-band repeater 506 can comprise a donor port and a server port. The donor port can be configured to be connected to a donor antenna 504. The server port can be configured to be connected to a server antenna 502.

The donor antenna 504 can be configured to transmit an uplink signal from the donor port of the n-band repeater 506 to a base station 530. The donor antenna 504 can be configured to receive a downlink signal from the base station 530 for communication to the donor port of the n-band repeater 506.

The server antenna 502 can be configured to transmit a downlink signal from the server port of the n-band repeater 506 to a user equipment (UE). The server antenna 502 can be configured to receive an uplink signal from the UE for communication to the server port of the n-band repeater 506.

In another example, the n-band repeater 506 can comprise: one or more downlink amplification and filtering paths, and one or more uplink amplification and filtering paths. Each of the one or more downlink amplification and filtering paths can be configured to pass one or more frequency ranges of a downlink direction. Each of the one or more uplink amplification and filtering paths can be configured to pass one or more frequency ranges of an uplink direction. The n-band repeater 506 can be configured to operate on n frequency bands, wherein n is a positive integer.

In another example, the n-band repeater can be configured to be compatible with regulations defined for consumer signal boosters. In one example, the regulations defined for consumer signal boosters can include 47 Code of Federal Regulations (CFR) Part 20.21 (Apr. 18, 2018).

In another example, the wideband repeater system can further comprise a controller 520. The controller 520 can be configured to communicate with the one or more processors, signal processors, or memory 508. The controller can be configured to communicate with a cloud-computing environment 555 via a network 540.

In another example, the controller 520 can be operable to control services 550 provided by the wideband repeater system via a server in the cloud-computing environment 555. In one example, the controller can be configured to control services 550 provided by the wideband repeater system via the server in the cloud-computing environment 555 using one or more encryption keys.

In another example, the "services" can include one or more of "controllable functions", services related to monitoring of carrier-specific information, or any other services defined in this disclosure that can be received or provided by the wideband repeater system.

In another example, the services 550 provided by the wideband repeater system that can be controlled via the server in the cloud-computing environment 555 can include controllable functions including control of one or more of: a position of one or more antennas associated with the n-band repeater; a repeater gain of the n-band repeater; an activation or deactivation of one or more of a donor port of the n-band repeater or a server port of the n-band repeater; an activation or deactivation of one or more amplification and filtering paths for one or more operating bands of the n-band repeater, wherein the operating bands include one or more of a Third Generation Partnership Project (3GPP) long term evolution (LTE) frequency band or a 3GPP fifth generation (5G) frequency band; an increase or decrease of a repeater output power of the n-band repeater; an increase or decrease of a network protection level of the n-band repeater; an activation or deactivation of one or more carriers associated with the n-band repeater; a filtering of one or more channels of one or more of a 3GPP LTE frequency band or a 3GPP 5G frequency band to provide filtering for the one or more channels; or a channel selection, an operating band selection, or a carrier gain level based on a time of a day.

In another example, the services 550 provided by the wideband repeater system that can be monitored via the server in the cloud-computing environment 555 can include monitoring of carrier-specific information for the one or more of the n bands to a server located in the cloud-computing environment 555 to enable access to the carrier-specific information from the cloud-computing environment 555. The services 550 can further include: a retrieval of cell signal logs or statistics for one or more of a 3GPP LTE frequency band or a 3GPP 5G frequency band; an identification of one or more of a donor port carrier frequency, a server port carrier frequency, a reference signal received power (RSRP), a reference signal received quality (RSRQ), or a signal to interference-plus-noise ratio (SINR); a monitoring of one or more of in-band radio frequency (RF) activity or adjacent band RF activity; a firmware update of the n-band repeater; or a monitoring of uninterruptible power source (UPS) logs.

In another example, the controller 520 can be configured to send carrier-specific information for the one or more bands of the n bands of the n-band repeater 506 to a first display (e.g., a local device for display 512, a carrier-specific information display 510, an integrated display, a mobile display, or a remote display).

In another example, the controller 520 can be configured to send for monitoring and/or display one or more of: (a) a first level of information of the carrier-specific information for the one or more n bands of the n-band repeater 506 using a first encryption key of the one of more encryption keys; a second level of information of the carrier-specific information for the one or more n bands of the n-band repeater 506 using a second encryption key of the one of more encryption keys; an $m^{th}$ level of information of the carrier-specific information for the one or more n bands of the n-band repeater 506 using an $m^{th}$ encryption key of the one of more encryption keys, wherein m can be a positive integer greater than 2.

In another example, the controller 520 can be configured to provide one or more of: a first level of control of selected functions of the n-band repeater 506 via the server of the cloud-computing environment 555; a second level of control of selected functions of the n-band repeater 506 via the server of the cloud-computing environment 555; a $p^{th}$ level of control of selected functions of the n-band repeater 506 via the server of the cloud-computing environment 555, wherein p can be a positive integer greater than 2.

In another example, the one or more encryptions keys can be used to control display of the carrier specific information. The one or more encryption keys can be used to control the n-band repeater 506 via the cloud-computing environment 555.

In another example, the one or more encryption keys can be associated with a subscription service. In another example, the subscription service can be based on customer account information. In another example, a customer, a subscriber, or a user can receive access to a level of information of the carrier-specific information based on username or password authentication, or a permission level associated with the username and password. As discussed in the proceeding and with reference to FIG. 12, a deployment component 1222 may be used to assist customers in the deployment of computing instances 1204*a-d*. The deployment component 1222 may have access to account information associated with the computing instances 1204*a-d*, such as the name of an owner of the account, credit card information, country of the owner, and the like. In another example, customer account information 1224 may include a unique identifier for a customer, a customer address, billing information, licensing information, customization parameters for launching instances, scheduling information, etc. As described above, the customer account information 1224 may also include security information used in encryption of asynchronous responses to API requests.

In another example, a customer can include a "user" or a "client." A client can include one or more processors or memory or instructions executed by one or more processors or memory. The client can be configured to access a service 555 provided by a server. The server can be located on a separate computer system and can be accessed by the client via a network 540.

In another example, an encryption key can include a series of bits configured for scrambling or unscrambling data. In one example, the encryption key can be one or more of a public encryption key or a private encryption key. The public encryption key can be configured to encrypt information and the private encryption key can be configured to decrypt information that is encrypted using the public key.

In another example, the controller 520 can be further configured to provide: access to a level of information of the carrier-specific information for the one or more of the n bands based on one or more of: a username and password authentication, or a permission level associated with the username and password authentication; or access to a level of control of selected functions of the repeater via the server of the cloud-computing environment 555 based on one or more of: the username and password authentication, or the permission level associated with the username and password authentication.

In another example, the wideband repeater system can further comprise an n-band in-line repeater 516*a* configured to be coupled between the server port of the n-band repeater 506 and the server antenna 502. The n-band in-line repeater 516*a* can be configured to be coupled to the one or more processors, signal processors, or memory 508 via a wired or wireless interface 515.

In another example, the wideband repeater system can further comprise one or more communication ports configured to transmit the carrier-specific information from the n-band repeater 506 to the server located in the cloud-computing environment 555. The one or more communication ports can be one or more of a wired communication port, a wireless communication port, an optical communication port, or a radio frequency communication port. The wired communication port can include, without limitation, an Ethernet communication port. The wireless communication port can be configured to communicate, without limitation, in one or more of: a wireless local area network (WLAN) (e.g., Wi-Fi), a wireless personal area network (WPAN) (e.g., Bluetooth), or a wireless wide area network (WWAN) (e.g., 3GPP LTE or 3GPP 5G).

In another example, the wideband repeater system can further comprise a local device (e.g., 512 or a UE) in communication with the one or more processors, signal processors, or memory 508 via a wired or wireless interface. The wired interface can include an Ethernet interface. The wireless interface can include one or more of a WLAN, a WPAN, or a WWAN.

In another example, the wideband repeater system can be configured to be coupled to a display (e.g., 510 or 512). The display can be configured to be coupled with the one or more processors, signal processors, or memory 508. The display can be configured to display carrier-specific information for the n-band repeater 506.

In another example, the display can be one or more of: an integrated display (e.g., a display that is integrated with the wideband repeater system, such as 510); a mobile display (e.g., a display on a UE, such as a mobile device or a local device with a display 512); or a remote display (e.g., a display that can be configured to communicate with the wideband repeater system via a WLAN or WWAN). In one example, the integrated display (e.g., 510) can be coupled to the n-band repeater 506.

Figure 5B:
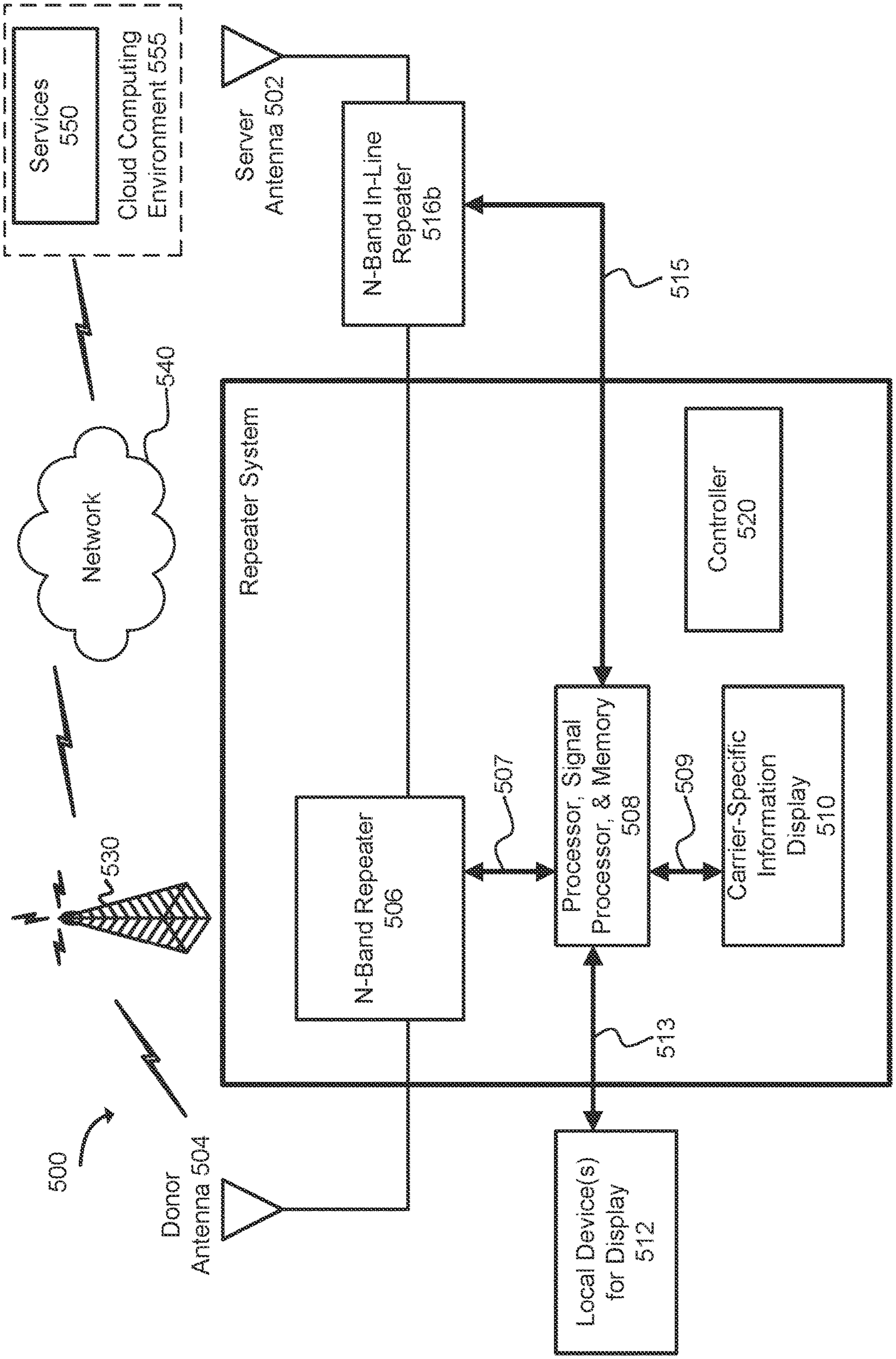
FIG. 5*b* illustrates a repeater system configured to provide services via a cloud-computing environment in accordance with an example.

In another example, as illustrated in FIG. 5*b*, a wideband repeater system can comprise an n-band in-line repeater 516*b* with a display that can be coupled to the in-line repeater 516*b*. In another example, the wideband repeater system can comprise a first display (e.g., 510) coupled to the n-band repeater 506 and a second display coupled to the n-band in-line repeater 516*b*.

In another example, the first display can be a touchscreen display configured to display the carrier-specific information for the n-band repeater 506 and configured to enable control of the n-band repeater 506. In another example, the second display can be configured to be in communication with one or more of: the one or more processors, signal processors, or memory 508; or the server of the cloud-computing environment 555. In another example, the second display can be a touchscreen display configured to display the carrier-specific information for the n-band repeater 506 and configured to enable control of the n-band repeater 506.

Figure 5C:
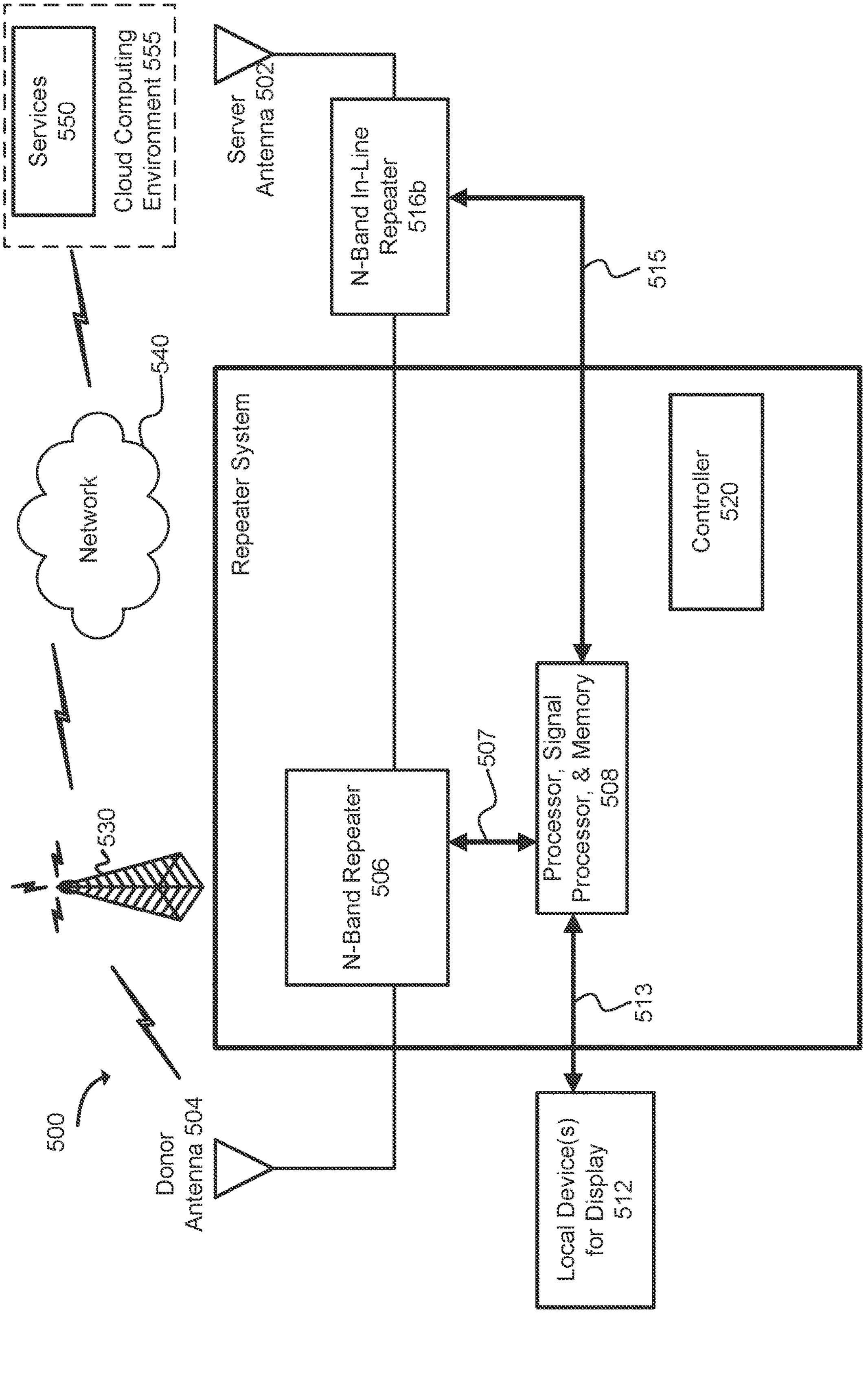
FIG. 5*c* illustrates a repeater system configured to provide services via a cloud-computing environment in accordance with an example.

In another example, as illustrated in FIG. 5*c*, a repeater system may not include an integrated display (e.g., a carrier-specific information display 510 that can be integrated with the n-band repeater). In this example, the local device 512 (or a mobile device or UE) can be configured to display the carrier-specific information. In this example, a remote display can be configured to display the carrier-specific information.

Figure 5D:
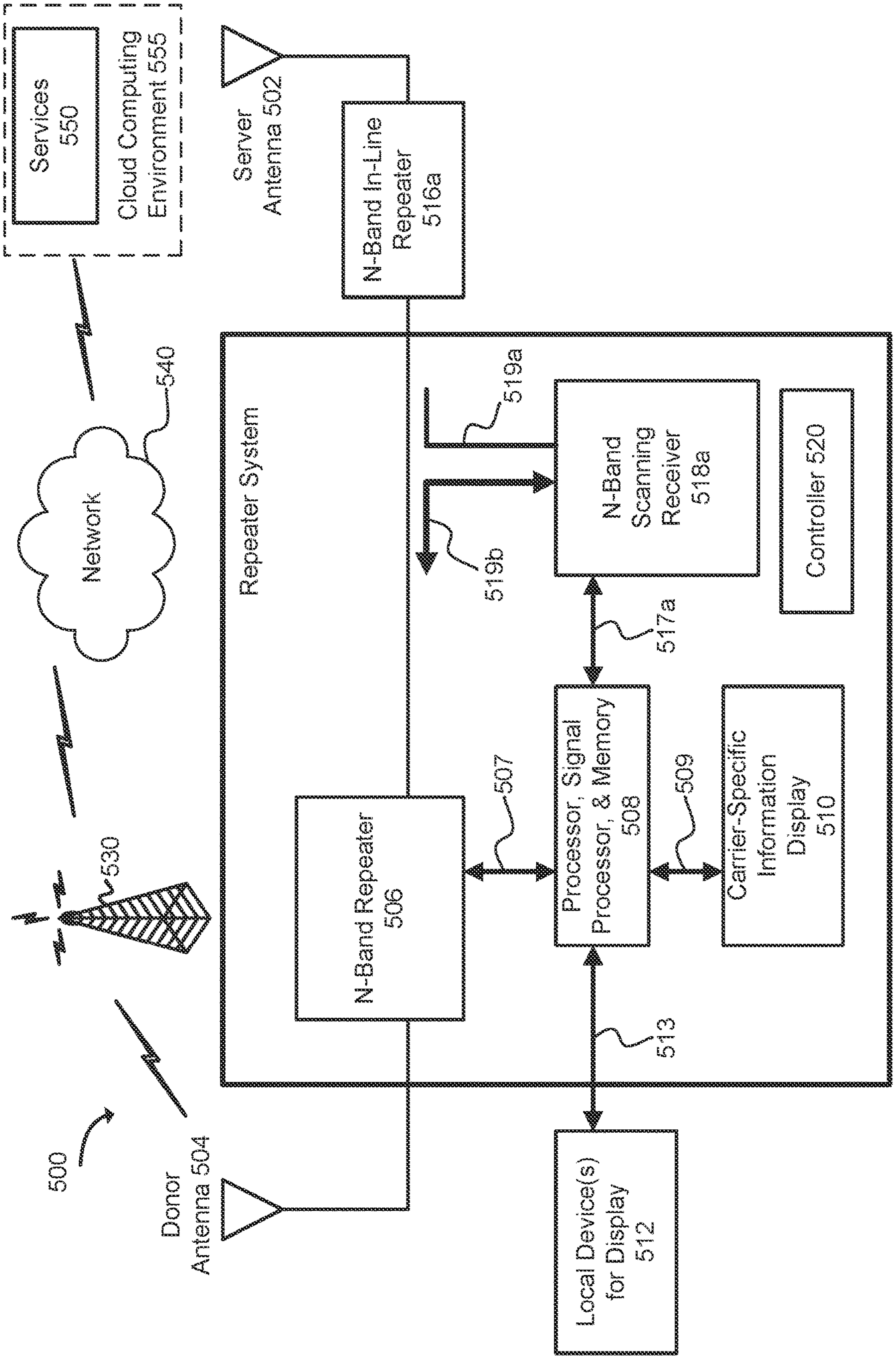
FIG. 5*d* illustrates a repeater system configured to provide services via a cloud-computing environment in accordance with an example.

In another example, as illustrated in FIG. 5*d*, a wideband repeater system can further comprise an n-band scanning receiver 518*a*. The n-band scanning receiver 518*a* can be configured to be coupled to the one or more processors, signal processors, or memory 508. The n-band scanning receiver 518*a* can be configured to scan one or more of then bands of the n-band repeater 506 and communicate carrier-specific information for the one or more of the n bands to a server located in the cloud-computing environment 555 to enable access to the carrier-specific information from the cloud-computing environment 555.

In another example, the carrier-specific information can include carrier-specific information for a plurality of carriers in each band of the one or more of the n-bands. In one example, a band Y can include a first frequency range for a first carrier (e.g., Carrier A) and a second frequency range for a second carrier (e.g., Carrier B). In this example, the carrier-specific information can include: carrier-specific information for Carrier A and carrier-specific information for Carrier B when Carrier A and Carrier B operate in the same band Y.

In another example, the n-band scanning receiver 518*a* can be configured to determine the carrier-specific information from one or more of: a downlink signal received via the donor port from the donor antenna 504, an uplink signal received via the server port from the server antenna 502 via an interface 519*a*; or the one or more processors, signal processors, or memory 508 via the interface 517*a*. In another example, the n-band scanning receiver 518*a* can be configured to communicate with the n-band repeater 506 via the interface 519*b*.

In another example, the n-band scanning receiver 518*a* can comprise one or more transmitters. The one or more transmitters can be configured to transmit the carrier-specific information to a base station 530 for communication to the server located in the cloud-computing environment 555 via a network. In another example, the one or more transmitters can be configured to transmit the carrier-specific information to a signal transmitted via the donor port to the donor antenna 504 for communication to a base station 530 for communication to the server located in the cloud-computing environment 555.

In another example, the n-band scanning receiver 518*a* can be one or more of: a modem, a field-programmable gate array (FPGA), or an application-specific integrated circuit (ASIC).

In another example, the carrier-specific information for the one or more of the n-bands can include one or more of: a carrier name; one or more operating frequencies or operating frequency ranges; one or more channels for one or more operating bands; a direction of a cell tower from the n-band repeater 506; a location of the cell tower relative to the n-band repeater; a location of the cell tower; one or more of a time or date of a transmission or reception at the n-band repeater; a reference signal received power (RSRP); a reference signal received quality (RSRQ); a received signal strength indicator (RSSI); an arbitrary strength unit (ASU); a reference signal (RS) signal-to-noise ratio (RSSNR); an Evolved-Universal Mobile Telecommunication System (UMTS) Terrestrial Radio Access Network (E-UTRAN) cell identifier (ECI); or a tracking area code (TAC).

In another example, the carrier specific information can include one or more of: automatic gain control (AGC) information for control of the n-band repeater 506; antenna steering information for control of one or more antennas associated with the n-band repeater 506; or antenna positioning information for control of a position of one or more antennas (e.g., server antenna 502 or donor antenna 504) associated with the n-band repeater 506.

Figure 5E:
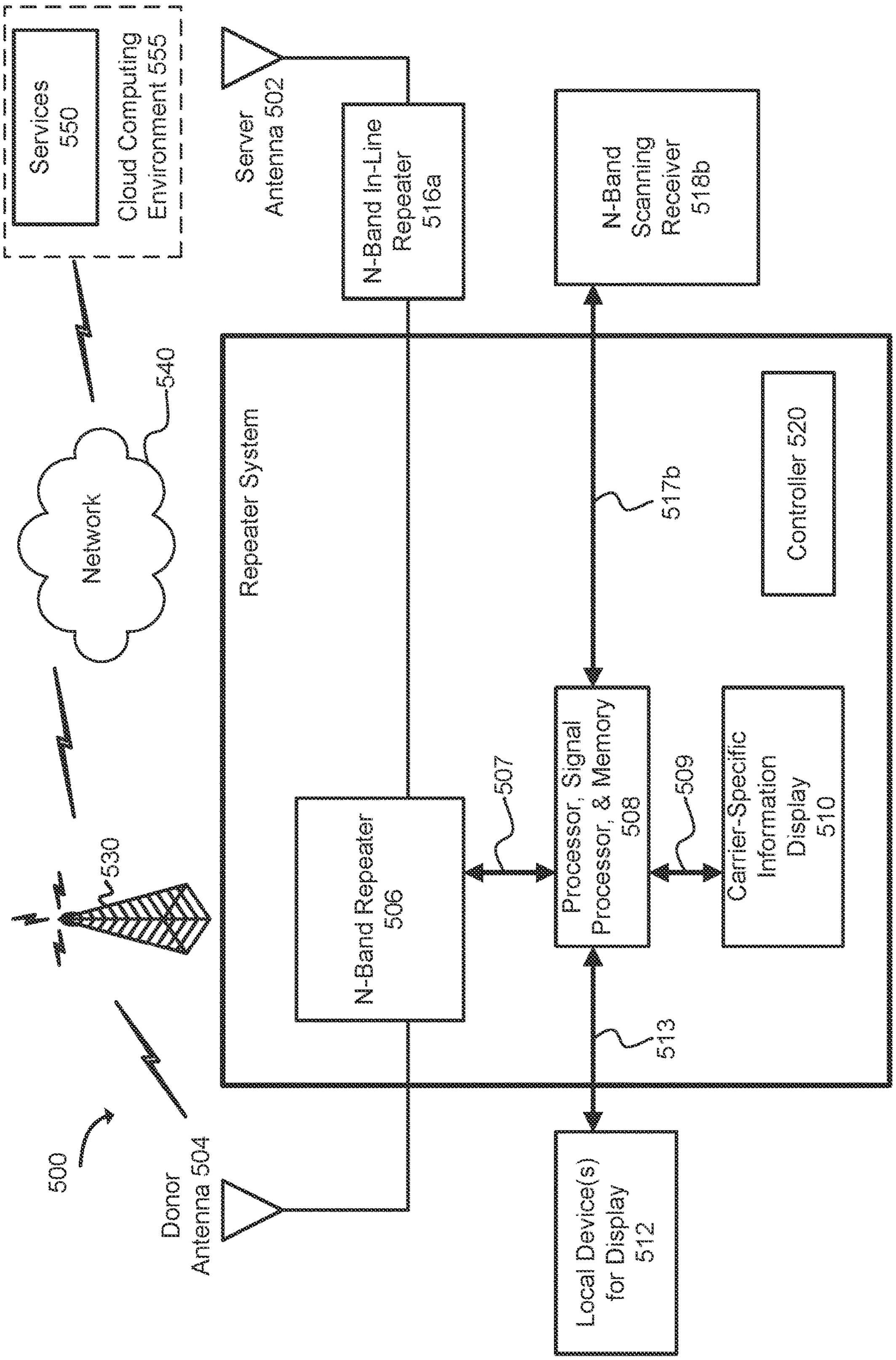
FIG. 5*e* illustrates a repeater system configured to provide services via a cloud-computing environment in accordance with an example.

In another example, as illustrated in FIG. 5*e*, an n-band scanning receiver 518*b* may not be integrated with the n-band repeater 506. In this example, the n-band scanning receiver 518*b* can be configured to communicate with the one or more processors, signal processors, or memory 508 via a wired, wireless, optical, or radio frequency interface 517*b*.

Figure 5F:
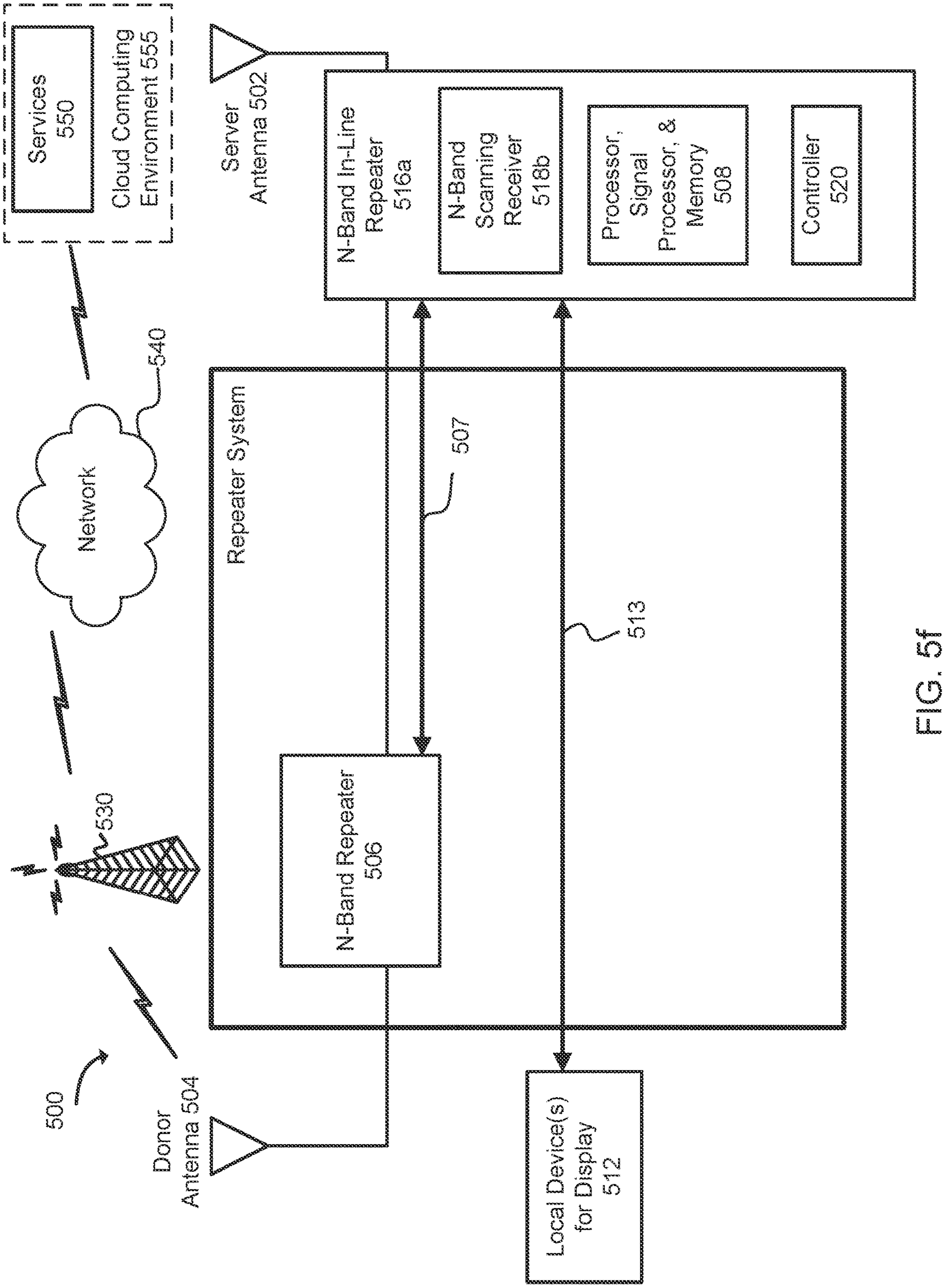
FIG. 5*f* illustrates a repeater system configured to provide services via a cloud-computing environment in accordance with an example.

In another example, as illustrated in FIG. 5*f*, one or more of: an n-band scanning receiver 518*b*; the one or more processors, signal processors, or memory 508; or the controller 508 can be configured to be housed within the n-band in-line repeater 516*a*. The n-band in-line repeater 516*a* can be configured to be connected to the n-band repeater 506 via the interface 507. The n-band in-line repeater 516*a* can be configured to be connected to a local device for display 512 via the interface 513.

Figure 6A:
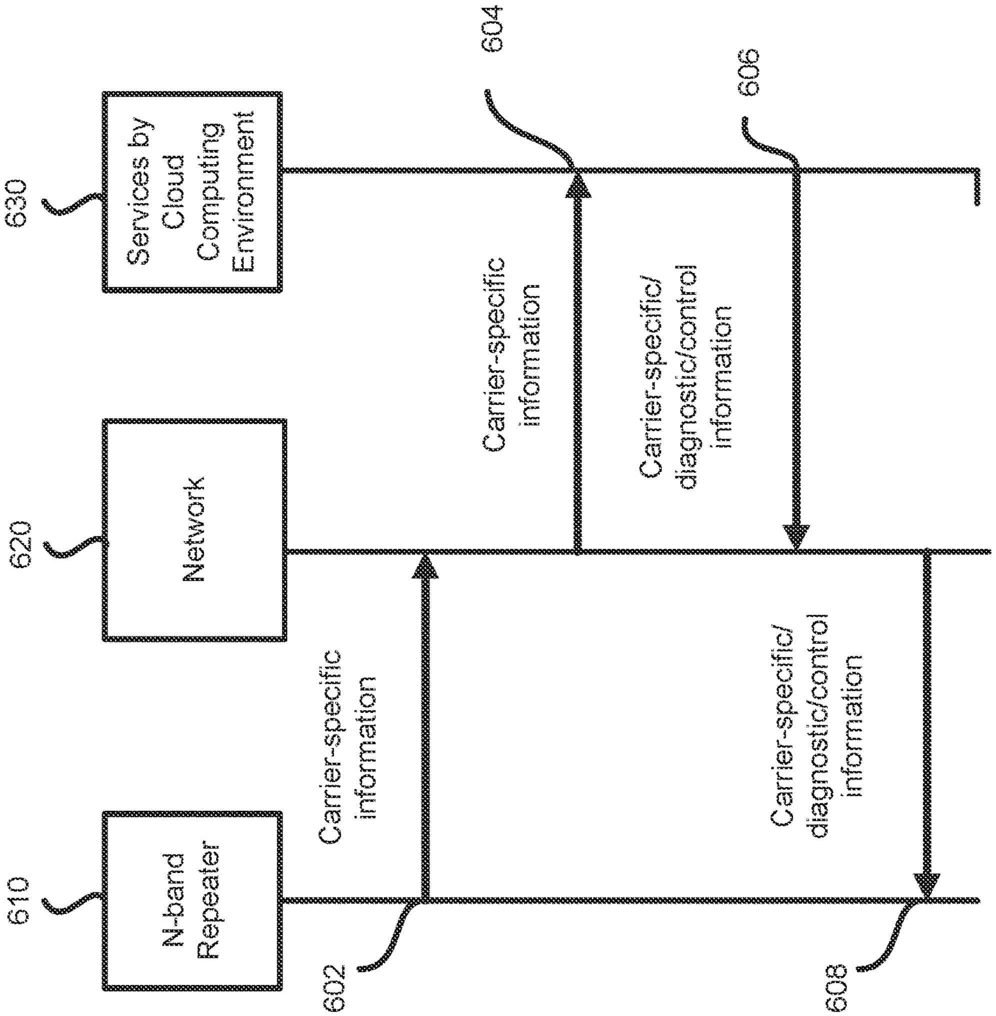
FIG. 6*a* depicts functionality of a repeater system configured to provide services via a cloud-computing environment in accordance with an example.

In another example, as depicted in FIG. 6*a*, a repeater system can be configured to communicate with a cloud-computing environment. In one example, an n-band repeater 610 can be configured to communicate carrier-specific information to a network 620, as depicted in operation 602. In one example, a network 620 can be configured to communicate the carrier-specific information to services 630, as depicted in operation 604. In one example, services 630 can be configured to communicate one or more of carrier-specific information, diagnostic information, or control information to the network 620, as depicted in operation 606. In one example, the network 620 can be configured to communicate one or more of carrier-specific information, diagnostic information, or control information to the n-band repeater 610 for display or control, as depicted in operation 608.

Figure 6B:
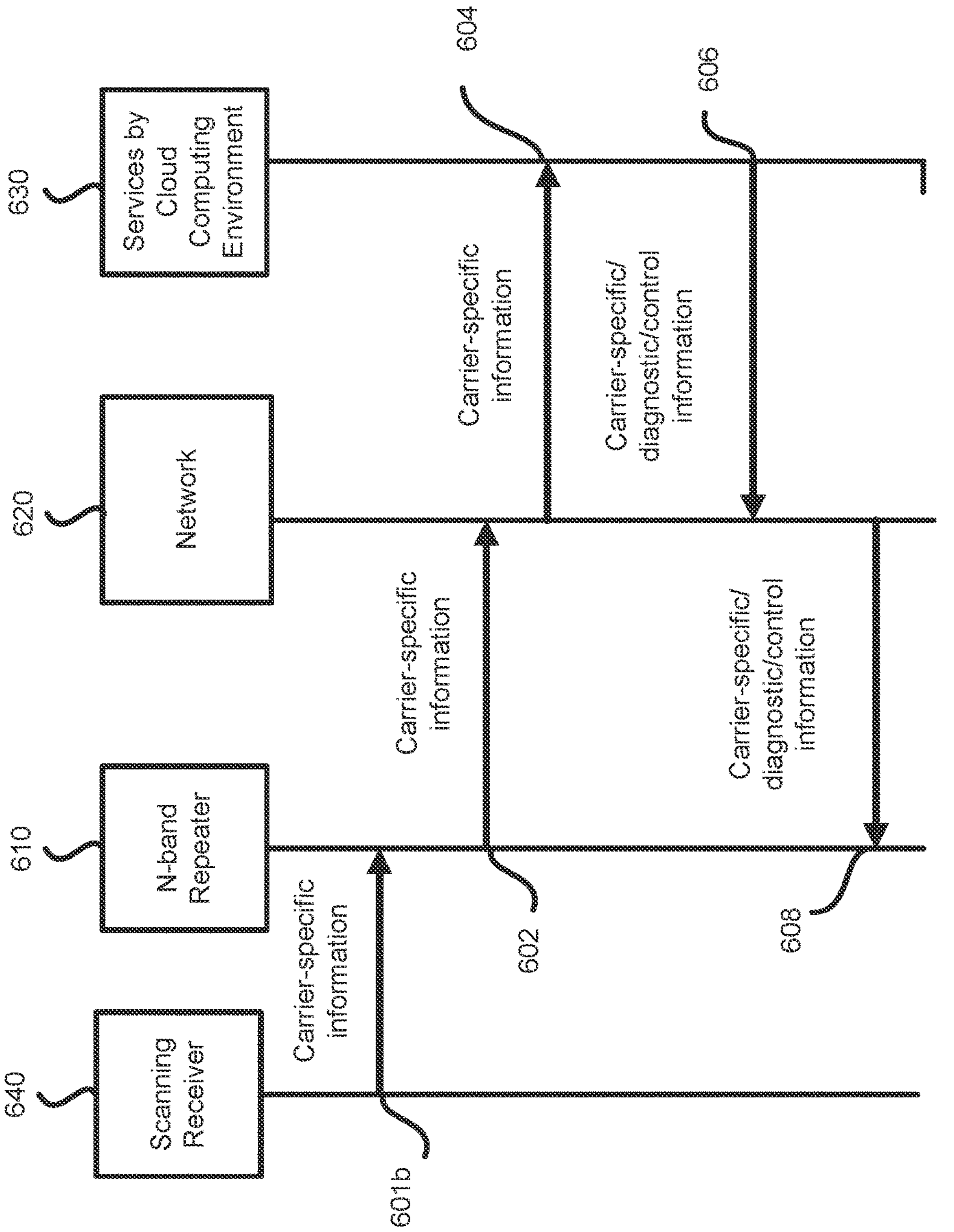
FIG. 6*b* depicts functionality of a repeater system configured to provide services via a cloud-computing environment in accordance with an example.

In another example, as depicted in FIG. 6*b*, a scanning receiver 640 can be configured to communicate the carrier-specific information to the n-band repeater 610, as depicted in operation 601*b*.

Figure 6C:
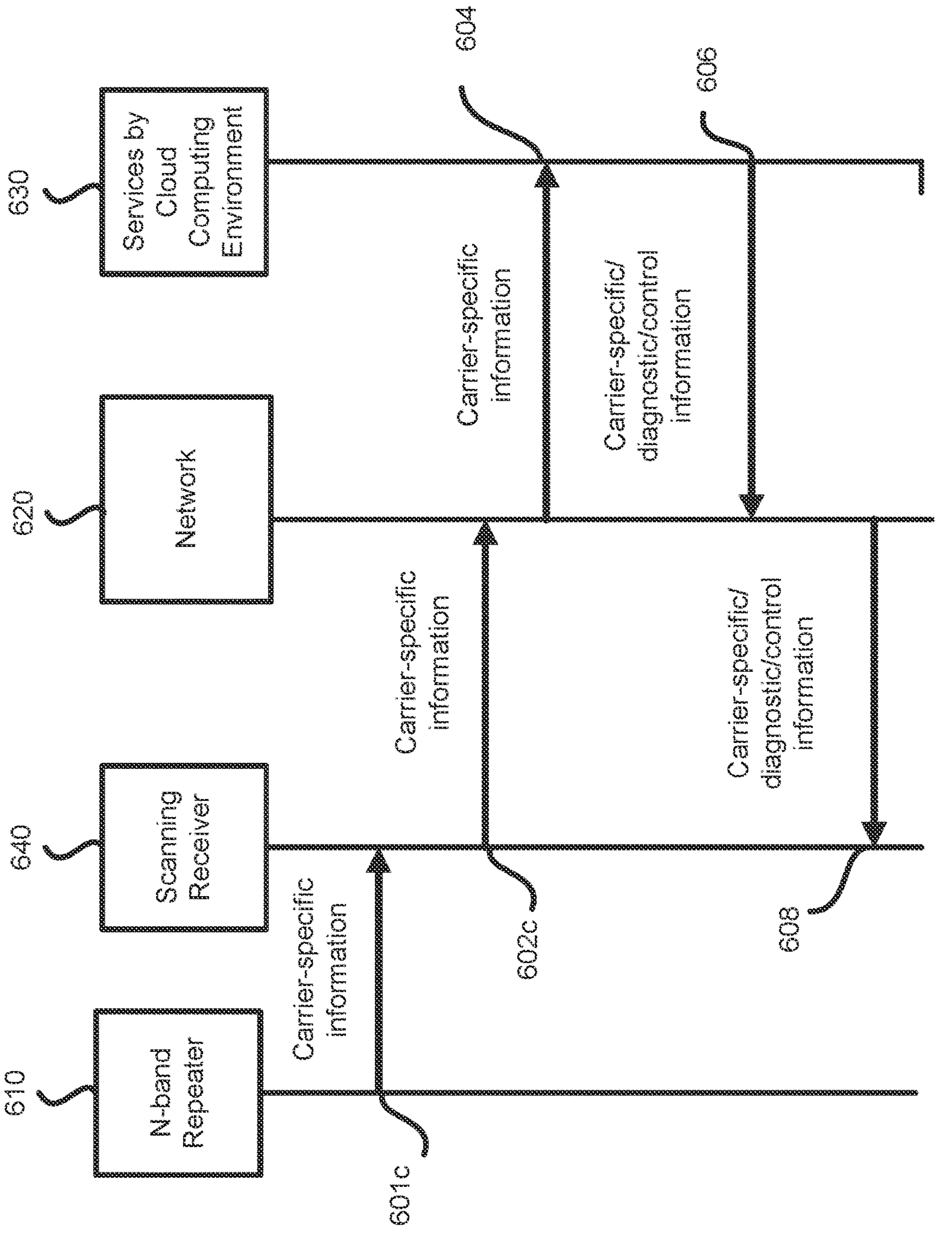
FIG. 6*c* depicts functionality of a repeater system configured to provide services via a cloud-computing environment in accordance with an example.

In another example, as depicted in FIG. 6*c*, an n-band repeater 610 can be configured to communicate the carrier specific information to a scanning receiver 640, as depicted in operation 601*c*. In another example, the scanning receiver 640 can be configured to communicate the carrier-specific information to the network 620, as depicted in operation 602*c*.

Figure 6D:
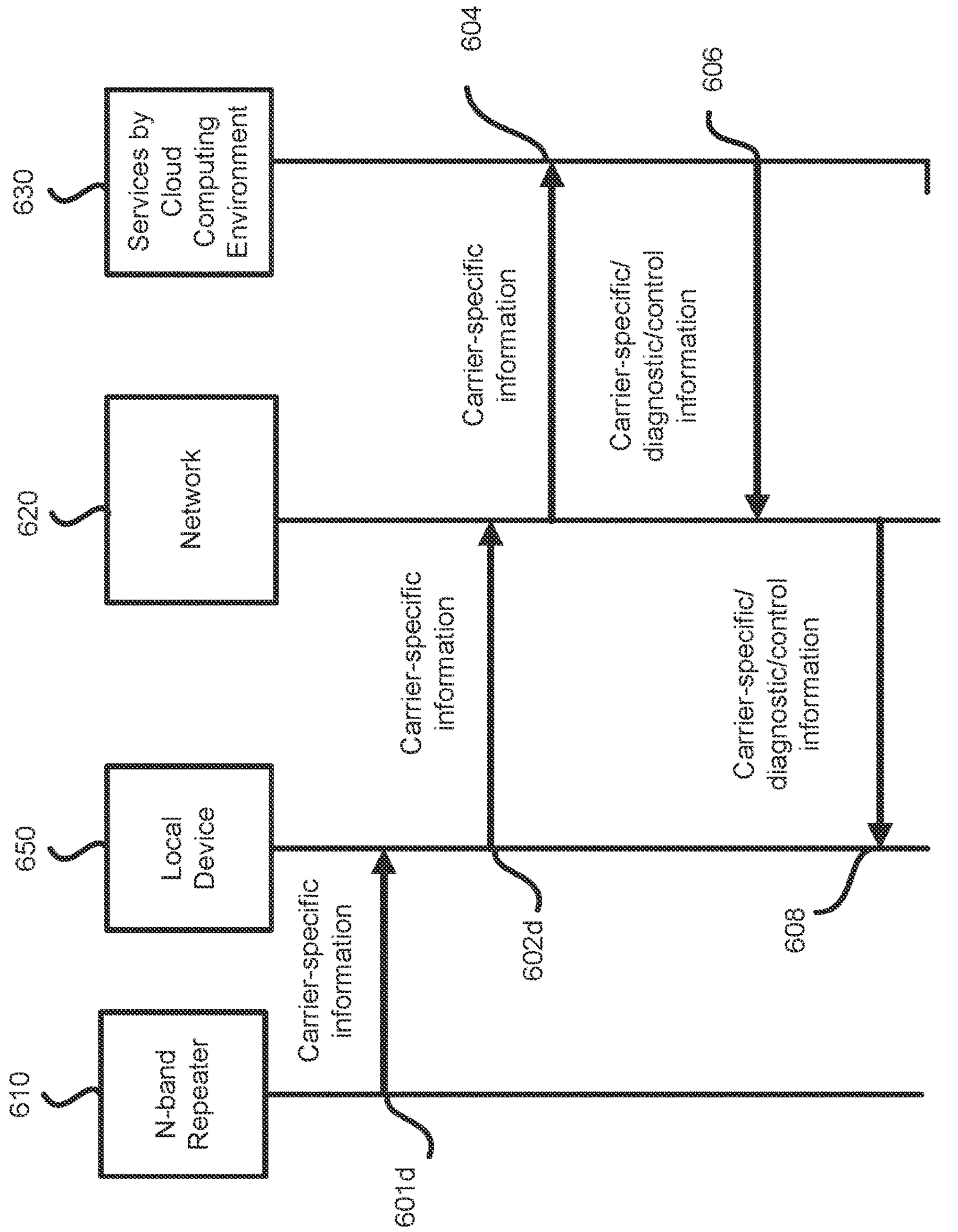
FIG. 6*d* depicts functionality of a repeater system configured to provide services via a cloud-computing environment in accordance with an example.

In another example, as depicted in FIG. 6*d*, an n-band repeater 610 can be configured to communicate the carrier specific information to a local device 650, as depicted in operation 601*d*. In another example, the local device 650 can be configured to communicate the carrier-specific information to the network 620, as depicted in operation 602*d*.

Figure 7A:
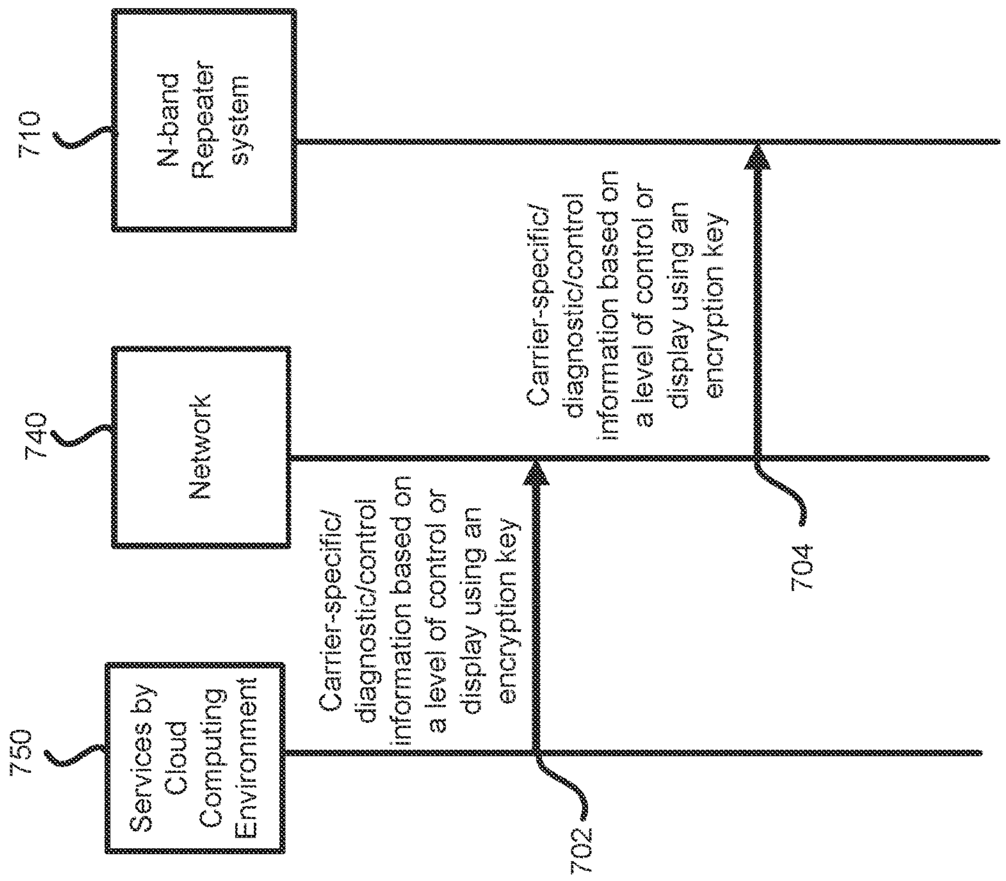
FIG. 7*a* illustrates a repeater system configured to provide services via a cloud-computing environment in accordance with an example.

In another example, as depicted in FIG. 7*a*, services 750 can be configured to provide one or more of carrier-specific information, diagnostic information, or control information to an n-band repeater system 710 via a network 740, as depicted in operations 702 and 704. The one or more of carrier-specific information, diagnostic information, or control information can be modified based on a level of control. The level of control can be provided using an encryption key. In one example, the one or more of carrier-specific information, diagnostic information, or control information can be modified to display a range of information from no information, partial information, or full information based on the encryption key (i.e. a level of control granted to a user). In one example, the one or more of carrier-specific information, diagnostic information, or control information can be modified to control a range of controllable functions from no controllable functions, partial controllable functions, or full controllable functions based on the encryption key.

In another example, an encryption key can be configured to grant a user a specific access level to the repeater system. The access level can include: full access to the repeater system's software and hardware functions; limited access to the repeater system's software and hardware functions; or no access to the system's software and hardware functions. Each user can be granted a desired level of access. Each encryption key can be configured to enable the user to have a desired level of access to control and/or monitor the repeater system.

Figure 7B:
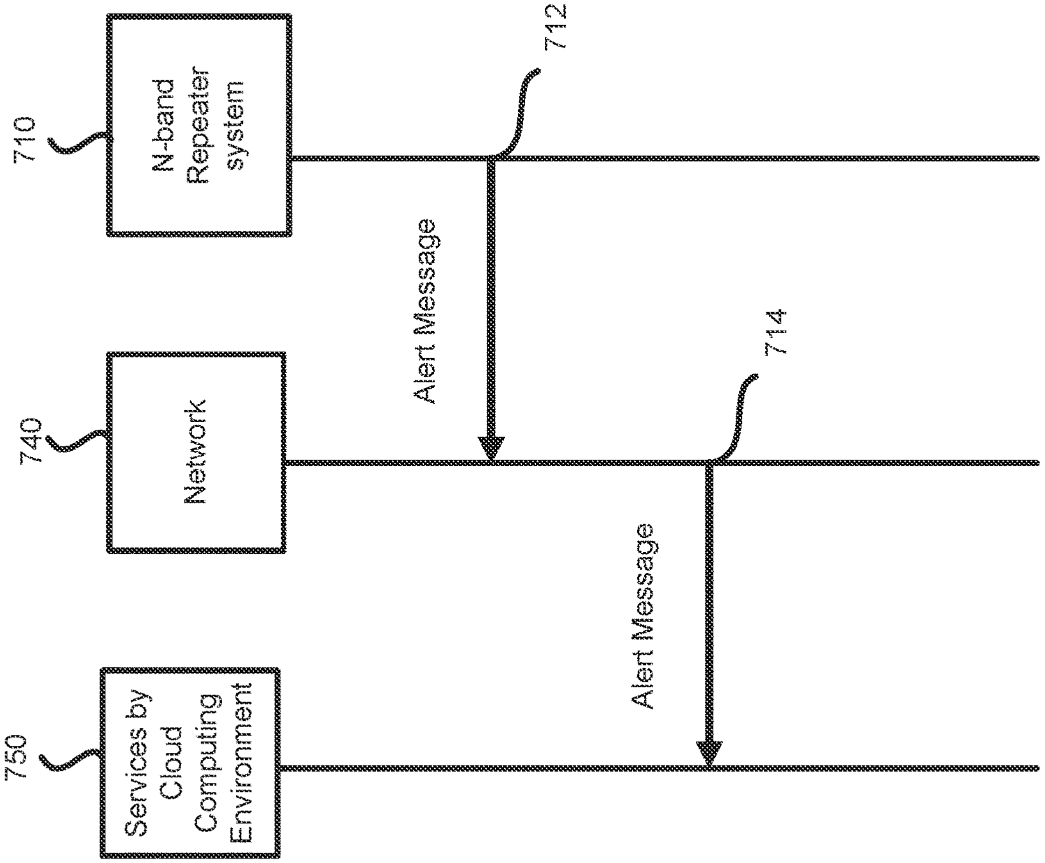
FIG. 7*b* illustrates a repeater system configured to provide services via a cloud-computing environment in accordance with an example.

In another example, as illustrated in FIG. 7*b*, an alert message (e.g., a message that includes information about tampering or unauthorized use by a user or non-user) can be communicated between the N-band repeater system 710 and services 750 via the network 740. An alert message 712 can be communicated between the N-band repeater system 710 and the network 740. An alert message 714 can be communicated between the network 740 and services 750.

In another example, the alert message can be configured to be communicated via one or more of a text or an email between the N-band repeater system 710 and a UE associated with services 750. In another example, the alert message can be configured to be communicated via remote console messaging to a UE associated with services 750.

In another example, the alert message can be configured to provide information in real time to services 750. The alert message can be configured based on service level agreement failure indicators. The alert message can be configured to provide information to services 750 to enable successful services operations. The alert message can also include information to inform services 750 of tampering of the n-band repeater system 710 by a user. The alert message can also inform services 750 of any other unauthorized use by a non-user.

Figure 8:
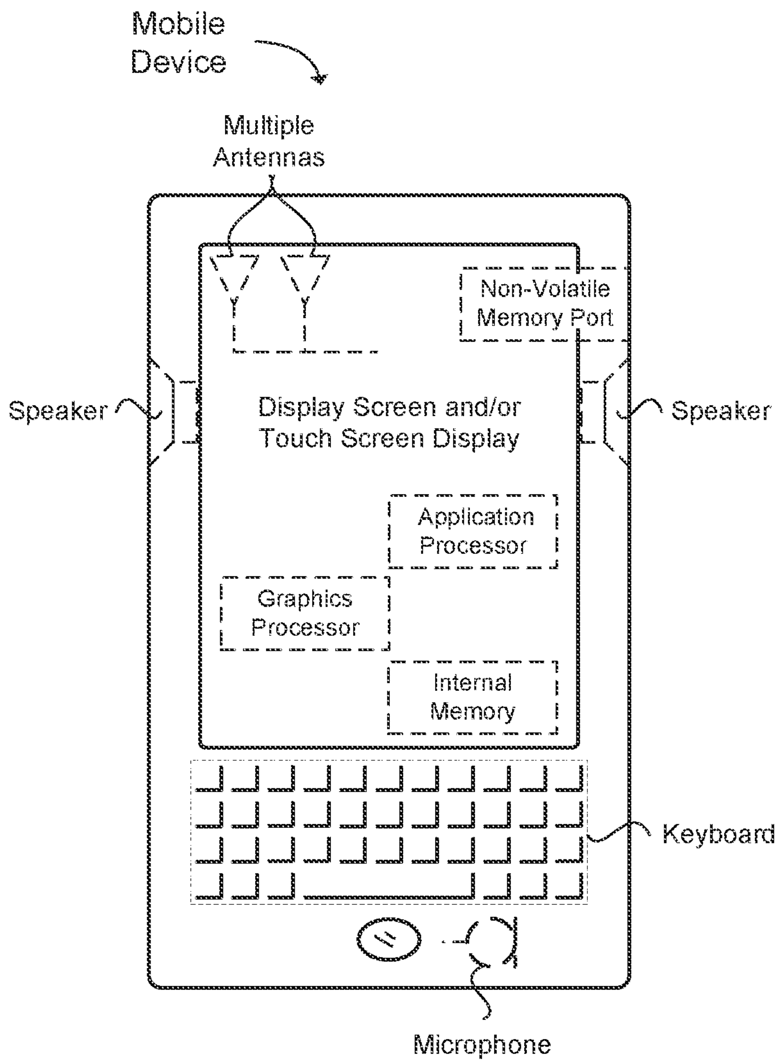
FIG. 8 illustrates a user equipment (UE) in accordance with an example.

FIG. 8 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a new radio node B (gNB) a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, 3GPP 5G, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 8 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Figure 9:
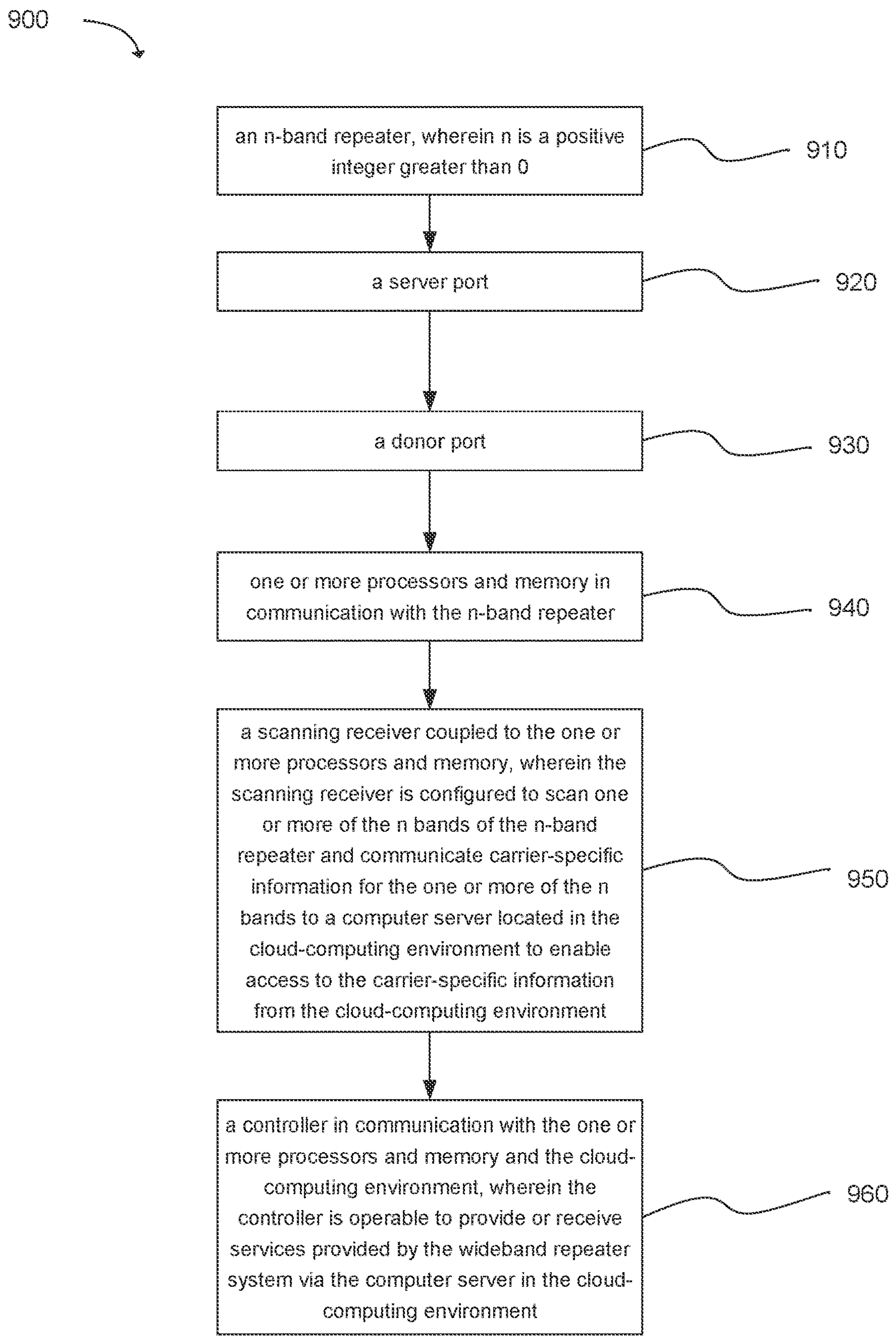
FIG. 9 depicts functionality of a wideband repeater system configured to provide services via a cloud-computing environment in accordance with an example.

Another example provides functionality for a wideband repeater system 900, as shown in the flow chart in FIG. 9. The wideband repeater system can comprise: an n-band repeater, wherein n is a positive integer greater than 0, as shown in block 910. The wideband repeater system can comprise: a server port, as shown in block 920. The wideband repeater system can comprise: a donor port, as shown in block 930. The wideband repeater system can comprise one or more processors and memory in communication with the n-band repeater, as shown in block 940. The wideband repeater system can comprise a scanning receiver coupled to the one or more processors and memory, wherein the scanning receiver is configured to scan one or more of the n bands of the n-band repeater and communicate carrier-specific information for the one or more of the n bands to a server located in the cloud-computing environment to enable access to the carrier-specific information from the cloud-computing environment, as shown in block 950. The wideband repeater system can comprise a controller in communication with the one or more processors and memory and the cloud-computing environment, wherein the controller is operable to control services provided by the wideband repeater system via the server in the cloud-computing environment, as shown in block 960.

Figure 10:
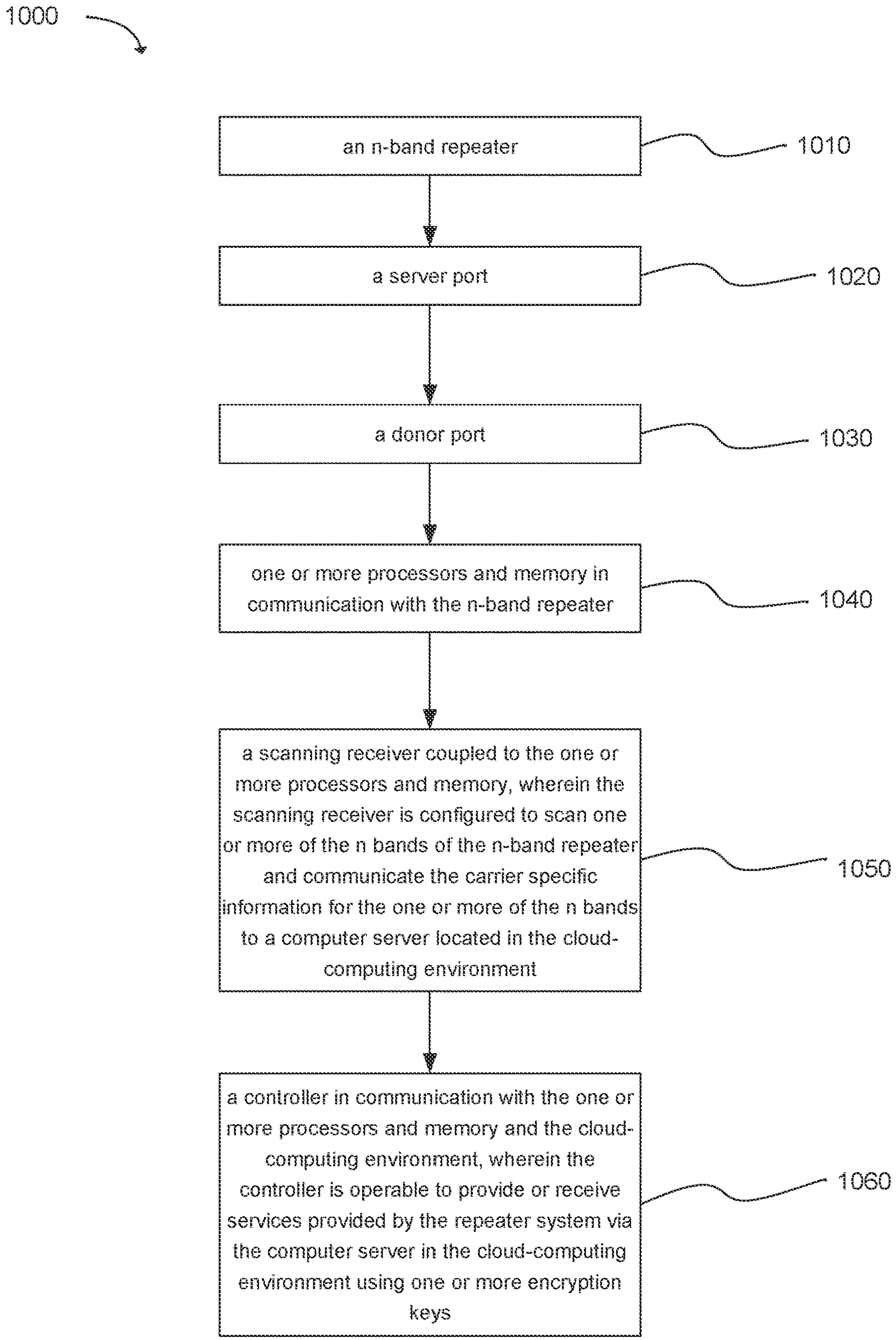
FIG. 10 depicts functionality of a wideband repeater system configured to provide services via a cloud-computing environment in accordance with an example.

Another example provides functionality for a wideband repeater system 1000 configured to provide services via a cloud-computing environment, as shown in the flow chart in FIG. 10. The wideband repeater system can comprise: an n-band repeater, as shown in block 1010. The wideband repeater system can comprise: a server port, as shown in block 1020. The wideband repeater system can comprise a donor port, as shown in block 1030. The wideband repeater system can comprise one or more processors and memory in communication with the n-band repeater, as shown in block 1040. The wideband repeater system can comprise a scanning receiver coupled to the one or more processors and memory, wherein the scanning receiver is configured to scan one or more of the n bands of the n-band repeater and communicate the carrier specific information for the one or more of the n bands to a server located in the cloud-computing environment, as shown in block 1050. The wideband repeater system can comprise a controller in communication with the one or more processors and memory and the cloud-computing environment, wherein the controller is operable to control services provided by the repeater system via the server in the cloud-computing environment using one or more encryption keys, as shown in block 1060.

Figure 11:
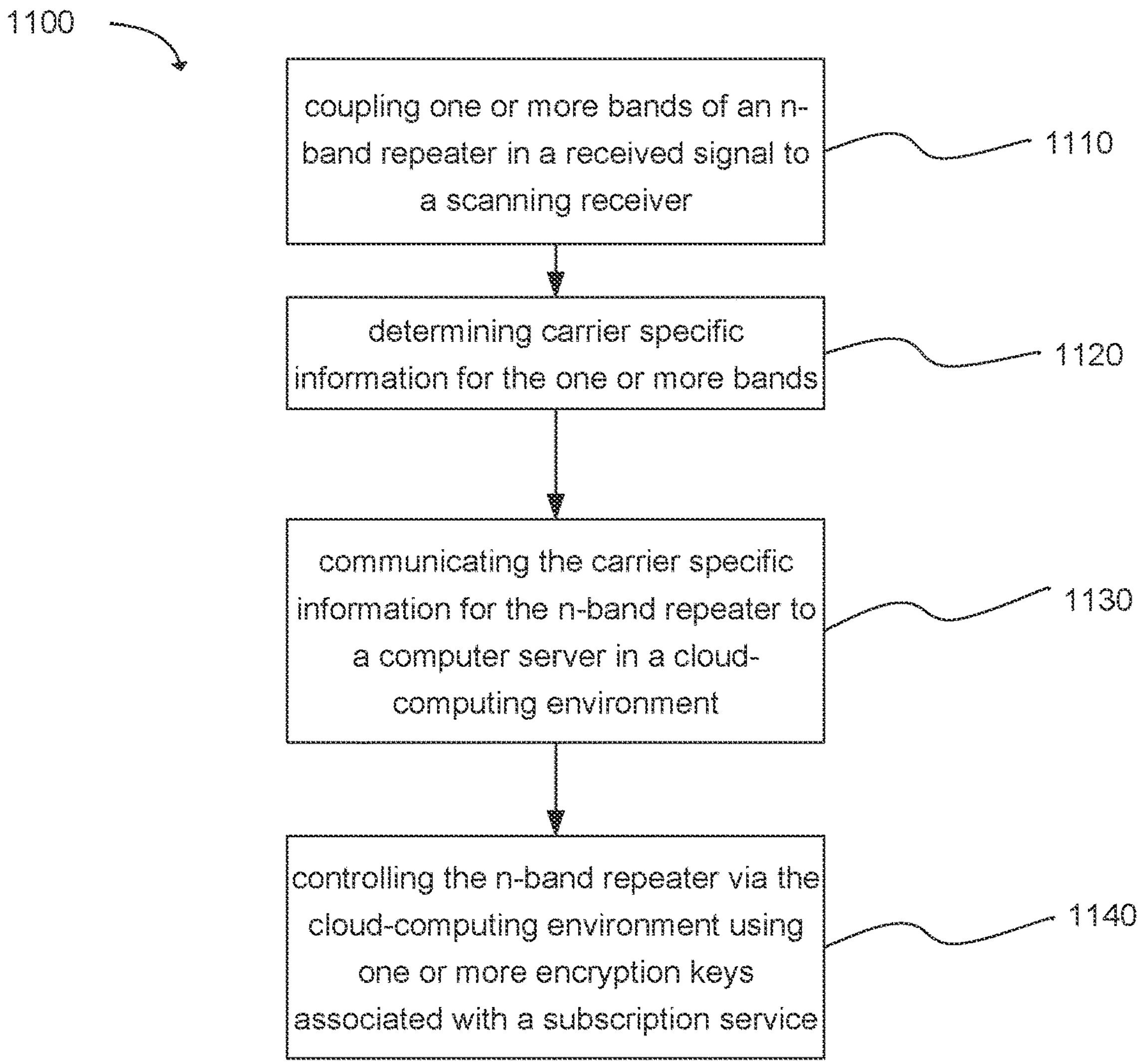
FIG. 11 depicts a method for providing n-band repeater services via a cloud-computing environment in accordance with an example.

Another example provides a method 1100 for providing n-band repeater services via a cloud-computing environment, as shown in the flow chart in FIG. 11. The method can comprise: coupling one or more bands of an n-band repeater in a received signal to a scanning receiver, as shown in block 1110. The method can comprise determining carrier specific information for the one or more bands, as shown in block 1120. The method can comprise communicating the carrier specific information for the n-band repeater to a server in a cloud-computing environment, as shown in block 1130. The method can comprise controlling the n-band repeater via the cloud-computing environment using the one or more encryption keys associated with a subscription service, as shown in block 1154.

Figure 12:
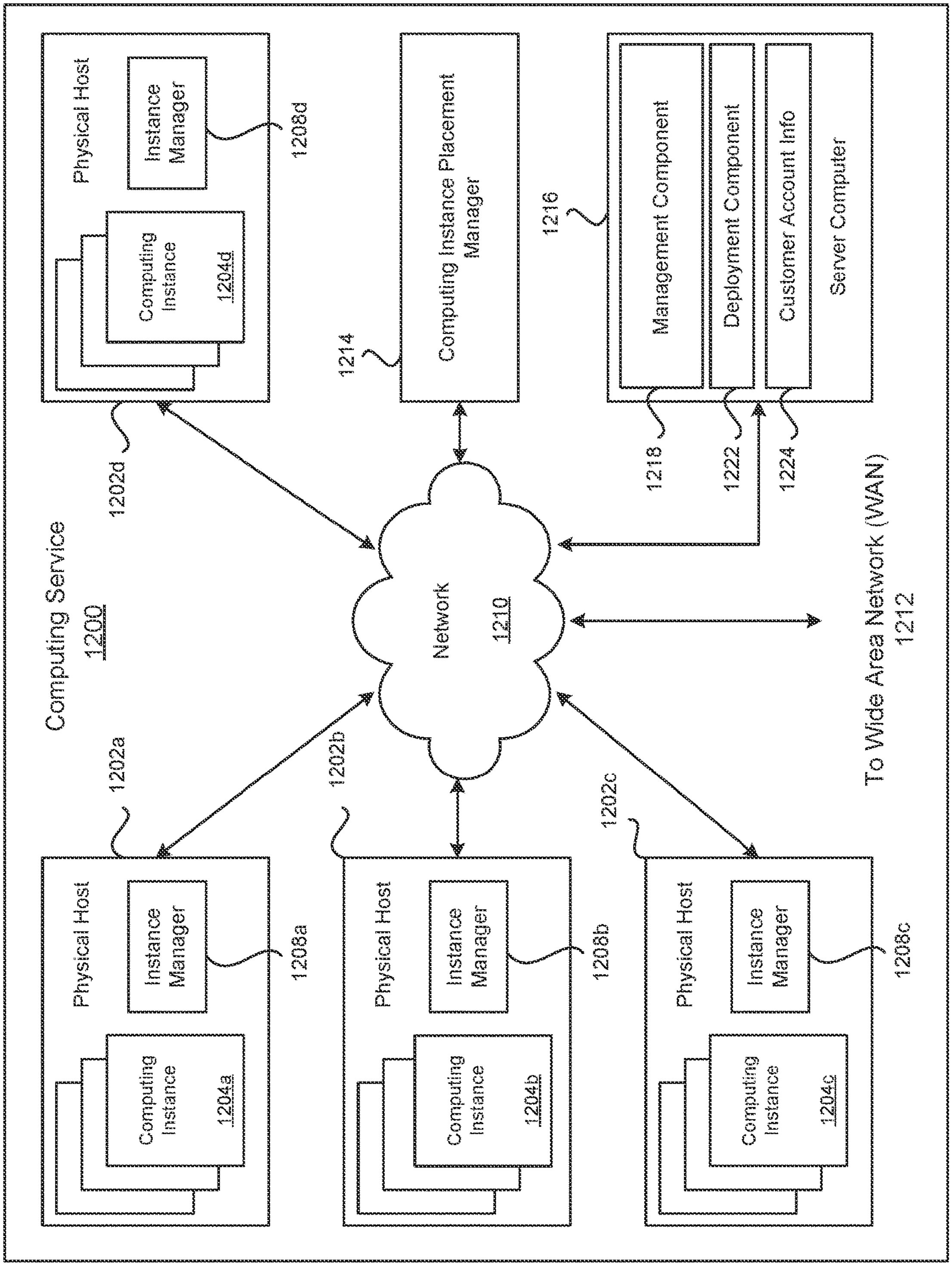
FIG. 12 illustrates a block diagram that illustrates an example computing service environment (CSE)

FIG. 12 is a block diagram illustrating an example computing service 1200 that may be used to execute and manage a number of computing instances 1204*a-d*. In particular, the computing service 1200 depicted illustrates one environment in which the technology described herein may be used. The computing service 1200 may be one type of environment that includes various virtualized service resources that may be used, for instance, to host computing instances 1204*a-d*.

The computing service 1200 may be capable of delivery of computing, storage and networking capacity as a software service to a community of end recipients. In one example, the computing service 1200 may be established for an organization by or on behalf of the organization. That is, the computing service 1200 may offer a "private cloud environment." In another example, the computing service 1200 may support a multi-tenant environment, wherein a plurality of customers may operate independently (i.e., a public cloud environment). Generally speaking, the computing service 1200 may provide the following models: Infrastructure as a Service ("IaaS"), Platform as a Service ("PaaS"), and/or Software as a Service ("SaaS"). Other models may be provided. For the IaaS model, the computing service 1200 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 1200. End customers may access the computing service 1200 using networked client devices, such as desktop computers, laptops, tablets, smartphones, etc. running web browsers or other lightweight client applications, for example. Those familiar with the art will recognize that the computing service 1200 may be described as a "cloud" environment or a "cloud-computing" environment.

In some embodiments, a cloud-computing environment can also include remote control, wherein "remote control" is control of an apparatus from a distance by signals transmitted from a remote device. In some examples, the signals can be radio frequency (RF) signals. In other examples, the signals can be infrared (IR) signals. The distance can vary based on the capabilities of the remote device. In some examples, the remote device can transmit control information over a localized distance (e.g., about 50 meters or less). In other examples, the remote device can transmit control information over a wide distance (e.g., about 5 kilometers (km), 25 km, 50 km). In other examples, the remote device can transmit information over a global distance through network intermediaries.

The particularly illustrated computing service 1200 may include a plurality of server computers 1202*a-d*. While four server computers are shown, any number may be used, and large data centers may include thousands of server computers. The computing service 1200 may provide computing resources for executing computing instances 1204*a-d*. Computing instances 1204*a-d* may, for example, be virtual machines. A virtual machine may be an instance of a software implementation of a machine (i.e. a computer) that executes applications like a physical machine. In the example of a virtual machine, each of the server computers 1202*a-d* may be configured to execute an instance manager 1208*a-d* capable of executing the instances. The instance manager 1208*a-d* may be a hypervisor, virtual machine monitor (VMM), or another type of program configured to enable the execution of multiple computing instances 1204*a-d* on a single server. Additionally, each of the computing instances 1204*a-d* may be configured to execute one or more applications.

One or more server computers 1214 and 1216 may be reserved to execute software components for managing the operation of the computing service 1200 and the computing instances 1204*a-d*. For example, a server computer 1214 may execute a computing instance placement manager that may perform functions, such as querying the server computers 1202*a-d* for available computing slots and computing group state information, as well as determining a placement of a computing instance 1204*a-d* in an available computing slot.

A server computer 1216 may execute a management component 1218. A customer may access the management component 1218 to configure various aspects of the operation of the computing instances 1204*a-d* purchased by a customer. For example, the customer may setup computing instances 1204*a-d* and make changes to the configuration of the computing instances 1204*a-d*.

A deployment component 1222 may be used to assist customers in the deployment of computing instances 1204*a-d*. The deployment component 1222 may have access to account information associated with the computing instances 1204*a-d*, such as the name of an owner of the account, credit card information, country of the owner, etc. The deployment component 1222 may receive a configuration from a customer that includes data describing how computing instances 1204*a-d* may be configured. For example, the configuration may include an operating system, provide one or more applications to be installed in computing instances 1204*a-d*, provide scripts and/or other types of code to be executed for configuring computing instances 1204*a-d*, provide cache logic specifying how an application cache should be prepared, and other types of information. The deployment component 1222 may utilize the customer-provided configuration and cache logic to configure, prime, and launch computing instances 1204*a-d*. The configuration, cache logic, and other information may be specified by a customer accessing the management component 1218 or by providing this information directly to the deployment component 1222.

Customer account information 1224 may include any desired information associated with a customer of the multi-tenant environment. For example, the customer account information may include a unique identifier for a customer, a customer address, billing information, licensing information, customization parameters for launching instances, scheduling information, etc. As described above, the customer account information 1224 may also include security information used in encryption of asynchronous responses to API requests. By "asynchronous" it is meant that the API response may be made at any time after the initial request and with a different network connection.

A network 1210 may be utilized to interconnect the computing service 1200 and the server computers 1202*a-d*, 1216. The network 1210 may be a local area network (LAN) and may be connected to a Wide Area Network (WAN) 1212 or the Internet, so that end customers may access the computing service 1200. The network topology illustrated in FIG. 12 has been simplified, many more networks and networking devices may be utilized to interconnect the various computing systems disclosed herein.

Figure 13A:
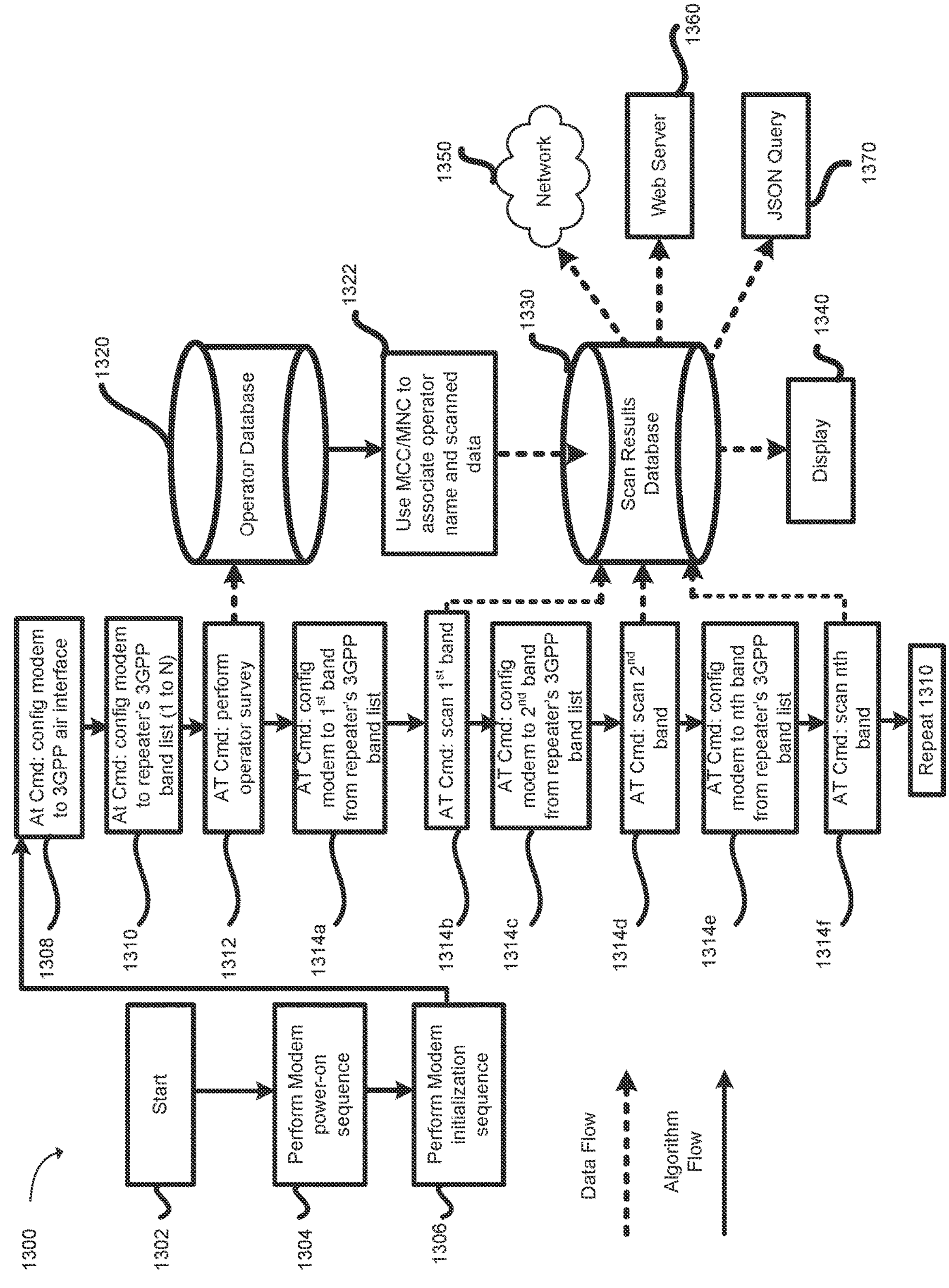
FIG. 13*a* depicts functionality of a scanning receiver in accordance with an example.
Figure 13B:
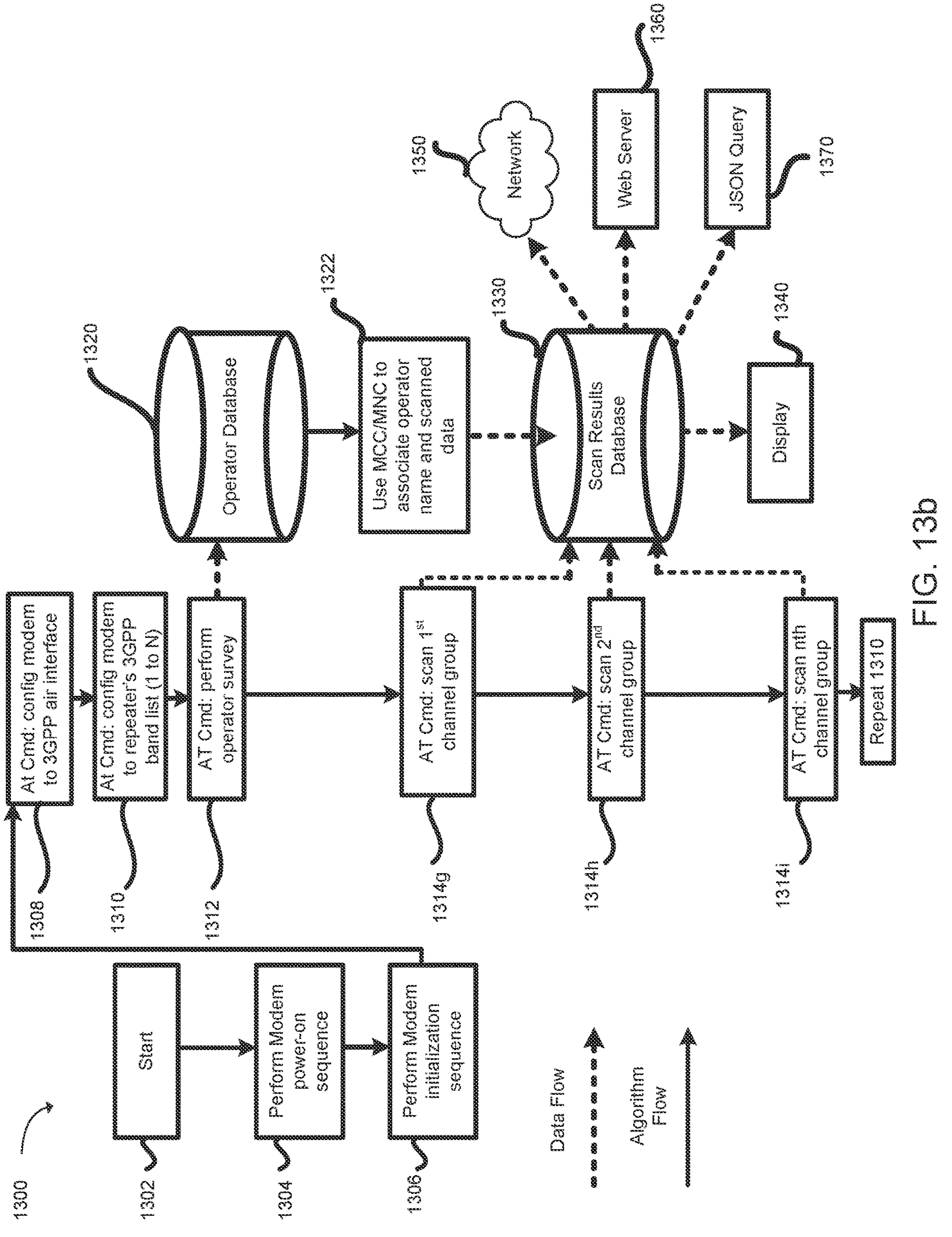
FIG. 13*b* depicts functionality of a scanning receiver in accordance with an example.
Figure 13C:
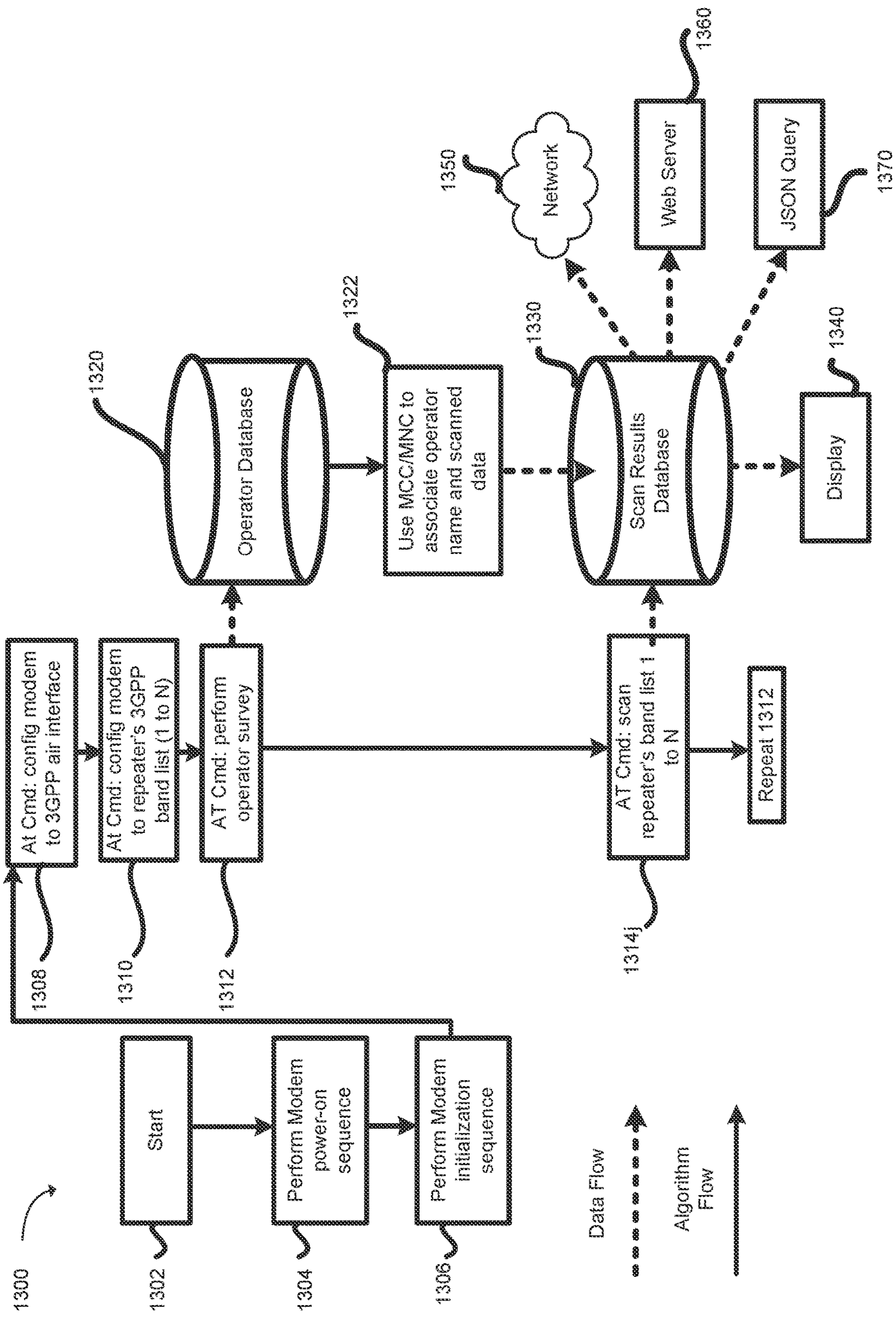
FIG. 13*c* depicts functionality of a scanning receiver in accordance with an example.

In another example, as illustrated in FIGS. 13*a*-13*c*, a scanning receiver can be configured to identify one or more frequency ranges associated with a plurality of cellular carriers. In one example, a scanning receiver can be configured to start, as depicted in operation 1302. In one example, a scanning receiver can be configured to perform a modem power-on sequence, as depicted in operation 1304. In one example, a scanning receiver can be configured to perform a modem initialization sequence, as depicted in operation 1306. In one example, the one or more frequency ranges can be received on a downlink (DL) from a base station.

In another example, the scanning receiver can be configured to use an "AT Cmd" to configure a modem to a Third Generation Partnership Project (3GPP) air interface (e.g., long-term evolution (LTE) fourth generation (4G) or fifth generation (5G)), as depicted in operation 1308. In another example, the scanning receiver can be configured to use an "AT Cmd" to configure the modem to a repeater's 3GPP band list (e.g., bands 1 through N, wherein N is a positive integer greater than 1), as depicted in operation 1310. In another example, the scanning receiver can be configured to perform an operator (e.g., cellular carrier) survey, as depicted in operation 1312.

In another example, operation 1308 can reduce the set of bands to about 56 total bands (e.g., the number of bands in 4G). In another example, operation 1310 can further reduce the set of bands to a subset of the 56 bands (e.g., six 4G bands for a repeater that is configured to be operable on six 4G bands). In another example, operation 1310 can further reduce the set of bands to a subset of the six 4G bands based on the operator survey. For example, 2 of the six 4G bands can be configured for Cellular Carrier AB, 3 of the six 4G bands can be configured for Cellular Carrier CD, and 1 of the six 4G bands can be configured for Cellular Carrier XY. In this example, operation 1310 can reduce the six 4G bands to the 3 of the six 4G bands configured for Cellular Carrier CD.

In another example, the operator survey (operation 1312) can include the transmission of data from the scanning receiver to an operator database 1320. The operator database can be based on one or more of a database of the scanning receiver (e.g., a modem) or supplemental information including cellular carriers not include in the modem. The operator database can be configured to use the mobile country code (MCC) and mobile network code (MNC) to associate the operator or cellular carrier name with the scanned data from the scanning receiver, as depicted in operation 1322. The resultant association between the cellular carrier names from the operator database and scanned data from the scanning receiver can be stored in a scan result database 1330. After an adequate period of time operating in a particular location, the operator database can include the operators in the location with updates to channels on a periodic basis.

In another example, information in the scan results database can be communicated to one or more of: a display 1340, a network 1350, a cloud computing environment (e.g., a message queuing telemetry transport (MQTT) cloud via an MQTT heartbeat message), an embedded web server 1360, or a local direct memory access (DMAC) controller (e.g., via a javascript object notation (JSON) query 1370 on demand).

In another example, the scanning receiver can be configured to scan the one or more frequency ranges. In one example, the one or more frequency ranges can be a 3GPP band list determined from one or more of operations 1308 and 1310. For example, when operations 1308 and 1310 have identified 3 frequency bands associated with Cellular Carrier CD (e.g., Band D, Band E, and Band F), then the scanning receiver can be configured to scan each of the 3 identified frequency bands associated with Cellular Carrier CD (e.g., Band D, Band E, and Band F).

In another example, the scanning receiver can be configured to scan the one or more frequency ranges sequentially. As illustrated in FIG. 13*a*, the scanning receiver can be configured to use an "AT Cmd" to configure the modem to a $1^{st}$ band from the repeater's 3GPP band list, as depicted in operation 1314*a*. In one example, the scanning receiver can be configured to use an "AT Cmd" to scan the $1^{st}$ band, as depicted in operation 1314*b*. The scanning receiver can be further configured to use an "AT Cmd" to configure the modem to the $2^{nd}$ band list from the repeater's 3GPP band list, as depicted in operation 1314*c*. In one example, the scanning receiver can be configured to use an "AT Cmd" to scan the $2^{nd}$ band, as depicted in operation 1314*d*. The scanning receiver can be further configured to use an "AT Cmd" to configure the modem to the $N^{th}$ band list from the repeater's 3GPP band list, as depicted in operation 1314*e*. In one example, the scanning receiver can be configured to use an "AT Cmd" to scan the $N^{th}$ band, as depicted in operation 1314*f*.

In another example, the scanning receiver can be configured to scan the one or more frequency ranges based on channel groups. As illustrated in FIG. 13*b*, the scanning receiver can be configured to use an "AT Cmd" to scan a $1^{st}$ channel group from the repeater's 3GPP channel list, as depicted in operation 1314*g*. In another example, the scanning receiver can be configured to use an "AT Cmd" to scan a $2^{nd}$ channel group from the repeater's 3GPP channel list, as depicted in operation 1314*h*. In another example, the scanning receiver can be configured to use an "AT Cmd" to scan a $3^{rd}$ channel group from the repeater's 3GPP channel list, as depicted in operation 1314*i*.

In another example, the scanning receiver can be configured to scan the one or more frequency ranges with a single "AT Cmd." As illustrated in FIG. 13*c*, the scanning receiver can be configured to use an "AT Cmd" to scan the repeater's 3GPP band list labeled 1 through N, as depicted in operation 1314*j*.

In another example, the scanning receiver can be configured to identify cellular carrier specific information for the one or more frequency ranges associated with the plurality of cellular carriers and provide the cellular carrier specific information to the repeater. In one example, the cellular carrier specific information can include one or more of: a carrier name; one or more operating frequencies; one or more channels; a direction of a cell tower from the n-band repeater; a location of a cell tower; a time and date of a transmission; a reference signal received power (RSRP); a reference signal received quality (RSRQ); a received signal strength indicator (RSSI); an arbitrary strength unit (ASU); a reference signal (RS) signal to noise ratio (SNR) (RSSNR); an Evolved-UMTS Terrestrial Radio Access Network (E-UTRAN) cell identifier (ECI); a physical cell identifier (PCI); a tracking area code (TAC); automatic gain control (AGC) information for control of the n-band repeater; antenna steering information for control of one or more antennas associated with the n-band repeater; or antenna positioning information for control of a position of one or more antennas associated with the n-band repeater.

In another example, the scanning receiver can be configured to scan the one or more frequency ranges of the plurality of cellular carriers without a subscriber identity module (SIM) card, as depicted in the operations in FIGS. 13*a* to 13*c*. The scanning receiver may not register, connect, or attached to a particular network, which allows operation without a SIM. Operating a scanning receiver without a SIM card can enable the scanning receiver to receive carrier-specific information from multiple cellular carriers without having a contract with multiple cellular carriers or paying fees to each of the cellular carriers. Further, operating a scanning receiver without a SIM card can prevent security issues arising from unauthorized SIM card intrusions. Further, the hardware complexity of the scanning receiver can be reduced with a reduction in the number of components.

In another example, the cellular carrier specific information can be scanned and periodically updated for display based on a selected time period. In one example, the selected time period can be less than one or more of: 24 hours, 12 hours, 1 hour, 5 minutes, 5 seconds, 1 second, 100 milliseconds (ms), or 1 ms. In another example, the cellular carrier specific information can include historical data.

In another example, the scanning receiver can be configured to interface with a remote control. As previously discussed, remote control can include control of an apparatus from a distance by signals transmitted from a remote device. In one example, the signals can be IR signals. In another example, the signals can be RF signals. In other examples, the remote device can transmit information through network intermediaries.

In another example, the scanning receiver can be a long term evolution (LTE) layer-1 modem that can be configured to scan the one or more frequency bands without using LTE layer-2 or LTE layer-3. The modem can further support LTE layer-2 and LTE layer-3 functionality. The modem can scan the one or more frequency bands without receiving handshake information or communication back to the source of the transmission (e.g., base station).

Figure 14A:
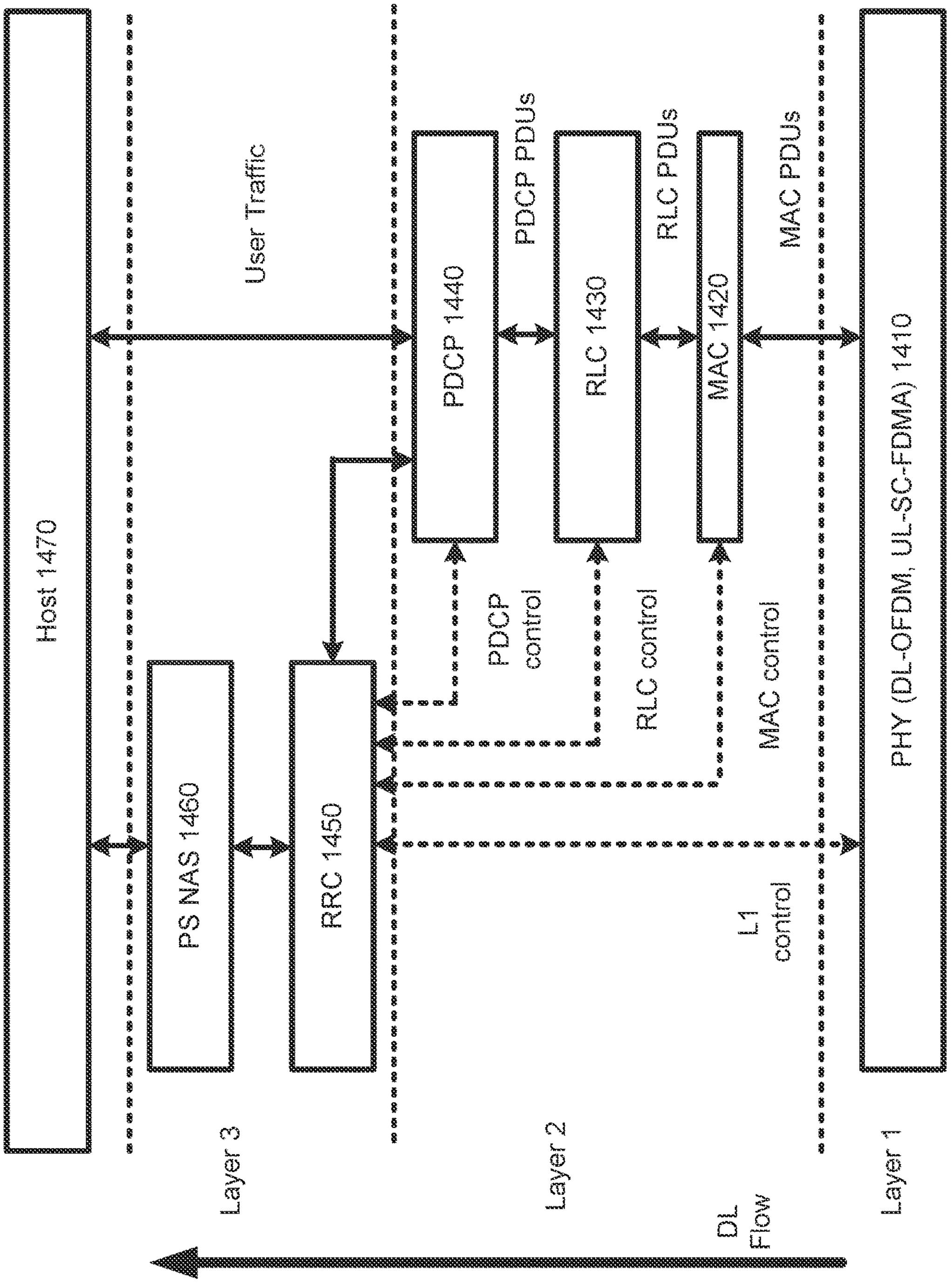
FIG. 14*a* illustrates a long term evolution (LTE) downlink (DL) radio protocol stack in accordance with an example.
Figure 14B:
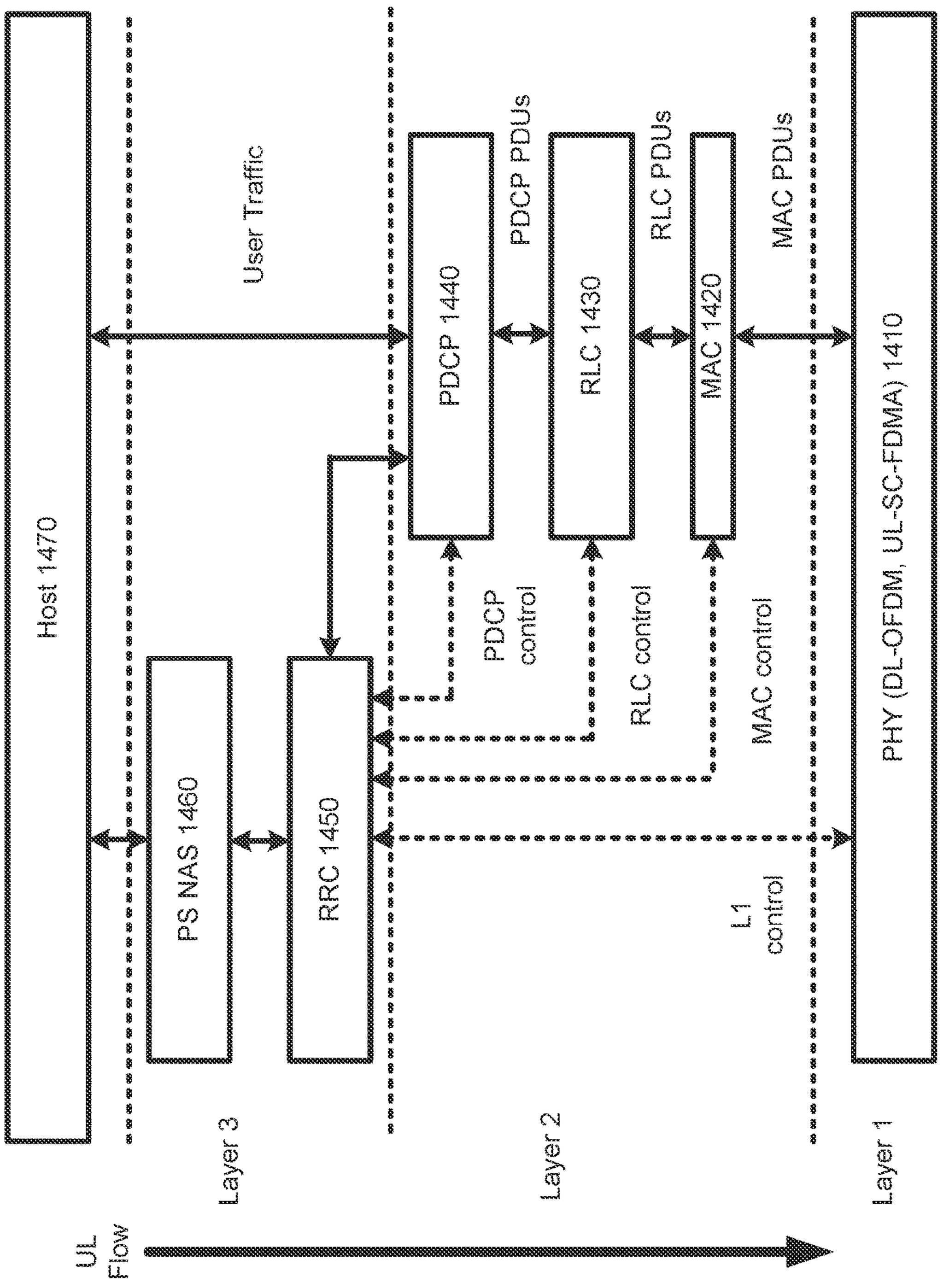
FIG. 14*b* illustrates a long term evolution (LTE) uplink (UL) radio protocol stack in accordance with an example.

In another example, as illustrated in FIGS. 14*a* and 14*b*, a downlink direction can progress from layer 1 to layer 3 and an uplink direction can progress from layer 3 to layer 1. In a DL direction, information can flow from the physical (PHY) layer 1410 to the medium-access control (MAC) layer 1420 to the radio link control (RLC) layer 1430, to the packet data convergence protocol (PDCP) layer 1440, and to the host 1470. Information can also flow from the physical layer 1410 to the radio resource control (RRC) layer 1450 to the non-access stratum (NAS) 1460, and to the host 1470. Control information can also flow from the PHY 1410, MAC 1420, RLC 1430, and PDCP 1440 to the RRC 1450. In an UL direction, information can flow in the opposite direction.

Layer 1 of the LTE stack can support: (i) DL and UL parameters (e.g., resource blocks, subcarriers per resource block, and subcarrier bandwidth), (ii) physical parameters (e.g., cyclic prefix (CP) length), (iii) 3GPP operation bands (e.g., FDD and TDD bands), (iv) frame structure (e.g., type 1 FDD, type 2 TDD), (v) UL/DL configurations (e.g., TDD configurations 0-6), (vi) modulation and demodulation (e.g., quaternary phase shift keying (QPSK), (vii) channel coding (e.g., turbo coding), (viii) DL physical channels (e.g., physical downlink shared channel (PDSCH), physical downlink control channel (PDCCH), Physical Control Format Indicator Channel (PCFICH, and the like), and (ix) UL physical channels (physical uplink shared channel (PUSCH), physical uplink control channel (PUCCH), and the like). Layer 2 of the LTE stack can include the MAC layer, the RLC layer, and the PDCP layer. Layer 3 of the LTE stack can include the RRC layer and the NAS layer. In this example, an LTE packet can progress from the PHY in layer 1 to the MAC the RLC, and the PDCP in layer 2, and to the RRC and NAS in layer 3. In this example, an LTE packet can progress from the NAS and RRC in layer 3 to the PDCP, the RLC, and the MAC in layer 2, and to the PHY in layer 1.

In another example, the scanning receiver can further comprise memory configured to store a list of the one or more frequency ranges. In another example, the scanning receiver can comprise a field programmable gate array (FPGA). The FPGA can include supporting circuitry. In another example, the scanning receiver can comprise an application-specific integrated circuit (ASIC).

In another example, a repeater system can comprise a repeater and a scanning receiver. The repeater can comprise a first port, a second port, and one or more amplification and filtering paths coupled between the first port and the second port. The repeater can further comprise one or more processors and memory configured to receive, from the scanning receiver, cellular carrier specific information for one or more frequency ranges of a plurality of cellular carriers. The one or more processor can be further configured to communicate cellular carrier specific information of a plurality of cellular carriers for display. The repeater can be a narrowband repeater, a wide-band repeater, or a cellular-carrier specific repeater. The repeater can be compatible with regulations defined for consumer signal boosters. The regulations defined for consumer signal boosters can include 47 Code of Federal Regulations (C.F.R.) Part 20.21 (Apr. 18, 2018).

In another example, the repeater system can further comprise a first display including one or more of: an integrated display, a mobile display, or a remote display.

In another example, the repeater can be configured to associate the cellular carrier specific information with the one or more cellular carriers. In another example, the repeater can be configured to communicate the cellular-carrier specific information for transmission and storage of the cellular-carrier specific information in a private computer server in a cloud computing environment. In another example, the repeater can be configured to provide the cellular carrier specific information for display.

Figure 15:
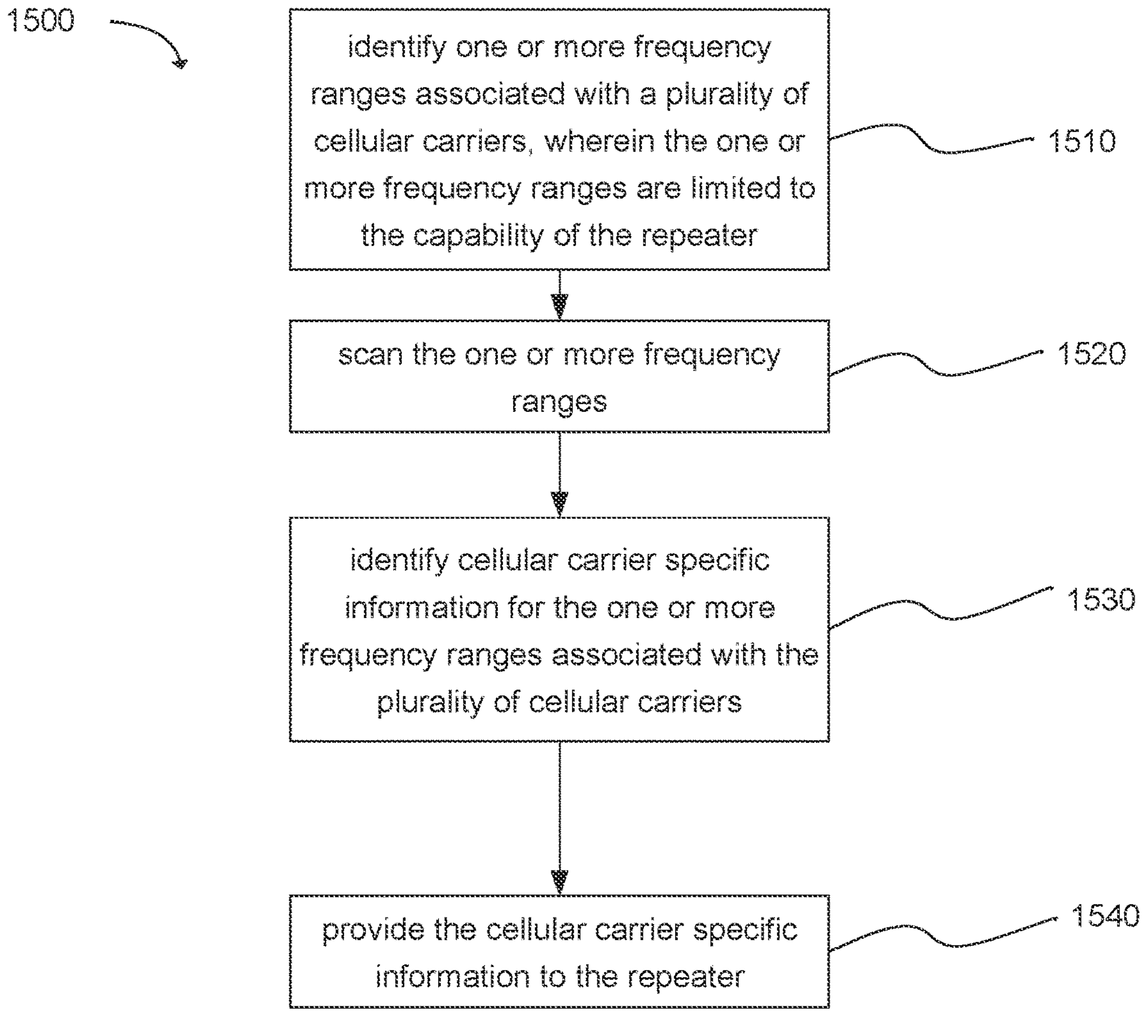
FIG. 15 depicts functionality of a repeater system in accordance with an example.

Another example provides functionality for a repeater system 1500, as shown in the flow chart in FIG. 15. The repeater system can comprise a repeater and scanning receiver. The repeater can comprise a first port, a second port, and one or more amplification and filtering paths coupled between the first port and the second port. The scanning receiver can be configured to identify one or more frequency ranges associated with a plurality of cellular carriers, wherein the one or more frequency ranges are limited to the capability of the repeater, as shown in block 1510. The scanning receiver can be configured to scan the one or more frequency ranges, as shown in block 1520. The scanning receiver can be configured to identify cellular carrier specific information for the one or more frequency ranges associated with the plurality of cellular carriers, as shown in block 1530. The scanning receiver can be configured to provide the cellular carrier specific information to the repeater, as shown in block 1540. The repeater can further comprise one or more processors and memory configured to communicate the cellular carrier specific information of the plurality of cellular carriers for display.

Figure 16:
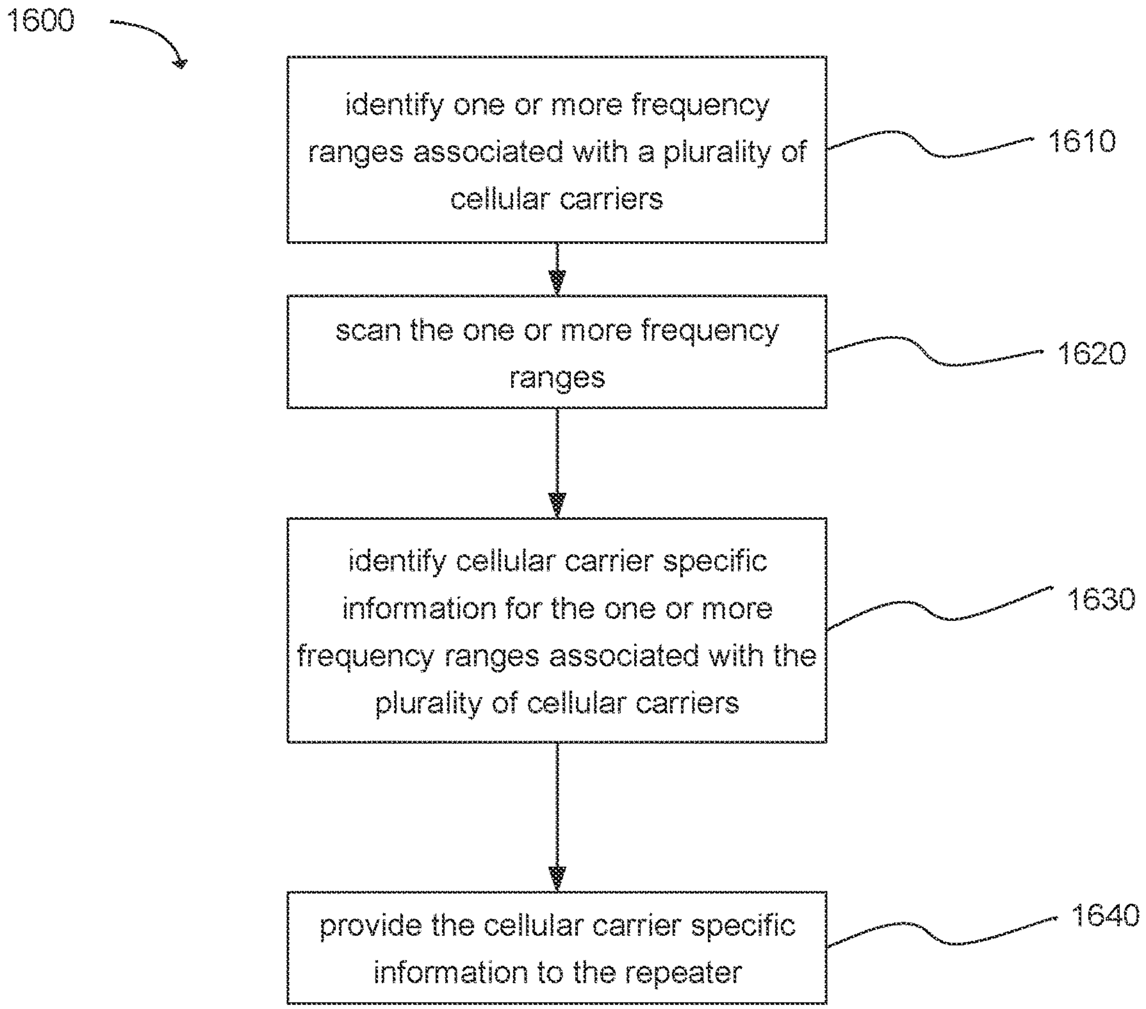
FIG. 16 depicts functionality of a scanning receiver in accordance with an example.

Another example provides functionality for a scanning receiver 1600, as shown in the flow chart in FIG. 16. The scanning receiver can be configured to identify one or more frequency ranges associated with a plurality of cellular carriers, as shown in block 1610. The scanning receiver can be configured to scan the one or more frequency ranges, as shown in block 1620. The scanning receiver can be configured to identify cellular carrier specific information for the one or more frequency ranges associated with the plurality of cellular carriers, as shown in block 1630. The scanning receiver can be configured to provide the cellular carrier specific information to the repeater, as shown in block 1640.

Figure 17:
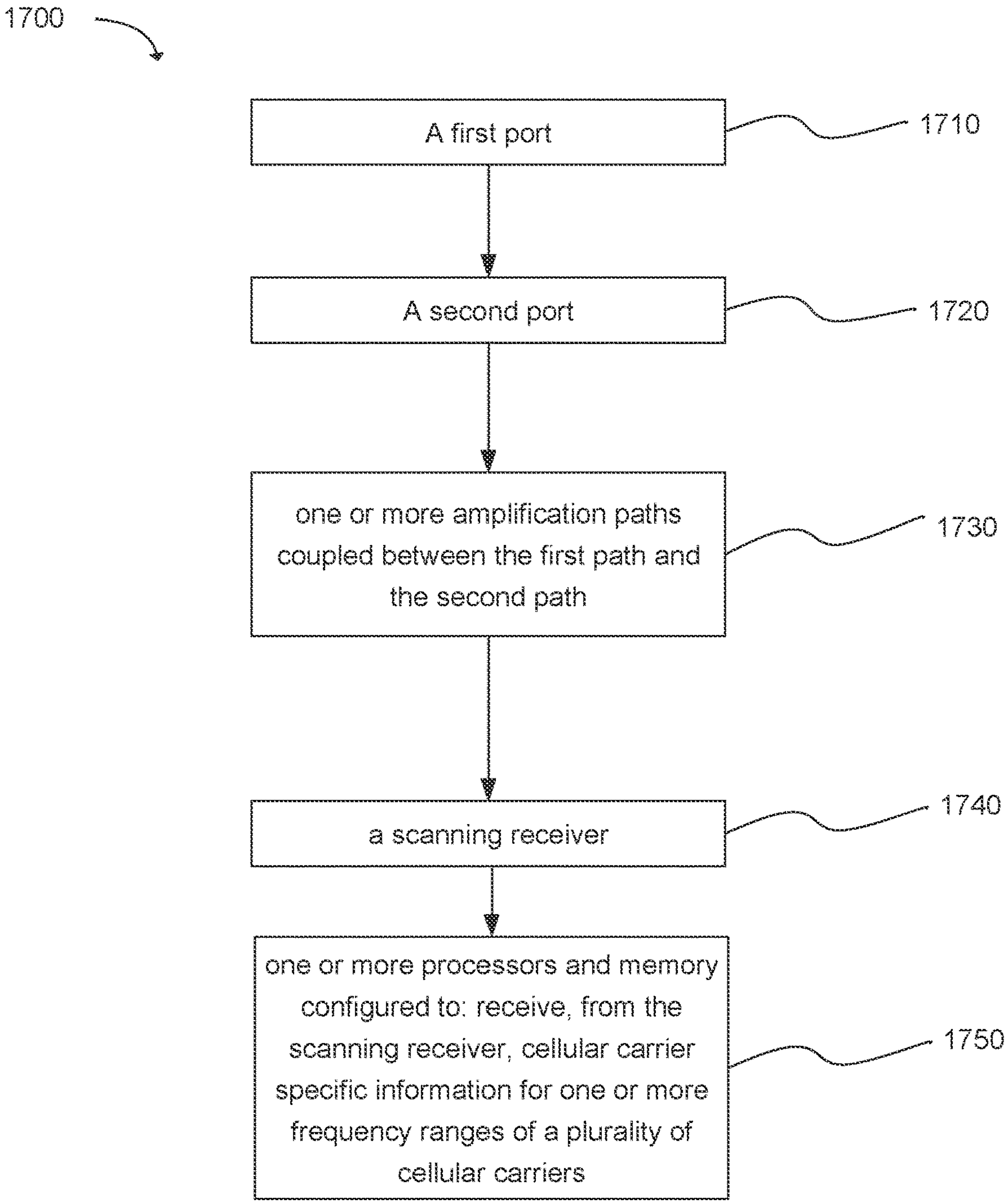
FIG. 17 depicts functionality of a repeater in accordance with an example.

Another example provides functionality for a repeater 1700, as shown in the flow chart in FIG. 17. The repeater can comprise a first port, as shown in block 1710. The repeater can comprise a second port, as shown in block 1720. The repeater can comprise one or more amplification paths coupled between the first path and the second path, as shown in block 1730. The repeater can comprise a scanning receiver, as shown in block 1740. The repeater can comprise one or more processors and memory configured to receive, from the scanning receiver, cellular carrier specific information for one or more frequency ranges of a plurality of cellular carriers, as shown in block 1750.

Figure 18:
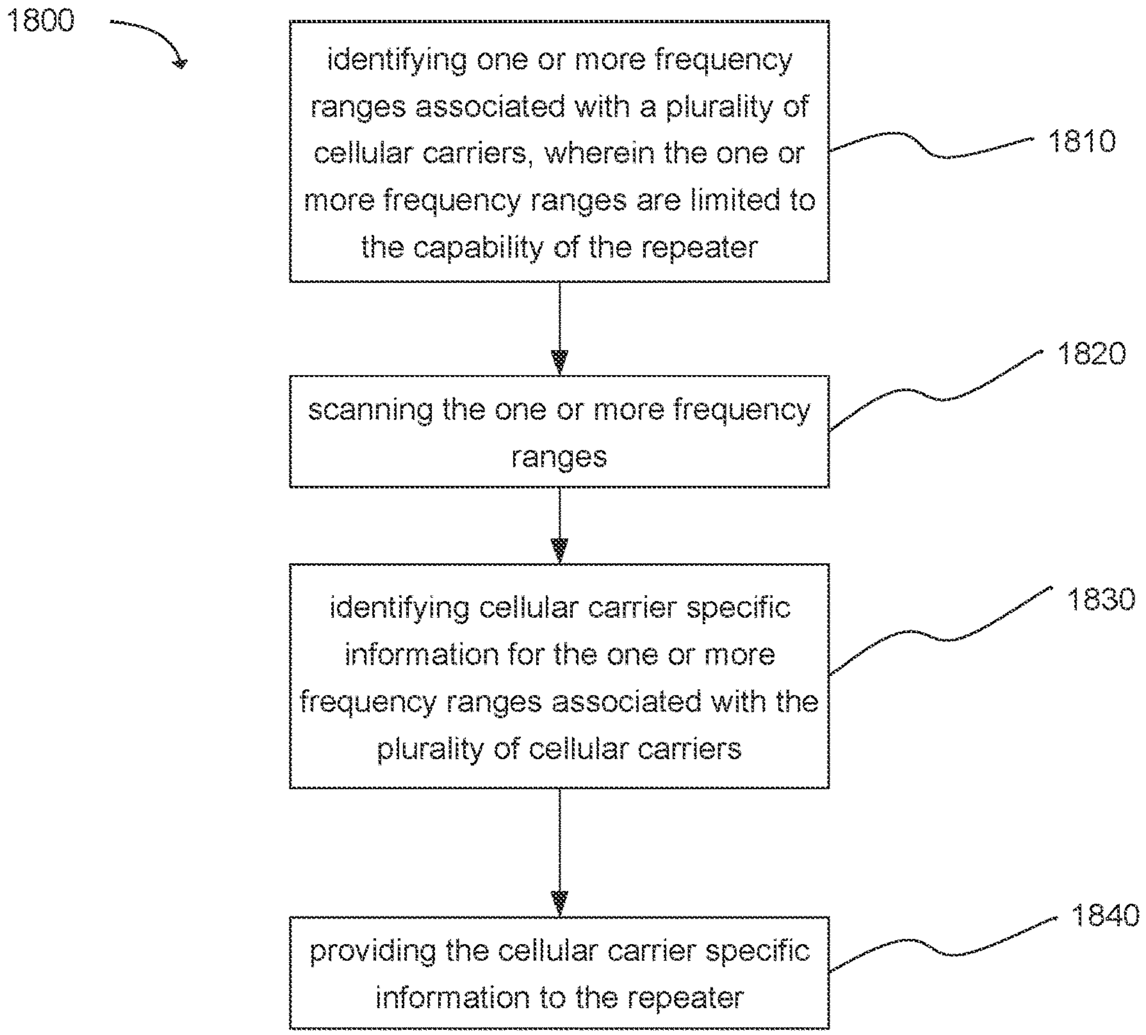
FIG. 18 depicts a flow chart of a machine-readable medium having instructions embodied thereon for communication of cellular carrier specific information in accordance with an example.

Another example provides at least one machine readable storage medium having instructions 1800 embodied thereon for communication of cellular carrier specific information, as shown in the flowchart in FIG. 18. The instructions can be executed on a machine, where the instructions are included on at least one computer readable medium or one non-transitory machine-readable storage medium. The instructions when executed perform: identifying one or more frequency ranges associated with a plurality of cellular carriers, wherein the one or more frequency ranges are limited to the capability of the repeater, as shown in block 1810. The instructions when executed perform: scanning the one or more frequency ranges, as shown in block 1820. The instructions when executed perform: identifying cellular carrier specific information for the one or more frequency ranges associated with the plurality of cellular carriers, as shown in block 1830. The instructions when executed perform: providing the cellular carrier specific information to the repeater, as shown in block 1840.

Multiple Time Division Duplex Sync Detection Module

A repeater can be configured to amplify and filter a time division duplex (TDD) frequency band in a wireless communications system for transmission from a wireless device to a base station and for transmission from a base station to a wireless device. TDD repeaters can use a TDD sync detection module (SDM) to control switching between transmission from a wireless device to a base station (e.g., an uplink (UL) transmission) and transmission from a base station to a wireless device (e.g., a downlink (DL) transmission).

A legacy TDD SDM may control UL/DL switching for only one TDD frequency band because of the challenges in processing UL/DL configuration information and synchronization information for each TDD frequency band. Because of these challenges, a multiband TDD repeater may use a separate TDD SDM for each TDD frequency band that can be amplified and filtered. However, each TDD SDM can be costlier than all of the other radio frequency (RF) components in the TDD repeater combined. As such, the cost of a TDD repeater can increase substantially for each additional TDD band. Adding additional TDD frequency bands to a TDD repeater can not only increase the total cost of the TDD repeater but also increase its complexity. When each TDD frequency band uses a single TDD SDM, then the circuitry between the multiple TDD SDMs and the various microcontrollers involved can increase the number of RF components beyond the simple addition of additional TDD SDMs.

In one example, a single TDD sync detection module can be configured to determine: UL/DL configuration information for a first TDD signal in a first frequency range and UL/DL configuration information for a second TDD signal in a second frequency range. The single TDD sync detection module can be configured to: receive synchronization information for the first TDD signal and synchronization information for the second TDD signal. The single TDD sync detection module can be configured to: use the synchronization information for the first TDD signal and the UL/DL configuration information for the first TDD signal to switch between the first TDD UL signal and the first TDD DL signal; and use the synchronization information for the second TDD signal and the UL/DL configuration information for the second TDD signal to switch between the second TDD UL signal and the second TDD DL signal.

In another example, a modem can be configured to receive a time division duplex (TDD) signal including synchronization information for a first frequency range and uplink/downlink (UL/DL) configuration information for the first frequency range. The modem can be further configured to generate an UL/DL indication signal for a first frequency range of the time division duplex (TDD) signal from the synchronization information and the UL/DL configuration information. The modem can be further configured to send the UL/DL indication signal to a repeater.

Figure 19:
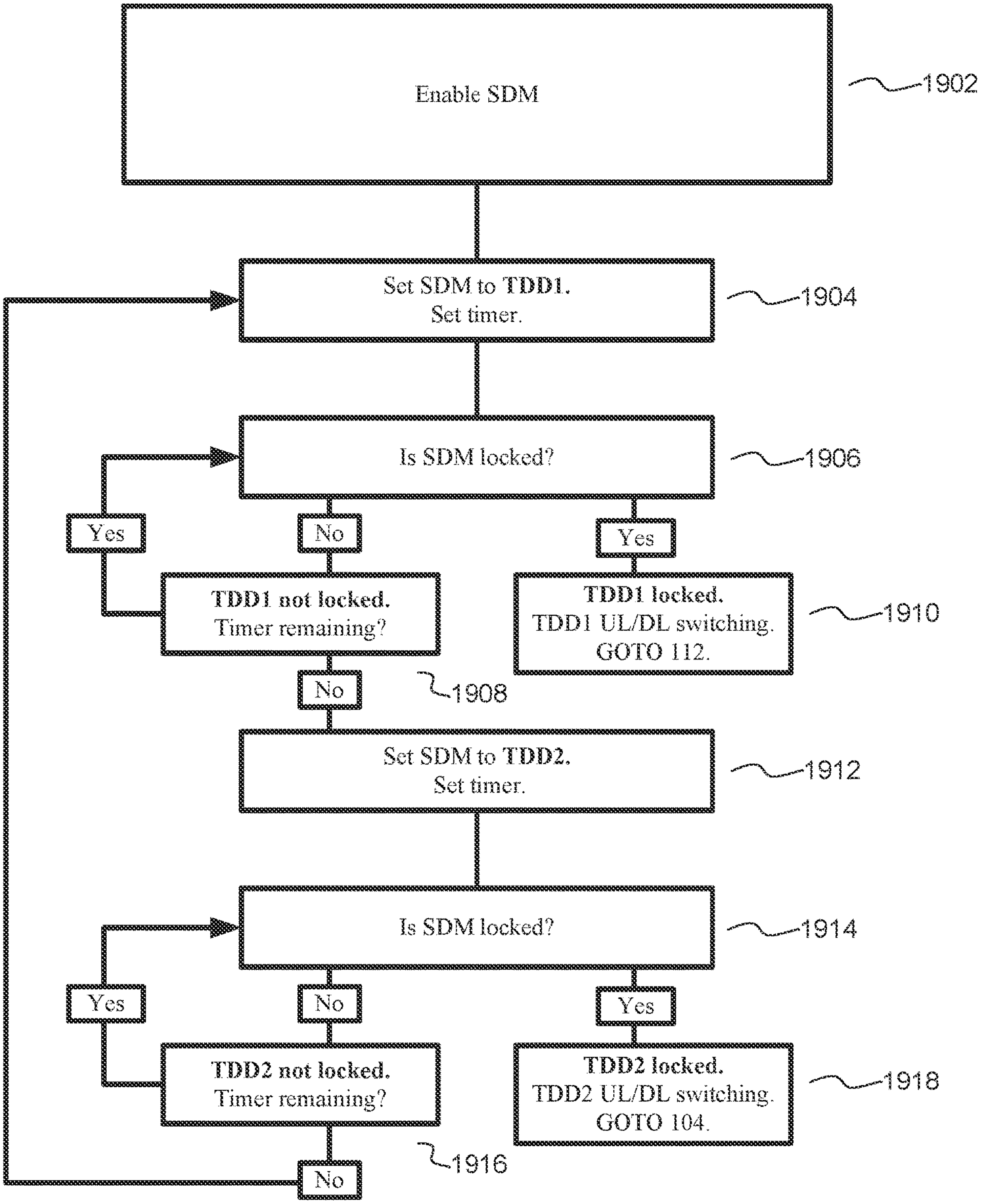
FIG. 19 depicts functionality of a time division duplex (TDD) multiband repeater in accordance with an example.

In one example, as depicted in the flowchart in FIG. 19, a multiband TDD repeater can comprise a single TDD SDM configured to determine UL/DL configuration information for a first TDD signal and a second TDD signal. The TDD SDM can be enabled (operation 1902), set to the first TDD signal (operation 1904), and a timer can be set (operation 1904).

If the TDD SDM is locked (operation 1906), then the TDD SDM can determine UL/DL configuration information for the first TDD signal (operation 1910), and start operation 1912. If the TDD SDM is not locked (operation 1906), then the TDD SDM can identify if the timer has expired (operation 1908). If the timer has not expired, operation 1906 can be repeated. If the timer has expired (operation 1908), operation 1912 can be started.

In operation 1912, the TDD SDM can be set to the second TDD signal and a timer can be set. If the TDD SDM is locked (operation 1914), then the TDD SDM can determine UL/DL configuration information for the second TDD signal (operation 1918), and start operation 1904. If the TDD SDM is not locked (operation 1914), then the TDD SDM can identify if the timer has expired (operation 1916). If the timer has not expired, operation 1914 can be repeated. If the timer has expired (operation 1916), operation 1904 can be started.

Figure 20A:
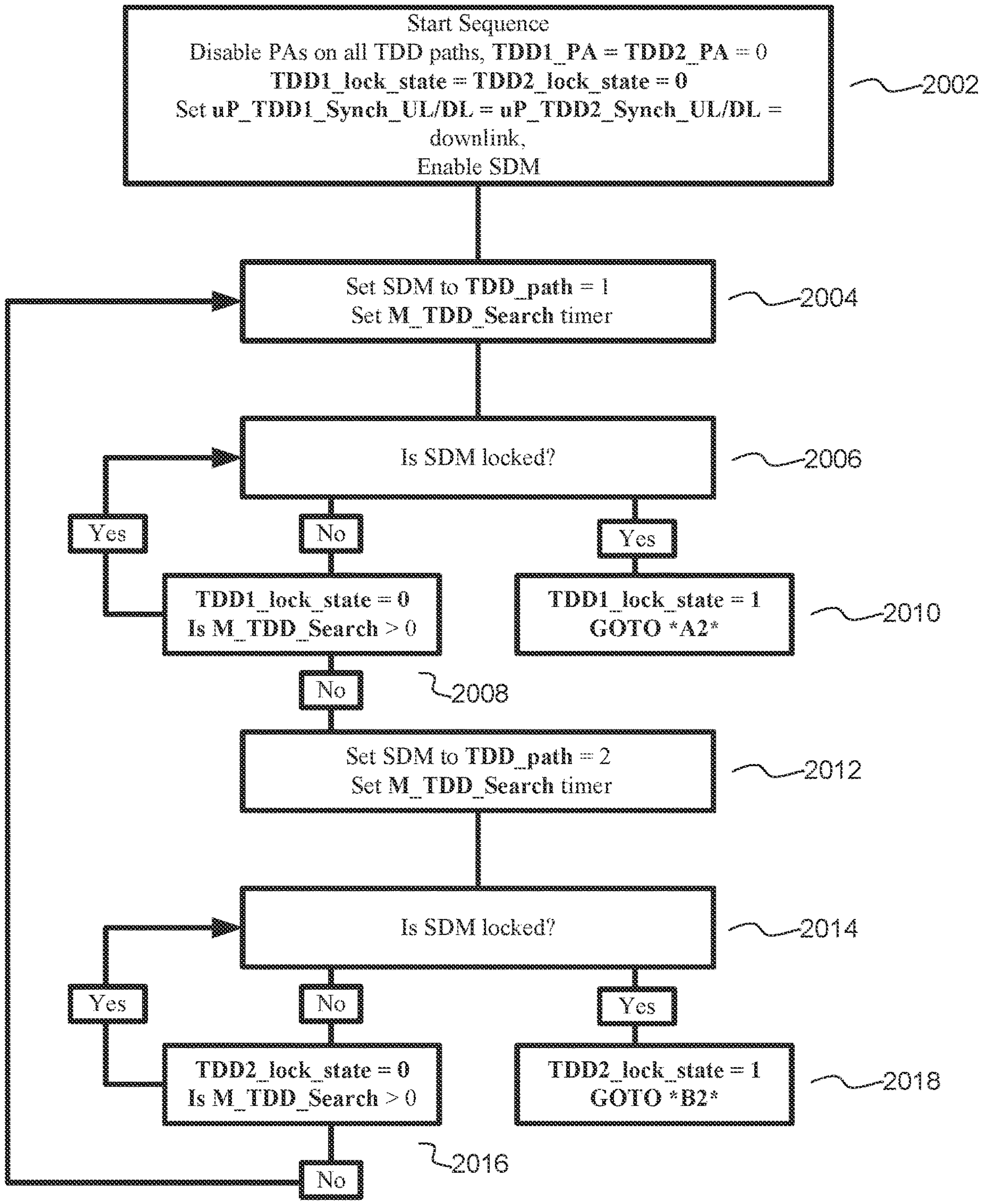
FIG. 20*a* depicts functionality for a time division duplex (TDD) multiband repeater in accordance with an example.

In another example, as depicted in the flowchart in FIG. 20*a*, a multiband TDD repeater can comprise a single TDD SDM configured to determine UL/DL configuration information for a first TDD signal and a second TDD signal. The TDD SDM can be enabled in operation 2002. Operation 2002 can further comprise: disabling the power amplifiers on the first and second TDD amplification and filtering paths (e.g., TDD1_PA=TDD2_PA=0); setting a lock state for the first and second TDD signals to 'unlocked' (e.g., TDD1_lock_state=TDD2_lock_state=0); and setting a synch parameter for the first and second TDD signals to 'downlink' (e.g., uP_TDD1_Synch_UL/DL=uP_TDD2_Synch_UL/DL=downlink).

In another example, the TDD SDM can be set to the first TDD path (TDD_path=1) and a timer (e.g., M_TDD_Search timer) can be set (operation 2004). If the TDD SDM is locked (operation 2006), then operation 2010 can be started (with reference to 'A2' in FIG. 20*b* to be discussed in the proceeding). If the TDD SDM is not locked (operation 2006), then the TDD SDM can identify if the timer has expired in operation 2008 (e.g., Is M_TDD_Search>0). If the timer has not expired, operation 2006 can be repeated. If the timer has expired (operation 2008), operation 2012 can be started.

In operation 2012, the TDD SDM can be set to the second TDD path (TDD_path=2) and a timer (e.g., M_TDD_Search timer) can be set (operation 2012). If the TDD SDM is locked (operation 2014), then operation 2018 can be started (with reference to 'B2' in FIG. 20*c* to be discussed in the proceeding). If the TDD SDM is not locked (operation 2014), then the TDD SDM can identify if the timer has expired in operation 2016 (e.g., Is M_TDD_Search>0). If the timer has not expired, operation 2014 can be repeated. If the timer has expired (operation 2016), operation 2004 can be started.

Figure 20B:
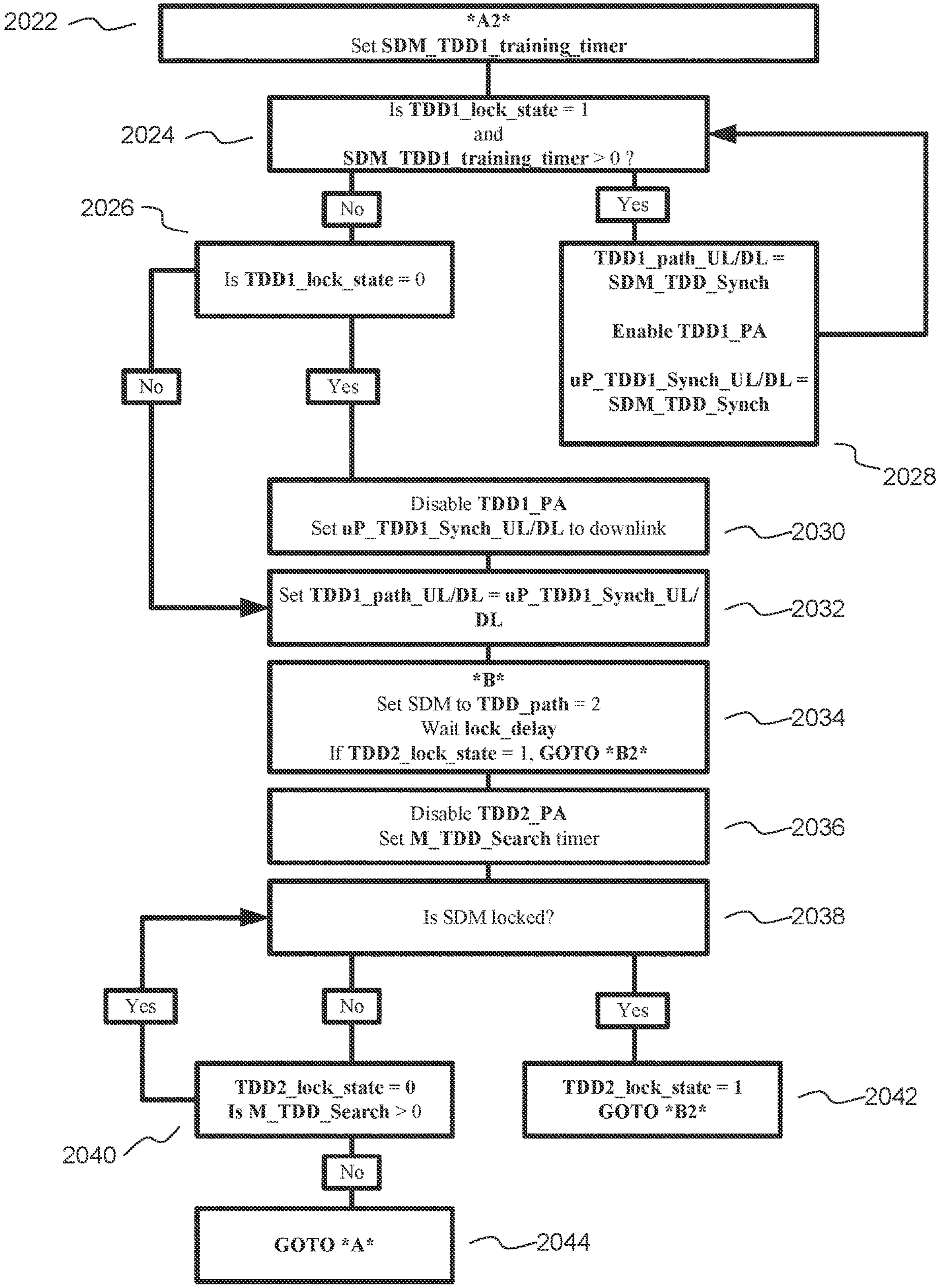
FIG. 20*b* depicts functionality for a time division duplex (TDD) multiband repeater in accordance with an example.

In another example, as depicted in the flowchart in FIG. 20*b*, an SDM training timer for the first TDD path can be set (e.g., SDM_TDD1_training_timer) (operation 'A2' or 2022). In operation 2024, if the lock state for the first TDD signal is locked (e.g., TDD1_lock_state=1) and the SDM training timer for the first TDD path is greater than 0 (SDM_TDD1_training_timer>0), then operation 2028 can be started.

In another example, in operation 2028, UL/DL configuration information for the first TDD amplification and filtering path (e.g., TDD1_path_UL/DL) can be set using the UL/DL configuration information for the first TDD signal determined using the single TDD SDM (e.g., SDM_TDD_Synch). The one or more power amplifiers on the first TDD amplification and filtering path can be enabled (e.g., Enable TDD1_PA). The synch parameter for the first TDD signal (e.g., uP_TDD1_Synch_UL/DL) can be set using the UL/DL configuration information for the first TDD signal determined using the single TDD SDM (e.g., SDM_TDD_Synch). Upon competition of operation 2028, operation 2024 can be started.

In another example, in operation 2024, if the lock state for the first TDD signal is unlocked (e.g., TDD1_lock_state=0) or the SDM training timer for the first TDD path has expired, then operation 2026 can be started. In operation 2026, if the lock state for the first TDD signal is unlocked (e.g., TDD1_lock_state=0), then operation 2030 can be started. In operation 2026, if the lock state for the first TDD signal is not unlocked, then operation 2032 can be started.

In another example, in operation 2030, the one or more power amplifiers on the first TDD amplification and filtering path can be disabled (e.g., TDD1_PA=0), and the synch parameter for the first TDD signal can be set to 'downlink' (e.g., uP_TDD1_Synch_UL/DL=downlink).

In another example, in operation 2032, UL/DL configuration information for the first TDD amplification and filtering path (e.g., TDD1_path_UL/DL) can be set to the synch parameter for the first TDD signal (e.g., uP_TDD1_Synch_UUDL).

In another example, in operation 2034 (i.e. operation 'B'), the TDD SDM can be set to the second TDD amplification and filtering path (e.g., TDD_path=2). A time delay can be initiated (e.g., lock_delay). If the lock state of the second TDD signal is locked (e.g., TDD2_lock_state=1), then operation 'B2' (discussed in the proceeding with relation to FIG. 20*c*) can be started.

In another example, in operation 2036, one or more power amplifiers on the second TDD amplification and filtering path can be disabled (e.g., TDD2_PA). A timer (e.g., M_TDD_Search timer) can be set.

Figure 20C:
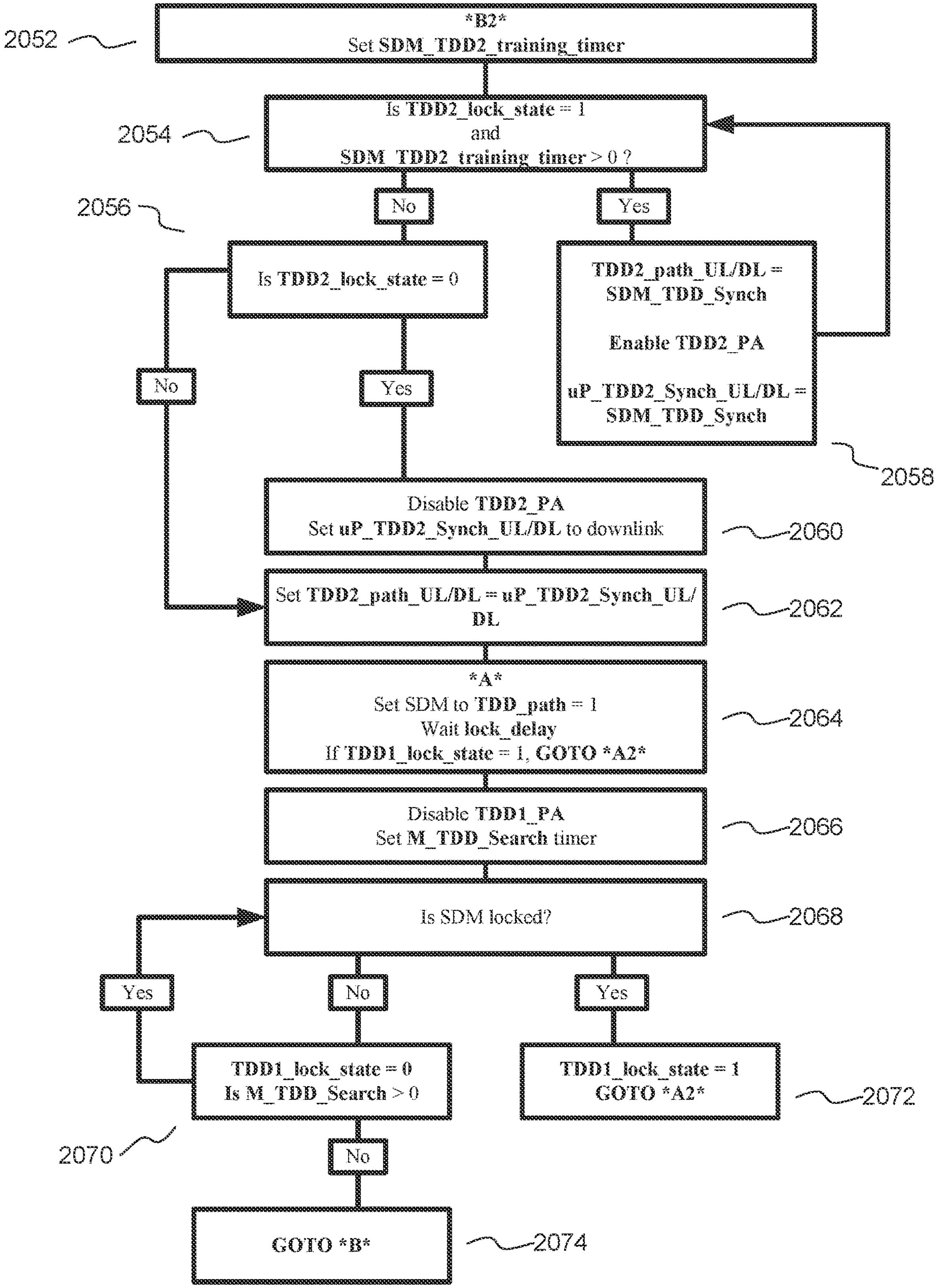
FIG. 20*c* depicts functionality for a time division duplex (TDD) multiband repeater in accordance with an example.

In another example, in operation 2038, if the TDD SDM is locked, then operation 2042 can be started (with reference to 'B2' in FIG. 20*c* to be discussed in the proceeding). If the TDD SDM is not locked (operation 2038), then the TDD SDM can identify if the timer has expired in operation 2040 (e.g., Is M_TDD_Search>0). If the timer has not expired, operation 2038 can be repeated. If the timer has expired (operation 2040), operation 2044 can be started (with reference to 'A' in FIG. 20*c* to be discussed in the proceeding).

In another example, as depicted in the flowchart in FIG. 20*c*, an SDM training timer for the second TDD path can be set (e.g., SDM_TDD2_training_timer) (operation 'B2' or 2052). In operation 2054, if the lock state for the second TDD signal is locked (e.g., TDD2_lock_state=1) and the SDM training timer for the second TDD path is greater than 0 (SDM_TDD2_training_timer>0), then operation 2058 can be started.

In another example, in operation 2058, UL/DL configuration information for the second TDD amplification and filtering path (e.g., TDD2_path_UL/DL) can be set using the UL/DL configuration information for the second TDD signal determined using the single TDD SDM (e.g., SDM_TDD_Synch). The one or more power amplifiers on the second TDD amplification and filtering path can be enabled (e.g., Enable TDD2_PA). The synch parameter for the second TDD signal (e.g., uP_TDD2_Synch_UL/DL) can be set using the UL/DL configuration information for the second TDD signal determined using the single TDD SDM (e.g., SDM_TDD_Synch). Upon competition of operation 2058, operation 2054 can be started.

In another example, in operation 2054, if the lock state for the second TDD signal is unlocked (e.g., TDD2_lock_state=0) or the SDM training timer for the second TDD path has expired, then operation 2056 can be started. In operation 2056, if the lock state for the second TDD signal is unlocked (e.g., TDD2_lock_state=0), then operation 2060 can be started. In operation 2056, if the lock state for the second TDD signal is not unlocked, then operation 2062 can be started.

In another example, in operation 2060, the one or more power amplifiers on the second TDD amplification and filtering path can be disabled (e.g., TDD2_PA=0), and the synch parameter for the second TDD signal can be set to 'downlink' (e.g., uP_TDD2_Synch_UL/DL=downlink).

In another example, in operation 2062, UL/DL configuration information for the second TDD amplification and filtering path (e.g., TDD2_path_UL/DL) can be set to the synch parameter for the second TDD signal (e.g., uP_TDD2_Synch_UL/DL).

In another example, in operation 2064 (i.e. operation 'A'), the TDD SDM can be set to the first TDD amplification and filtering path (e.g., TDD_path=1). A time delay can be initiated (e.g., lock_delay). If the lock state of the first TDD signal is locked (e.g., TDD1_lock_state=1), then operation 'A2' (discussed in the preceding with relation to FIG. 20*b*) can be started.

In another example, in operation 2066, one or more power amplifiers on the first TDD amplification and filtering path can be disabled (e.g., TDD1_PA). A timer (e.g., M_TDD_Search timer) can be set.

In another example, in operation 2068, if the TDD SDM is locked, then operation 2072 can be started (with reference to 'A2' in FIG. 20*b* discussed in the preceding). If the TDD SDM is not locked (operation 2068), then the TDD SDM can identify if the timer has expired in operation 2070 (e.g., Is M_TDD_Search>0). If the timer has not expired, operation 2068 can be repeated. If the timer has expired (operation 2070), operation 2074 can be started (with reference to CB' in FIG. 20*b* discussed in the preceding).

Figure 21:
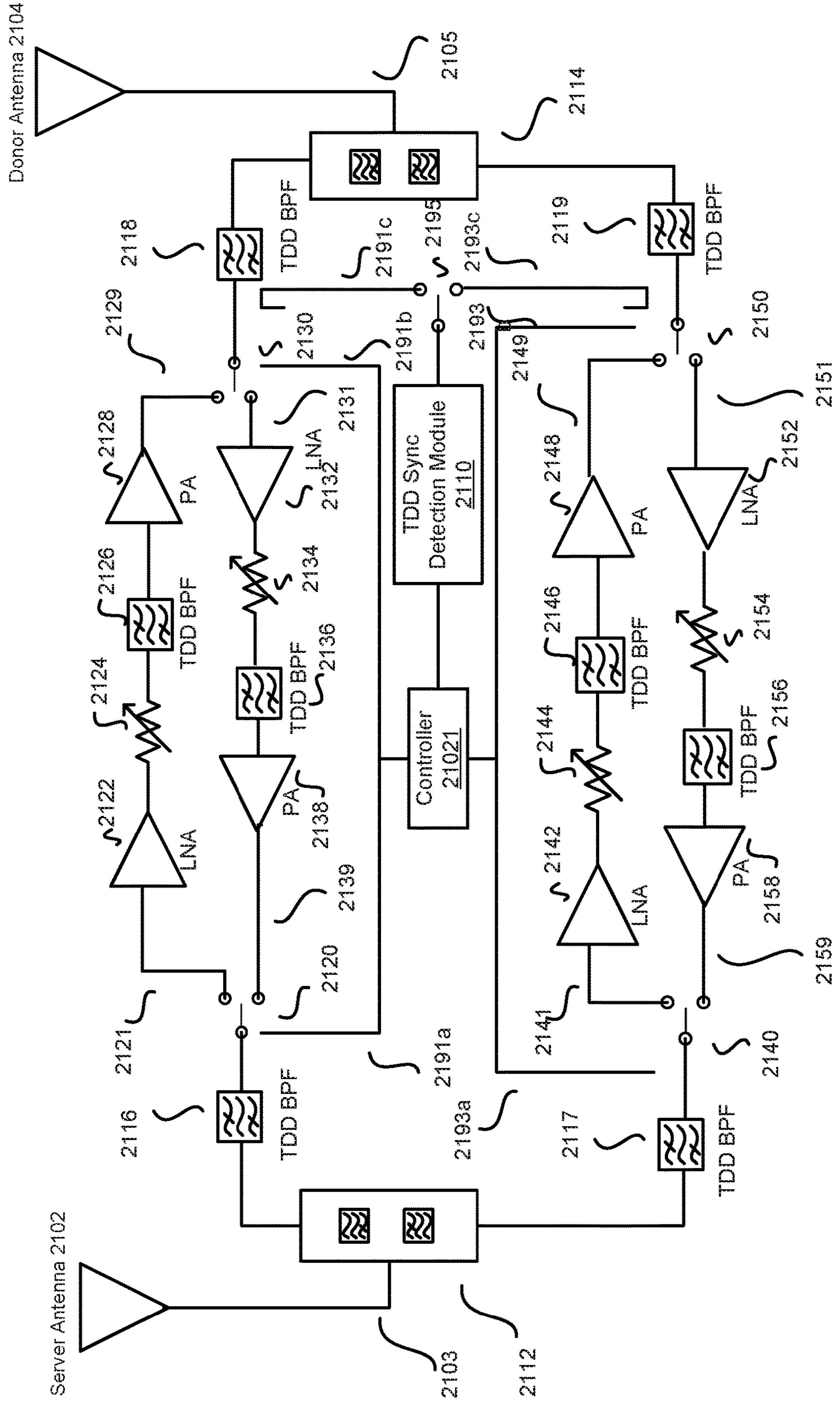
FIG. 21 illustrates a time division duplex (TDD) multiband repeater in accordance with an example.

In another example, as illustrated in FIG. 21, a repeater can be a time division duplex (TDD) repeater. The repeater can be configured to be coupled to a first antenna (e.g., a server antenna) 2102 and a second antenna (e.g., a donor antenna) 2104. The first antenna 2102 can receive a first-direction signal (e.g., an uplink signal) from a wireless device (e.g., a UE). The first antenna 2102 can be configured to be coupled to a first port (e.g., a server port) 2103. The first port 2103 can be coupled to a multiplexer (or a diplexer, a duplexer, a circulator, or a splitter) 2112. The first-direction signal received at the first antenna 2102 from the wireless device can be directed to multiplexer 2112. The multiplexer 2112 can direct the TDD first-direction signal, based on its frequency, to a TDD first path or a TDD second path.

In another example, the second antenna 2104 can receive a second-direction signal from a base station. The second antenna 2104 can be coupled to a second port (e.g., a donor port) 2105. The second port 2105 can be coupled to a multiplexer (or a diplexer, a duplexer, a circulator, or a splitter) 2114. The second-direction signal received at the second antenna 2104 from the base station can be directed to multiplexer 2114. The multiplexer 2114 can direct the TDD second-direction signal, based on its frequency, to a TDD first path or a TDD second path.

In another example, the TDD first path can comprise a filter (e.g., a TDD band-pass filter (BPF)) 2116 that is configured to be coupled to the multiplexer 2112 and a filter (e.g., a TDD BPF) 2118 that is configured to be coupled to the multiplexer 2114. The filter 2116 can be configured to be coupled to a first switch 2120 (e.g., a single-pole double-throw (SPDT) switch). The first switch 2120 can be configured to be coupled to a first-direction path 2121 of the TDD first path and a second-direction path 2139 of the TDD first path. The filter 2118 can be configured to be coupled to a second switch 2130 (e.g., a single-pole double-throw (SPDT) switch). The second switch 2130 can be configured to be coupled to a second-direction path 2131 of the TDD first path and a first-direction path 2129 of the TDD first path.

In another example, the first-direction path of the TDD first path can comprise one or more of a low-noise amplifier (LNA) 2122, a variable attenuator 2124, a filter (e.g., a TDD band-pass filter (BPF)) 2126, or a power amplifier 2128. In another example, the power amplifier 2128 can comprise a variable gain power amplifier, a fixed gain power amplifier, or a gain block.

In another example, the filter 2126 can be configured to pass one or more of a first-direction (e.g., an uplink direction) of a first frequency range (e.g., one or more of 3GPP LTE TDD frequency bands 41, 48, or 49). In another example, the filter 2126 can be configured to communicate one or more of a first-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 2126 can be configured to communicate a first-direction of a selected channel within a 3GPP LTE TDD band or a 3GPP 5G TDD frequency band. In another example, the filter 2126 can be configured to communicate a first-direction of a selected frequency range within a 3GPP LTE TDD frequency range or a first-direction of a 3GPP 5G TDD frequency range.

In another example, after being directed along the TDD first-direction path of the TDD first path, the TDD first-direction signal can be amplified and filtered in accordance with the type of amplifiers and filters included along the TDD first-direction path. At this point, the TDD first-direction signal can be directed to the second switch 2130. The second switch 2130 can direct the TDD first-direction signal to the filter (e.g., a TDD BPF) 2118. The filter 2118 can direct the TDD first-direction signal to the multiplexer 2114. The multiplexer 2114 can be coupled to the second port 2105. The TDD first-direction signal can be directed from the multiplexer 2114 to the second port 2105. The TDD first-direction signal can be directed from the second port 2105 to the second antenna 2104. The second antenna 2104 can communicate the amplified and/or filtered TDD first-direction signal to a base station.

In another example, the second antenna 2104 can receive a second-direction signal from a base station. The second port 2105 can be configured to be coupled to the second antenna 2104. The second port 2105 can be coupled to the multiplexer 2114. The second-direction signal received at the second antenna 2104 from the base station can be directed to the multiplexer 2114. The multiplexer 2114 can direct the TDD second-direction signal, based on its frequency, to the second switch (e.g., a SPDT switch) 2130.

In another example, the second-direction path 2131 of the TDD first path can comprise one or more of a low-noise amplifier (LNA) 2132, a variable attenuator 2134, a filter (e.g., a TDD BPF) 2136, or a power amplifier 2138. In another example, the power amplifier 2138 can comprise a variable gain power amplifier, a fixed gain power amplifier, or a gain block.

In another example, the filter 2136 can be configured to pass one or more of a second-direction (e.g., a downlink direction) of a first frequency range (e.g., one or more of 3GPP LTE TDD frequency bands 41, 48, or 49). In another example, the filter 2136 can be configured to communicate one or more of a second-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 2136 can be configured to communicate a second-direction of a selected channel within a 3GPP LTE TDD band or a 3GPP 5G TDD frequency band. In another example, the filter 2136 can be configured to communicate a second-direction of a selected frequency range within a 3GPP LTE TDD frequency range or a second-direction of a 3GPP 5G TDD frequency range.

In another example, after being directed along the second-direction path of the TDD first path, the TDD second-direction signal can be amplified and filtered in accordance with the type of amplifiers and filters included along the TDD second-direction path. At this point, the TDD second-direction signal can be directed to the first switch (e.g., a SPDT switch) 2120. The first switch 2120 can direct the amplified and/or filtered TDD second-direction signal to the multiplexer 2112. The multiplexer 2112 can be coupled to a first port 2103. The TDD second-direction signal can be directed from the multiplexer 2112 to the first port 2103. The TDD second-direction signal can be directed from the first port 2103 to the first antenna 2102. The first antenna 2102 can communicate the amplified and/or filtered TDD second-direction signal to a wireless device.

In another example, the TDD second path can comprise a filter (e.g., a TDD band-pass filter (BPF)) 2117 that is configured to be coupled to the multiplexer 2112 and a filter (e.g., a TDD BPF) 2119 that is configured to be coupled to the multiplexer 2114. The filter 2117 can be configured to be coupled to a third switch 2140 (e.g., a single-pole double-throw (SPDT) switch). The third switch 2140 can be configured to be coupled to a first-direction path 2141 of the TDD second path and a second-direction path 2159 of the TDD second path. The filter 2117 can be configured to be coupled to a fourth switch 2150 (e.g., a single-pole double-throw (SPDT) switch). The fourth switch 2150 can be configured to be coupled to a second-direction path 2151 of the TDD second path and a first-direction path 2149 of the TDD second path.

In another example, the first-direction path of the TDD second path can comprise one or more of a low-noise amplifier (LNA) 2142, a variable attenuator 2144, a filter (e.g., a TDD band-pass filter (BPF)) 2146, or a power amplifier 2148. In another example, the power amplifier 2148 can comprise a variable gain power amplifier, a fixed gain power amplifier, or a gain block.

In another example, the filter 2146 can be configured to pass one or more of a first-direction (e.g., an uplink direction) of a second frequency range (e.g., one or more of 3GPP LTE TDD frequency bands 41, 48, or 49). In another example, the filter 2126 can be configured to communicate one or more of a first-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 2126 can be configured to communicate a first-direction of a selected channel within a 3GPP LTE TDD band or a 3GPP 5G TDD frequency band. In another example, the filter 2126 can be configured to communicate a first-direction of a selected frequency range within a 3GPP LTE TDD frequency range or a first-direction of a 3GPP 5G TDD frequency range.

In another example, after being directed along the TDD first-direction path 2149 of the TDD second path, the TDD first-direction signal can be amplified and filtered in accordance with the type of amplifiers and filters included along the TDD first-direction path. At this point, the TDD first-direction signal can be directed to the fourth switch 2150. The fourth switch 2150 can direct the TDD first-direction signal to the filter (e.g., a TDD BPF) 2119. The filter 2119 can direct the TDD first-direction signal to the multiplexer 2114. The multiplexer 2114 can be coupled to the second port 2105. The TDD first-direction signal can be directed from the multiplexer 2114 to the second port 2105. The TDD first-direction signal can be directed from the second port 2105 to the second antenna 2104. The second antenna 2104 can communicate the amplified and/or filtered TDD first-direction signal to a base station.

In another example, the second antenna 2104 can receive a second-direction signal from a base station. The second port 2105 can be configured to be coupled to the second antenna 2104. The second port 2105 can be coupled to the multiplexer 2114. The second-direction signal received at the second antenna 2104 from the base station can be directed to the multiplexer 2114. The multiplexer 2114 can direct the TDD second-direction signal, based on its frequency, to the fourth switch (e.g., a SPDT switch) 2150.

In another example, the second-direction path 2151 of the TDD second path can comprise one or more of a low-noise amplifier (LNA) 2152, a variable attenuator 2154, a filter (e.g., a TDD BPF) 2156, or a power amplifier 2158. In another example, the power amplifier 2158 can comprise a variable gain power amplifier, a fixed gain power amplifier, or a gain block.

In another example, the filter 2156 can be configured to pass one or more of a second-direction (e.g., a downlink direction) of a second frequency range (e.g., one or more of 3GPP LTE TDD frequency bands 41, 48, or 49). In another example, the filter 2136 can be configured to communicate one or more of a second-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 2136 can be configured to communicate a second-direction of a selected channel within a 3GPP LTE TDD band or a 3GPP 5G TDD frequency band. In another example, the filter 2136 can be configured to communicate a second-direction of a selected frequency range within a 3GPP LTE TDD frequency range or a second-direction of a 3GPP 5G TDD frequency range.

In another example, after being directed along the second-direction path of the TDD second path, the TDD second-direction signal can be amplified and filtered in accordance with the type of amplifiers and filters included along the TDD second-direction path. At this point, the TDD second-direction signal can be directed to the third switch (e.g., a SPDT switch) 2140. The third switch 2140 can direct the amplified and/or filtered TDD second-direction signal to the multiplexer 2112. The multiplexer 2112 can be coupled to the first port 2103. The TDD second-direction signal can be directed from the multiplexer 2112 to the first port 2103. The TDD second-direction signal can be directed from the first port 2103 to the first antenna 2102. The first antenna 2102 can communicate the amplified and/or filtered TDD second-direction signal to a wireless device.

In another example, a repeater can further comprise a single TDD sync detection module (TDD SDM) 2110. The TDD SDM 2110 can be configured to determine UL/DL configuration information for a first TDD signal and a second TDD signal. The UL/DL configuration information may be received at a different location within the repeater and communicated to the TDD SDM 2110. The TDD SDM can be configured to detect UL/DL configuration information for the first TDD signal using one or more detectors 2191*c* and for the second TDD signal using one or more detectors 2193*c*. The one or more detectors 2191*c* can be located between the filter 2116 and the first switch 2120. The one or more detectors 2193*a* can be located between the filter 2117 and the third switch 2140.

In another example, the TDD SDM 2110 can be configured to determine the UL/DL configuration information for the first TDD signal and the UL/DL configuration information for the second TDD signal in a same time period. In another example, the TDD SDM 2110 can be configured to determine the UL/DL configuration information for the first TDD signal in a first time period and determine the UL/DL configuration information for the second TDD signal in a second time period, wherein the first time period does not overlap with the second time period.

In another example, the TDD SDM 2110 can be configured to store the UL/DL configuration information for the first TDD signal or store the UL/DL configuration information for the second TDD signal. The TDD SDM 2110 can be configured to use the UL/DL configuration information for the first TDD signal that is stored at the TDM SDM to reacquire UL/DL configuration information for the first TDD signal in a first subsequent time period, and use the UL/DL configuration information for the second TDD signal that is stored at the TDM SDM to reacquire UL/DL configuration information for the second TDD signal in a second subsequent time period.

In another example, a controller 2106 can be configured to switch the first switch 2120 via 2191*a* to pass a first-direction TDD signal (e.g., an uplink TDD signal) from the filter 2116 to the TDD first-direction path 2121 of the first path and switch the second switch 2130 to pass the first-direction TDD signal to the second port 2105 via the filter 2118. In another example, the controller 2106 can be configured to switch the second switch 2130 via 2191*b* to pass a second-direction signal (e.g., a downlink TDD signal) from the second port 2105 to the TDD second-direction path 2131 and switch the first switch 2120 to pass the second-direction TDD signal to the first port 2103 via the filter 2116.

In another example, a controller 2106 can be configured to switch the third switch 2140 via 2193*a* to pass a first-direction TDD signal (e.g., an uplink TDD signal) from the filter 2117 to the TDD first-direction path 2141 of the second path and switch the fourth switch 2150 to pass the first-direction TDD signal to the second port 2105 via the filter 2119. In another example, the controller 2106 can be configured to switch the fourth switch 2150 via 2193*b* to pass a second-direction signal (e.g., a downlink TDD signal) from the second port 2105 to the TDD second-direction path 2151 and switch the third switch 2140 to pass the second-direction TDD signal to the first port 2103 via the filter 2117.

In another example, the single TDD SDM 2110 or the controller can comprise one or more of a modem, a field-programmable gate array (FPGA), or an application-specific integrated circuit (ASIC) that is configured to receive UL/DL configuration information from a base station or a UE and send a signal to a switch. The modem, FPGA, or ASIC that is configured as the TDD SDM can additionally be configured as a scanning receiver that is configured to scan one or more frequency ranges and identify cellular carrier specific information for the one or more frequency ranges associated with the plurality of cellular carriers, as previously discussed. Accordingly, the TDD SDM 2110 can be a scanning SDM (SSDM) that can scan one or more frequency ranges and identify cellular carrier specific information for the one or more frequency ranges associated with the plurality of cellular carriers. The SSDM can perform all of the functions of the scanning receiver disclosed herein, including but not limited to the scanning receiver 118, 518*a*, 518*b*, or 640 in the examples above. The SSDM can also perform all of the functions of the TDD SDM that are disclosed herein, such as TDD SDM 2110. The SSDM can be comprised of a layer-1 modem, a layer-2 or layer-3 modem, an FPGA, an ASIC, or another desired type of computer processor. The terms layer-1 modem, layer-2 modem, and layer-3 modem are defined in the proceeding paragraphs. The term TDD SDM or SDM, as used herein, can be synonymous with a scanning SDM (SSDM).

The TDD SDM 2110 can be configured to switch between a DL configuration and an UL configuration in a 1 millisecond (ms) subframe basis for 3GPP LTE. The TDD switch controller can be configured to switch between a DL configuration and an UL configuration on a symbol basis for 3GPP 5G, wherein the duration of a symbol can vary based on numerology.

In another example, the controller 2106 can be configured to use the UL/DL configuration information for the first TDD signal to switch between the TDD first-direction signal of the first TDD signal and the TDD second-direction signal of the first TDD signal for the TDD first path. The controller 2106 can be configured to use the UL/DL configuration information for the second TDD signal to switch between the second TDD first-direction signal of the second TDD signal and the second TDD second-direction signal of the second TDD signal for the TDD second path.

In another example, the TDD SDM 2110 can be configured to receive synchronization information for the first TDD signal to enable the controller to switch between the first TDD first-direction signal and the first TDD second-direction signal, and receive synchronization information for the second TDD signal to enable the controller to switch between the second TDD first-direction signal and the second TDD second-direction signal. The synchronization information for the first TDD signal can be received from a base station transmitting the first TDD second-direction signal. The synchronization information for the second TDD signal can be received from a base station transmitting the second TDD second-direction signal.

In another example, the controller 2106 can be configured to use the synchronization information for the first TDD signal and the UL/DL configuration information for the first TDD signal to switch between the first TDD first-direction signal and the first TDD second-direction signal for a subsequent time period. The controller 2106 can be configured to use the synchronization information for the second TDD signal and the UL/DL configuration information for the second TDD signal to switch between the second TDD first-direction signal and the second TDD second-direction signal for a subsequent time period. In another example, the controller 2106 can be configured to store the synchronization information for the first TDD signal or store the synchronization information for the second TDD signal.

In another example, the TDD SDM can be configured to use the synchronization information for the first TDD signal that is stored at the controller to reacquire synchronization information for the first TDD signal in a first subsequent time period or use the synchronization information for the second TDD signal that is stored at the controller to reacquire synchronization information for the second TDD signal in a second subsequent time period.

Figure 22:
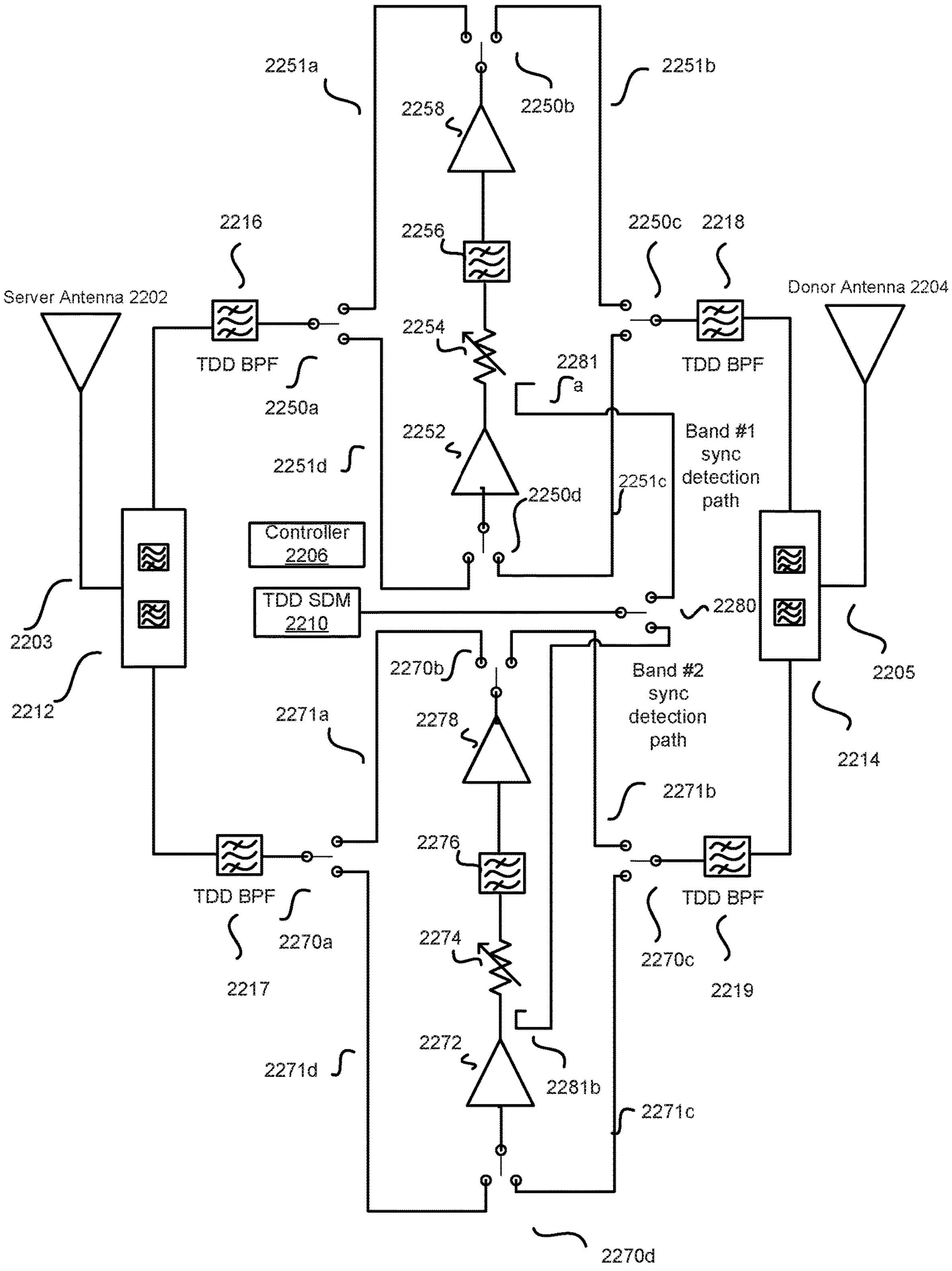
FIG. 22 illustrates a time division duplex (TDD) multiband repeater in accordance with an example.

In another example, as illustrated in FIG. 22, a repeater can be a time division duplex (TDD) repeater. The repeater can be configured to be coupled to a first antenna (e.g., a server antenna) 2202 and a second antenna (e.g., a donor antenna) 2204. The first antenna 2202 can receive a first-direction signal (e.g., an uplink signal) from a wireless device (e.g., a UE). The first antenna 2202 can be configured to be coupled to a first port (e.g., a server port) 2203. The first port 2203 can be coupled to a multiplexer (or a diplexer, a duplexer, a circulator, or a splitter) 2212. The first-direction signal received at the first antenna 2202 from the wireless device can be directed to multiplexer 2212. The multiplexer 2212 can direct the TDD first-direction signal, based on its frequency, to a filter 2216 on a TDD first path or a filter 2217 on a TDD second path.

In another example, the second antenna 2204 can receive a second-direction signal from a base station. The second antenna 2204 can be coupled to a second port (e.g., a donor port) 2205. The second port 2205 can be coupled to a multiplexer (or a diplexer, a duplexer, a circulator, or a splitter) 2214. The second-direction signal received at the second antenna 2204 from the base station can be directed to multiplexer 2214. The multiplexer 2214 can direct the TDD second-direction signal, based on its frequency, to a filter 2218 on a TDD first path or a filter 2219 on a TDD second path.

In another example, the TDD first path can comprise a filter (e.g., a TDD band-pass filter (BPF)) 2216 that is configured to be coupled to the multiplexer 2212 and a filter (e.g., a TDD BPF) 2218 that is configured to be coupled to the multiplexer 2214. The filter 2216 can be configured to be coupled to a first switch 2250*a* (e.g., a single-pole double-throw (SPDT) switch). The first switch 2250*a* can be configured to a second switch 2250*b* (e.g., a single-pole double-throw (SPDT) switch) via 2251*a*. The second switch 2250*b* can be configured to be coupled to a third switch 2250*c* (e.g., a single-pole double-throw (SPDT) switch) via 2251*b*. The third switch 2250*c* can be configured to be coupled to a fourth switch 2250*d* (e.g., a single-pole double-throw (SPDT) switch) via 2251*c*. The fourth switch 2250*d* can be configured to be coupled to the first switch 2250*a* via 2251*d*.

In another example, the fourth switch 2250*d* can be configured to be coupled to an input of a first amplification and filtering path and the second switch 2250*b* can be configured to be coupled to an output of the first amplification and filtering path. The first amplification and filtering path can comprise one or more of a low-noise amplifier (LNA) 2252, a variable attenuator 2254, a filter (e.g., a TDD band-pass filter (BPF)) 2256, or a power amplifier 2258. In another example, the power amplifier 2258 can comprise a variable gain power amplifier, a fixed gain power amplifier, or a gain block.

In another example, the filter 2256 can be configured to pass one or more of a first-direction (e.g., an uplink direction) of a first frequency range (e.g., one or more of 3GPP LTE TDD frequency bands 41, 48, or 49). In another example, the filter 2256 can be configured to communicate one or more of a first-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 2256 can be configured to communicate a first-direction of a selected channel within a 3GPP LTE TDD band or a 3GPP 5G TDD frequency band. In another example, the filter 2256 can be configured to communicate a first-direction of a selected frequency range within a 3GPP LTE TDD frequency range or a first-direction of a 3GPP 5G TDD frequency range.

In another example, after being directed along the TDD first amplification and filtering path, the TDD first-direction signal can be amplified and filtered in accordance with the type of amplifiers and filters included along the TDD first amplification and filtering path. At this point, the TDD first-direction signal can be directed to the second switch 2250*b*. The second switch 2250*b* can direct the TDD first-direction signal to the filter (e.g., a TDD BPF) 2218 via the third switch 2250*c*. The filter 2218 can direct the TDD first-direction signal to the multiplexer 2214. The multiplexer 2214 can be coupled to the second port 2205. The TDD first-direction signal can be directed from the multiplexer 2214 to the second port 2205. The TDD first-direction signal can be directed from the second port 2205 to the second antenna 2204. The second antenna 2204 can communicate the amplified and/or filtered TDD first-direction signal to a base station.

In another example, the second antenna 2204 can receive a second-direction signal from a base station. The second port 2205 can be configured to be coupled to the second antenna 2204. The second port 2205 can be coupled to the multiplexer 2214. The second-direction signal received at the second antenna 2204 from the base station can be directed to the multiplexer 2214. The multiplexer 2214 can direct the TDD second-direction signal, based on its frequency, to the third switch 2250*c* via the filter 2218. The TDD second-direction signal can be further directed to the input of the LNA 2252 via the fourth switch 2250*d*.

In another example, the filter 2256 can be configured to pass one or more of a second-direction (e.g., a downlink direction) of a first frequency range (e.g., one or more of 3GPP LTE TDD frequency bands 41, 48, or 49). In another example, the filter 2256 can be configured to communicate one or more of a second-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 2256 can be configured to communicate a second-direction of a selected channel within a 3GPP LTE TDD band or a 3GPP 5G TDD frequency band. In another example, the filter 2256 can be configured to communicate a second-direction of a selected frequency range within a 3GPP LTE TDD frequency range or a second-direction of a 3GPP 5G TDD frequency range.

In another example, after being directed along the TDD first amplification and filtering path, the TDD second-direction signal can be amplified and filtered in accordance with the type of amplifiers and filters included along the TDD first amplification and filtering path. At this point, the TDD second-direction signal can be directed to the second switch 2250*b*. The second switch 2250*b* can direct the amplified and/or filtered TDD second-direction signal to the multiplexer 2216 via the first switch 2250*a*. The multiplexer 2212 can be coupled to a first port 2203. The TDD second-direction signal can be directed from the multiplexer 2212 to the first port 2203. The TDD second-direction signal can be directed from the first port 2203 to the first antenna 2202. The first antenna 2202 can communicate the amplified and/or filtered TDD second-direction signal to a wireless device.

In another example, the TDD second path can comprise a filter (e.g., a TDD band-pass filter (BPF)) 2217 that is configured to be coupled to the multiplexer 2212 and a filter (e.g., a TDD BPF) 2219 that is configured to be coupled to the multiplexer 2214. The filter 2217 can be configured to be coupled to a fifth switch 2270*a* (e.g., a single-pole double-throw (SPDT) switch). The fifth switch 2270*a* can be configured to be coupled to a sixth switch 2270*b* (e.g., a single-pole double-throw (SPDT) switch) via 2271*a*. The sixth switch 2270*b* can be configured to be coupled to a seventh switch 2270*c* (e.g., a single-pole double-throw (SPDT) switch) via 2271*b*. The seventh switch 2270*c* can be configured to be coupled to an eighth switch 2270*d* (e.g., a single-pole double-throw (SPDT) switch) via 2271*c*. The eighth switch 2270*d* can be configured to be coupled to the fifth switch 2270*a* via 2271*d*.

In another example, the eighth switch 2270*d* can be configured to be coupled to an input of a second amplification and filtering path and the sixth switch 2270*b* can be configured to be coupled to an output of the second amplification and filtering path. The second amplification and filtering path can comprise one or more of a low-noise amplifier (LNA) 2272, a variable attenuator 2274, a filter (e.g., a TDD band-pass filter (BPF)) 2276, or a power amplifier 2278. In another example, the power amplifier 2278 can comprise a variable gain power amplifier, a fixed gain power amplifier, or a gain block.

In another example, the filter 2276 can be configured to pass one or more of a first-direction (e.g., an uplink direction) of a second frequency range (e.g., one or more of 3GPP LTE TDD frequency bands 41, 48, or 49). In another example, the filter 2276 can be configured to communicate one or more of a first-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 2276 can be configured to communicate a first-direction of a selected channel within a 3GPP LTE TDD band or a 3GPP 5G TDD frequency band. In another example, the filter 2276 can be configured to communicate a first-direction of a selected frequency range within a 3GPP LTE TDD frequency range or a first-direction of a 3GPP 5G TDD frequency range.

In another example, after being directed along the TDD second amplification and filtering path, the TDD first-direction signal can be amplified and filtered in accordance with the type of amplifiers and filters included along the TDD second amplification and filtering path. At this point, the TDD first-direction signal can be directed to the eighth switch 2270*d*. The eighth switch 2270*d* can direct the TDD first-direction signal to the filter (e.g., a TDD BPF) 2219 via the seventh switch 2270*c*. The filter 2218 can direct the TDD first-direction signal to the multiplexer 2214. The multiplexer 2214 can be coupled to the second port 2205. The TDD first-direction signal can be directed from the multiplexer 2214 to the second port 2205. The TDD first-direction signal can be directed from the second port 2205 to the second antenna 2204. The second antenna 2204 can communicate the amplified and/or filtered TDD first-direction signal to a base station.

In another example, the second antenna 2204 can receive a second-direction signal from a base station. The second port 2205 can be configured to be coupled to the second antenna 2204. The second port 2205 can be coupled to the multiplexer 2214. The second-direction signal received at the second antenna 2204 from the base station can be directed to the multiplexer 2214. The multiplexer 2214 can direct the TDD second-direction signal, based on its frequency, to the seventh switch 2270*c* via the filter 2219. The TDD second-direction signal can be further directed to the input of the LNA 2272 via the eighth switch 2270*d*.

In another example, the filter 2276 can be configured to pass one or more of a second-direction (e.g., a downlink direction) of a second frequency range (e.g., one or more of 3GPP LTE TDD frequency bands 41, 48, or 49). In another example, the filter 2276 can be configured to communicate one or more of a second-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 2276 can be configured to communicate a second-direction of a selected channel within a 3GPP LTE TDD band or a 3GPP 5G TDD frequency band. In another example, the filter 2276 can be configured to communicate a second-direction of a selected frequency range within a 3GPP LTE TDD frequency range or a second-direction of a 3GPP 5G TDD frequency range.

In another example, after being directed along the TDD second amplification and filtering path, the TDD second-direction signal can be amplified and filtered in accordance with the type of amplifiers and filters included along the TDD second amplification and filtering path. At this point, the TDD second-direction signal can be directed to the sixth switch 2270*b*. The sixth switch 2270*b* can direct the amplified and/or filtered TDD second-direction signal to the multiplexer 2212 via the fifth switch 2270*a* and the filter 2217. The multiplexer 2212 can be coupled to a first port 2203. The TDD second-direction signal can be directed from the multiplexer 2212 to the first port 2203. The TDD second-direction signal can be directed from the first port 2203 to the first antenna 2202. The first antenna 2202 can communicate the amplified and/or filtered TDD second-direction signal to a wireless device.

In another example, the first amplification and filtering path can be configured to switch between amplifying and filtering a first TDD signal in a first frequency range of a first TDD first-direction signal and a first TDD signal in a first frequency range of a first TDD second-direction signal.

In another example, the second amplification and filtering path can be configured to switch between amplifying and filtering a second TDD signal in a second frequency range of a second TDD first-direction signal and a second TDD signal in a second frequency range of a second TDD second-direction signal.

In another example, a repeater can further comprise a single TDD sync detection module (TDD SDM) 2210 that can be configured as previously discussed with respect to TDD SDM 2110.

In another example, the TDD SDM 2210 can be coupled to a ninth switch (e.g., a SPDT switch) 2280. The ninth switch 2280 can be coupled to one or more detectors 2281*a* and one or more detectors 2281*b*. The TDD SDM 2210 can be configured to detect UL/DL configuration information for the first TDD signal using the one or more detectors 2281*a* and for the second TDD signal using the one or more detectors 2281*b*. The one or more detectors 2281*a* can be configured to detect the first TDD signal between the LNA 2252 and the variable attenuator 2254. The one or more detectors 2281*b* can be configured to detect the second TDD signal between the LNA 2272 and the variable attenuator 2274.

In another example, a repeater can comprise a controller 2206 that can be configured as previously discussed with respect to the controller 2106.

In another example, a repeater can further comprise a controller 2206 that can be configured to switch the first switch 2250*a* and a fourth switch 2250*d* to pass a first-direction TDD signal (e.g., an uplink TDD signal) from the filter 2216 to the first amplification and filtering path and switch the second switch 2250*b* and the third switch 2250*c* to pass the first-direction TDD signal from the output of the power amplifier 2258 to the second port 2205 via the filter 2218 and the multiplexer 2214.

In another example, the controller 2206 can be configured to switch the third switch 2250*c* and the fourth switch 2250*d* to pass a second-direction signal (e.g., a downlink TDD signal) from the second port 2205 to the TDD first amplification and filtering path and switch the second switch 2250*b* and the first switch 2250*a* to pass the second-direction TDD signal to the first port 2203 via the filter 2216 and the multiplexer 2212.

In another example, the controller 2206 can be configured to switch the fifth switch 2270*a* and an eighth switch 2270*d* to pass a first-direction TDD signal (e.g., an uplink TDD signal) from the filter 2217 to the second amplification and filtering path and switch the sixth switch 2270*b* and the seventh switch 2270*c* to pass the first-direction TDD signal from the output of the power amplifier 2278 to the second port 2205 via the filter 2219 and the multiplexer 2214.

In another example, the controller 2206 can be configured to switch the seventh switch 2270*c* and the eighth switch 2270*d* to pass a second-direction signal (e.g., a downlink TDD signal) from the second port 2205 to the TDD second amplification and filtering path and switch the sixth switch 2270*b* and the fifth switch 2270*a* to pass the second-direction TDD signal to the first port 2203 via the filter 2217 and the multiplexer 2212.

Figure 23:
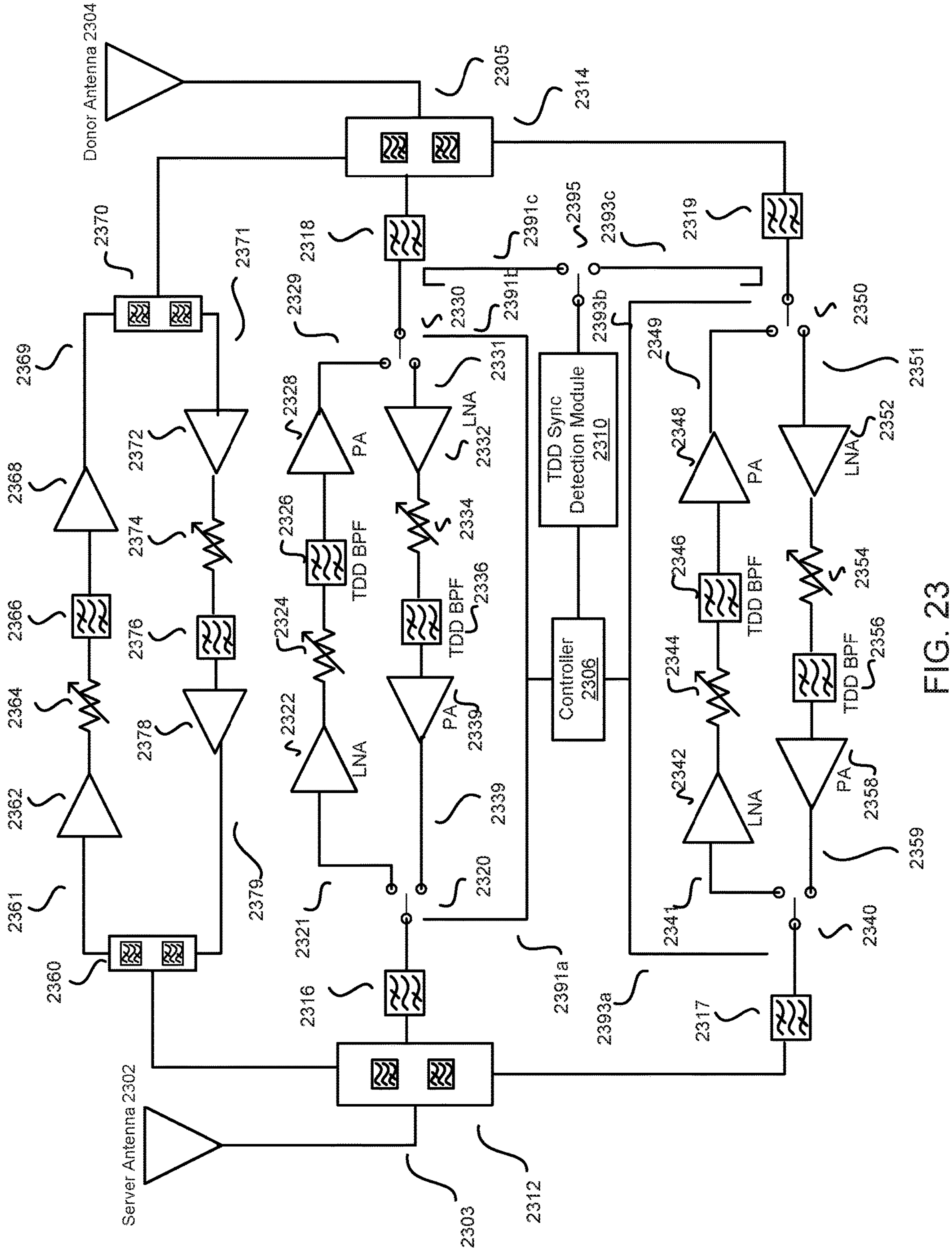
FIG. 23 illustrates a frequency division duplex (FDD)/time division duplex (TDD) multiband repeater in accordance with an example.

As illustrated in FIG. 23, in another example, a repeater can be a frequency division duplex (FDD)/time division duplex (TDD) integrated repeater. The repeater can be configured to be connected to a first antenna (e.g., a server antenna) 2302 and a second antenna (e.g., a donor antenna) 2304. The first antenna 2302 can receive a first-direction signal (e.g., an uplink signal) from a wireless device. The first antenna 2302 can be configured to be coupled to a first port (e.g., a server port) 2303. The first port 2303 can be coupled to a multiplexer 2312. The first-direction signal received at the first antenna 2302 from the wireless device can be directed to the multiplexer 2312. The multiplexer 2312 can direct an FDD first-direction signal, based on its frequency, to an FDD first-direction path via a duplexer 2360.

In another example, the FDD first-direction signal can be directed along the FDD first-direction path 2361. The FDD first-direction path can comprise one or more of a low-noise amplifier (LNA) 2362, a variable attenuator 2364, an FDD first-direction filter (e.g., an FDD uplink band-pass filter (BPF)) 2366, or a power amplifier 2368. In another example, the power amplifier 2368 can comprise a variable gain power amplifier, a fixed gain power amplifier, or a gain block.

The FDD first-direction filter 2366 can be configured to pass one or more of a first-direction (e.g., an uplink direction) of a first frequency range (e.g., one or more of 3GPP FDD frequency bands 2, 4, 5, 12, 13, 17, 25, 26, or 71). In another example, the FDD first-direction filter 2366 can be configured to pass one or more of a first-direction (e.g., an uplink direction) of 3GPP LTE FDD frequency bands 1-28, 30, 31, 65, 66, 68, 70-74, or 85, or 3GPP NR FDD frequency bands n1-n3, n5, n7, n8, n12, n20, n25, n28, n65, n66, n70, n71, or n74. In another example, the FDD first-direction filter 2366 can be configured to pass a first-direction of a selected channel within a 3GPP FDD band. The first-direction can be an uplink direction or a downlink direction.

In another example, after being directed along the first-direction path 2369, the FDD first-direction signal can be amplified and filtered in accordance with the type of amplifiers and filters including along the FDD amplification and filtering path 2361. The first-direction signal can be further directed to the multiplexer 2314 via the duplexer 2370. The multiplexer 2314 can direct the amplified and/or filtered first-direction signal from the duplexer 2370 to the second port 2305. The first-direction signal can be directed from the second port 2305 to the second antenna 2304. The second antenna 2304 can communicate the amplified and/or filtered FDD first-direction signal to a base station.

In another example, the second antenna 2304 can receive an FDD second-direction signal from a base station. The second antenna 2304 can be coupled to a second port 2305. The second port 2305 can be coupled to a multiplexer 2314. The FDD second-direction signal received at the donor antenna 2304 from the base station can be directed to the multiplexer 2314. The multiplexer 2314 can direct the FDD second-direction signal, based on its frequency, to an FDD second-direction path 2371 via the duplexer 2370.

In another example, the FDD second-direction signal can be directed along the FDD second-direction path. The FDD second-direction path can comprise one or more of a low-noise amplifier (LNA) 2372, a variable attenuator 2374, an FDD second-direction filter (e.g., an FDD DL band-pass filter (BPF)) 2376, or a power amplifier 2378. In another example, the power amplifier 2378 can comprise a variable gain power amplifier, a fixed gain power amplifier, or a gain block.

The FDD second-direction filter 2376 can be configured to pass one or more of a second-direction (e.g., a downlink direction) of an FDD frequency range (e.g., one or more of 3GPP FDD frequency bands 2, 4, 5, 12, 13, 17, 25, 26, or 71). In another example, the FDD second-direction filter 2376 can be configured to pass one or more of a second-direction (e.g., a downlink direction) of 3GPP LTE FDD frequency bands 1-28, 30, 31, 65, 66, 68, 70-74, or 85, or 3GPP NR FDD frequency bands n1-n3, n5, n7, n8, n12, n20, n25, n28, n65, n66, n70, n71, or n74. In another example, the FDD second-direction filter 2376 can be configured to pass a second direction of a selected channel within a 3GPP FDD band. The first-direction can be an uplink direction or a downlink direction.

In another example, after being directed along the second-direction path 2379, the FDD second-direction signal can be amplified and filtered in accordance with the type of amplifiers and filters including along the FDD second-direction amplification and filtering path. The second-direction signal can be further directed to the multiplexer 2312 via the duplexer 2360. The multiplexer 2312 can direct the amplified and/or filtered second-direction signal from the duplexer 2360 to the first port 2303. The second-direction signal can be directed from the first port 2303 to the first antenna 2302. The first antenna 2302 can communicate the amplified and/or filtered FDD second-direction signal to a wireless device.

In another example, the multiplexer 2312 can direct a TDD first-direction signal, based on its frequency, to a TDD first path or a TDD second path. In another example, the multiplexer 2314 can direct a TDD second-direction signal, based on its frequency, to a TDD first path or a TDD second path.

In another example, the TDD first path can comprise a filter (e.g., a TDD band-pass filter (BPF)) 2316 that is configured to be coupled to the multiplexer 2312 and a filter (e.g., a TDD BPF) 2318 that is configured to be coupled to the multiplexer 2314. The filter 2316 can be configured to be coupled to a first switch 2320 (e.g., a single-pole double-throw (SPDT) switch). The first switch 2320 can be configured to be coupled to a first-direction path 2321 of the TDD first path and a second-direction path 2339 of the TDD first path. The filter 2318 can be configured to be coupled to a second switch 2330 (e.g., a single-pole double-throw (SPDT) switch). The second switch 2330 can be configured to be coupled to a second-direction path 2331 of the TDD first path and a first-direction path 2329 of the TDD first path.

In another example, the first-direction path of the TDD first path can comprise one or more of a low-noise amplifier (LNA) 2322, a variable attenuator 2324, a filter (e.g., a TDD band-pass filter (BPF)) 2326, or a power amplifier 2328. In another example, the power amplifier 2328 can comprise a variable gain power amplifier, a fixed gain power amplifier, or a gain block.

In another example, the filter 2326 can be configured to pass one or more of a first-direction (e.g., an uplink direction) of a first frequency range (e.g., one or more of 3GPP LTE TDD frequency bands 41, 48, or 49). In another example, the filter 2326 can be configured to communicate one or more of a first-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 2326 can be configured to communicate a first direction of a selected channel within a 3GPP LTE TDD band or a 3GPP 5G TDD frequency band. In another example, the filter 2326 can be configured to communicate a first direction of a selected frequency range within a 3GPP LTE TDD frequency range or a first direction of a 3GPP 5G TDD frequency range.

In another example, after being directed along the TDD first-direction path of the TDD first path, the TDD first-direction signal can be amplified and filtered in accordance with the type of amplifiers and filters included along the TDD first-direction path. At this point, the TDD first-direction signal can be directed to the second switch 2330.

The second switch 2330 can direct the TDD first-direction signal to the filter (e.g., a TDD BPF) 2318. The filter 2318 can direct the TDD first-direction signal to the multiplexer 2314 and to the second port 2305. The TDD first-direction signal can be directed from the second port 2305 to the second antenna 2304. The second antenna 2304 can communicate the amplified and/or filtered TDD first-direction signal to a base station.

In another example, the second antenna 2304 can receive a second-direction signal from a base station. The second-direction signal received at the second antenna 2304 from the base station can be directed to the multiplexer 2314. The multiplexer 2314 can direct the TDD second-direction signal, based on its frequency, to the second switch (e.g., a SPDT switch) 2330.

In another example, the second-direction path 2331 of the TDD first path can comprise one or more of a low-noise amplifier (LNA) 2332, a variable attenuator 2334, a filter (e.g., a TDD BPF) 2336, or a power amplifier 2338. In another example, the power amplifier 2338 can comprise a variable gain power amplifier, a fixed gain power amplifier, or a gain block.

In another example, the filter 2336 can be configured to pass one or more of a second-direction (e.g., a downlink direction) of a first frequency range (e.g., one or more of 3GPP LTE TDD frequency bands 41, 48, or 49). In another example, the filter 2336 can be configured to communicate one or more of a second-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 2336 can be configured to communicate a second direction of a selected channel within a 3GPP LTE TDD band or a 3GPP 5G TDD frequency band. In another example, the filter 2336 can be configured to communicate a second direction of a selected frequency range within a 3GPP LTE TDD frequency range or a second direction of a 3GPP 5G TDD frequency range.

In another example, after being directed along the second-direction path of the TDD first path, the TDD second-direction signal can be amplified and filtered in accordance with the type of amplifiers and filters included along the TDD second-direction path. At this point, the TDD second-direction signal can be directed to the first switch (e.g., a SPDT switch) 2320. The first switch 2320 can direct the amplified and/or filtered TDD second-direction signal to the multiplexer 2312 via the filter 2316. The TDD second-direction signal can be directed from the multiplexer 2312 to the first port 2303 and to the first antenna 2302. The first antenna 2302 can communicate the amplified and/or filtered TDD second-direction signal to a wireless device.

In another example, the TDD second path can comprise a filter (e.g., a TDD band-pass filter (BPF)) 2317 that is configured to be coupled to the multiplexer 2312 and a filter (e.g., a TDD BPF) 2319 that is configured to be coupled to the multiplexer 2314. The filter 2317 can be configured to be coupled to a third switch 2340 (e.g., a single-pole double-throw (SPDT) switch). The third switch 2340 can be configured to be coupled to a first-direction path 2341 of the TDD second path and a second-direction path 2359 of the TDD second path. The filter 2317 can be configured to be coupled to a fourth switch 2350 (e.g., a single-pole double-throw (SPDT) switch). The fourth switch 2350 can be configured to be coupled to a second-direction path 2351 of the TDD second path and a first-direction path 2349 of the TDD second path.

In another example, the first-direction path of the TDD second path can comprise one or more of a low-noise amplifier (LNA) 2342, a variable attenuator 2344, a filter (e.g., a TDD band-pass filter (BPF)) 2346, or a power amplifier 2348. In another example, the power amplifier 2348 can comprise a variable gain power amplifier, a fixed gain power amplifier, or a gain block.

In another example, the filter 2346 can be configured to pass one or more of a first-direction (e.g., an uplink direction) of a second frequency range (e.g., one or more of 3GPP LTE TDD frequency bands 41, 48, or 49). In another example, the filter 2326 can be configured to communicate one or more of a first-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 2326 can be configured to communicate a first direction of a selected channel within a 3GPP LTE TDD band or a 3GPP 5G TDD frequency band. In another example, the filter 2326 can be configured to communicate a first direction of a selected frequency range within a 3GPP LTE TDD frequency range or a first direction of a 3GPP 5G TDD frequency range.

In another example, after being directed along the TDD first-direction path 2349 of the TDD second path, the TDD first-direction signal can be amplified and filtered in accordance with the type of amplifiers and filters included along the TDD first-direction path. At this point, the TDD first-direction signal can be directed to the fourth switch 2350. The fourth switch 2350 can direct the TDD first-direction signal to the filter (e.g., a TDD BPF) 2319. The filter 2319 can direct the TDD first-direction signal to the multiplexer 2314 and the second port 2305. The TDD first-direction signal can be directed from the second port 2305 to the second antenna 2304. The second antenna 2304 can communicate the amplified and/or filtered TDD first-direction signal to a base station.

In another example, a second-direction signal received at the second antenna 2304 from the base station can be directed to the multiplexer 2314. The multiplexer 2314 can direct the TDD second-direction signal, based on its frequency, to the fourth switch (e.g., a SPDT switch) 2350.

In another example, the second-direction path 2351 of the TDD second path can comprise one or more of a low-noise amplifier (LNA) 2352, a variable attenuator 2354, a filter (e.g., a TDD BPF) 2356, or a power amplifier 2358. In another example, the power amplifier 2358 can comprise a variable gain power amplifier, a fixed gain power amplifier, or a gain block.

In another example, the filter 2356 can be configured to pass one or more of a second-direction (e.g., a downlink direction) of a second frequency range (e.g., one or more of 3GPP LTE TDD frequency bands 41, 48, or 49). In another example, the filter 2356 can be configured to communicate one or more of a second-direction of 3GPP LTE TDD frequency bands 33 through 53 or 3GPP 5G TDD frequency bands n34, n38-n41, n50, n51, n77-n79 in Frequency Range 1 (FR1) or 3GPP 5G TDD frequency bands n257, n258, n260, n261 in Frequency Range 2 (FR2). In another example, the filter 2356 can be configured to communicate a second direction of a selected channel within a 3GPP LTE TDD band or a 3GPP 5G TDD frequency band. In another example, the filter 2356 can be configured to communicate a second direction of a selected frequency range within a 3GPP LTE TDD frequency range or a second direction of a 3GPP 5G TDD frequency range.

In another example, after being directed along the second-direction path of the TDD second path, the TDD second-direction signal can be amplified and filtered in accordance with the type of amplifiers and filters included along the TDD second-direction path. At this point, the TDD second-direction signal can be directed to the third switch (e.g., a SPDT switch) 2340. The third switch 2340 can direct the amplified and/or filtered TDD second-direction signal to the multiplexer 2312 via the filter 2317. The TDD second-direction signal can be directed from the multiplexer 2312 to the first port 2303. The TDD second-direction signal can be directed from the first port 2303 to the first antenna 2302. The first antenna 2302 can communicate the amplified and/or filtered TDD second-direction signal to a wireless device.

In another example, a repeater can further comprise a single TDD sync detection module (TDD SDM) 2310 that can be configured as previously discussed with respect to TDD SDM 2110. In another example, the TDD SDM 2310 can be configured to detect UL/DL configuration information for the first TDD signal using one or more detectors 2391*c* and for the second TDD signal using one or more detectors 2393*c*. The one or more detectors 2391*c* can be located between the filter 2316 and the first switch 2320. The one or more detectors 2393*c* can be located between the filter 2317 and the third switch 2340.

In another example, a repeater can comprise a controller 2306 that can be configured as previously discussed with respect to the controller 2106.

In another example, the controller 2306 can be configured to switch the first switch 2320 via 2391*a* to pass a first-direction TDD signal (e.g., an uplink TDD signal) from the filter 2316 to the TDD first-direction path 2321 of the first path and switch the second switch 2330 to pass the first-direction TDD signal to the second port 2305 via the filter 2318. In another example, the controller 2306 can be configured to switch the second switch 2330 via 2391*b* to pass a second-direction signal (e.g., a downlink TDD signal) from the second port 2305 to the TDD second-direction path 2331 and switch the first switch 2320 to pass the second-direction TDD signal to the first port 2303 via the filter 2316.

In another example, a controller 2306 can be configured to switch the third switch 2340 via 2393*a* to pass a first-direction TDD signal (e.g., an uplink TDD signal) from the filter 2317 to the TDD first-direction path 2341 of the second path and switch the fourth switch 2350 to pass the first-direction TDD signal to the second port 2305 via the filter 2319. In another example, the controller 2306 can be configured to switch the fourth switch 2350 via 2393*b* to pass a second-direction signal (e.g., a downlink TDD signal) from the second port 2305 to the TDD second-direction path 2351 and switch the third switch 2340 to pass the second-direction TDD signal to the first port 2303 via the filter 2317.

In another example, the repeater can further comprise m additional first-direction FDD amplification and filtering paths and m additional second-direction FDD amplification and filtering paths, wherein m can be an integer greater than or equal to 0. In another example, the repeater can further comprise n additional TDD amplification and filtering paths, wherein n can be an integer greater than or equal to 0.

In another example, each of the TDD amplification and filtering paths can comprise an amplification and filtering path configured to switch between amplification and filtering of a first-direction TDD signal and a second-direction TDD signal.

Figure 24:
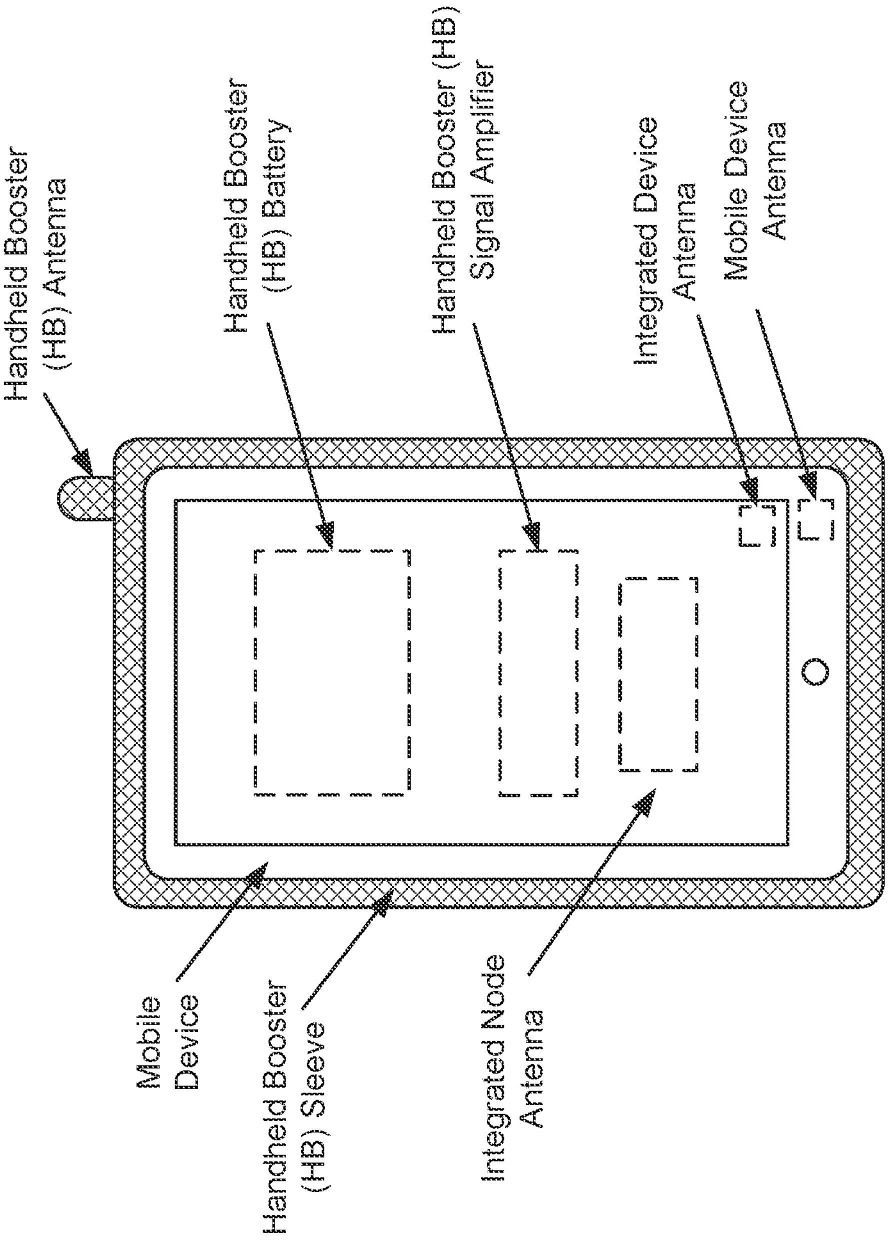
FIG. 24 illustrates a handheld booster in communication with a wireless device in accordance with an example.

While various embodiments described herein, and illustrated in FIGS. 1-23, have been described with respect to a cellular signal amplifier with a donor antenna and a server antenna, this is not intended to be limiting. A repeater can also be accomplished using a handheld booster, as illustrated in FIG. 24. The handheld booster can include an integrated device antenna and an integrated node antenna that are typically used in place of the server antenna and the donor antenna, respectively.

Figure 25:
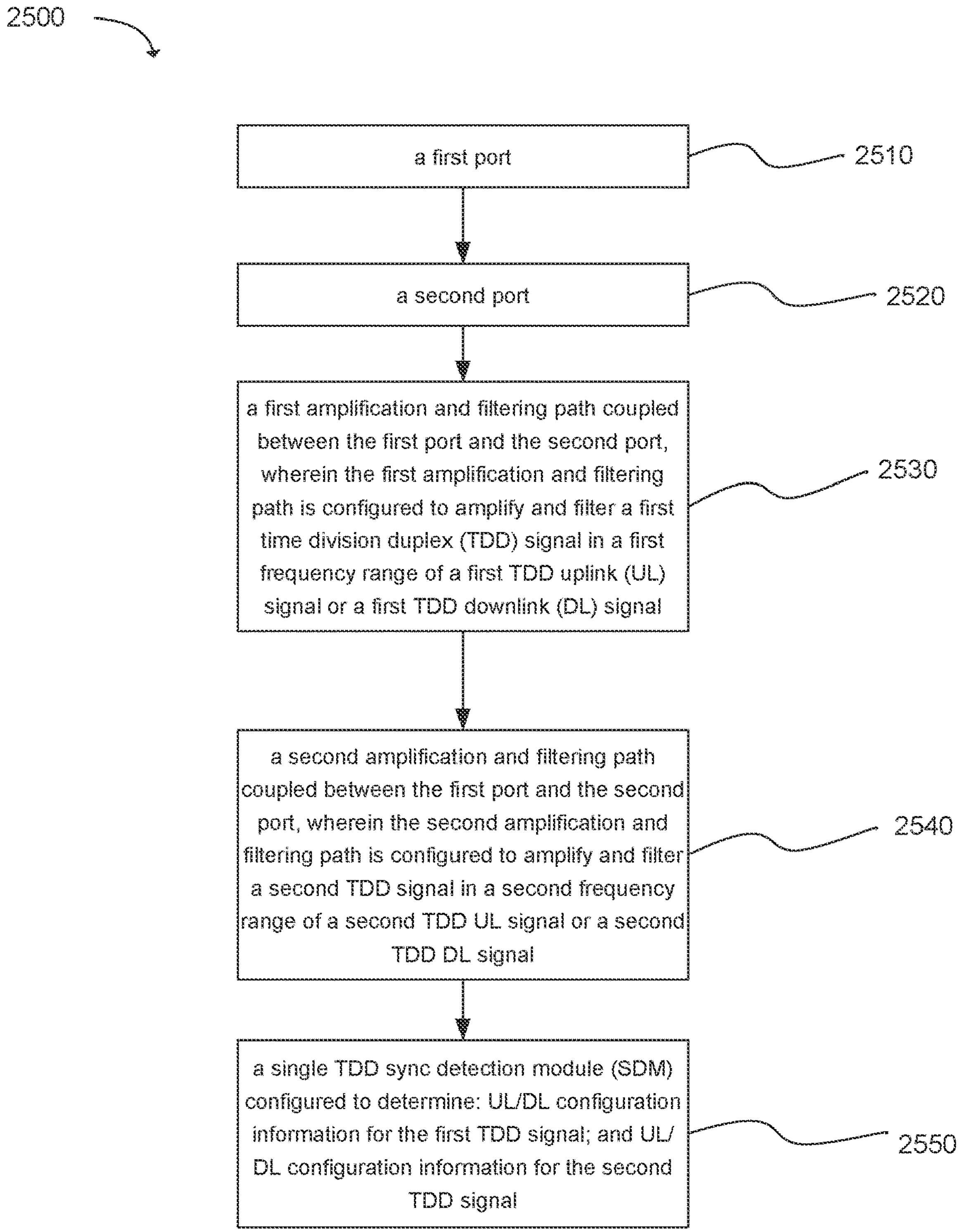
FIG. 25 depicts a repeater in accordance with an example.

Another example provides a repeater 2500, as shown in the flow chart in FIG. 25. The repeater can comprise: a first port, as shown in block 2510. The repeater can comprise: a second port, as shown in block 2520. The repeater can comprise a first amplification and filtering path coupled between the first port and the second port, wherein the first amplification and filtering path is configured to amplify and filter a first time division duplex (TDD) signal in a first frequency range of a first TDD uplink (UL) signal or a first TDD downlink (DL) signal, as shown in block 2530. The repeater can comprise a second amplification and filtering path coupled between the first port and the second port, wherein the second amplification and filtering path is configured to amplify and filter a second TDD signal in a second frequency range of a second TDD UL signal or a second TDD DL signal, as shown in block 2540. The repeater can comprise a single TDD sync detection module (SDM) configured to determine: UL/DL configuration information for the first TDD signal; and UL/DL configuration information for the second TDD signal, as shown in block 2550.

Figure 26:
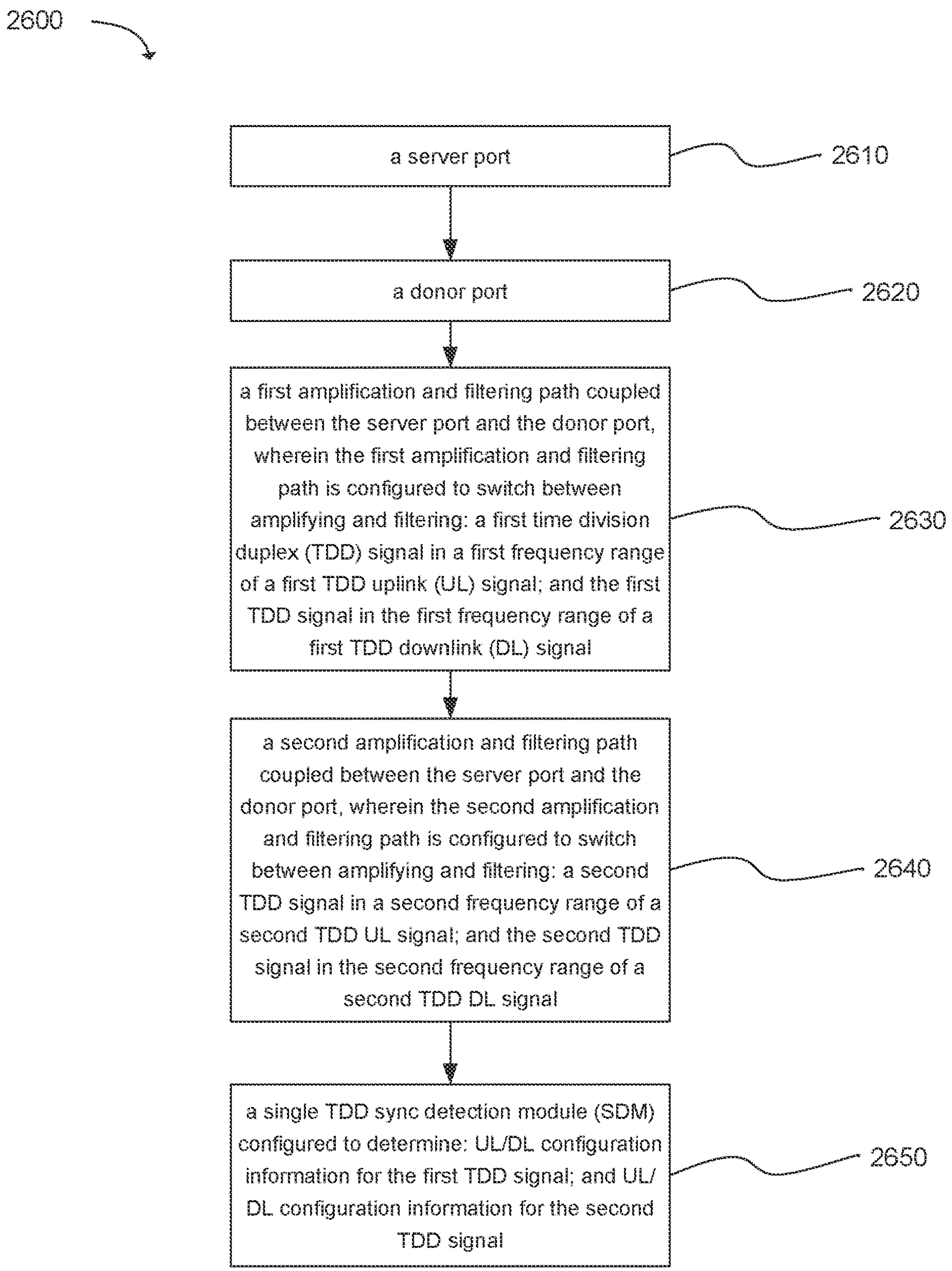
FIG. 26 depicts a repeater in accordance with an example.

Another example provides a repeater 2600, as shown in the flow chart in FIG. 26. The repeater can comprise a server port, as shown in block 2610. The repeater can comprise a donor port, as shown in block 2620. The repeater can comprise a first amplification and filtering path coupled between the server port and the donor port, wherein the first amplification and filtering path is configured to switch between amplifying and filtering: a first time division duplex (TDD) signal in a first frequency range of a first TDD uplink (UL) signal; and the first TDD signal in the first frequency range of a first TDD downlink (DL) signal, as shown in block 2630. The repeater can comprise a second amplification and filtering path coupled between the server port and the donor port, wherein the second amplification and filtering path is configured to switch between amplifying and filtering: a second TDD signal in a second frequency range of a second TDD UL signal; and the second TDD signal in the second frequency range of a second TDD DL signal, as shown in block 2640. The repeater can comprise a single TDD sync detection module (SDM) configured to determine: UL/DL configuration information for the first TDD signal; and UL/DL configuration information for the second TDD signal, as shown in block 2650.

Figure 27:
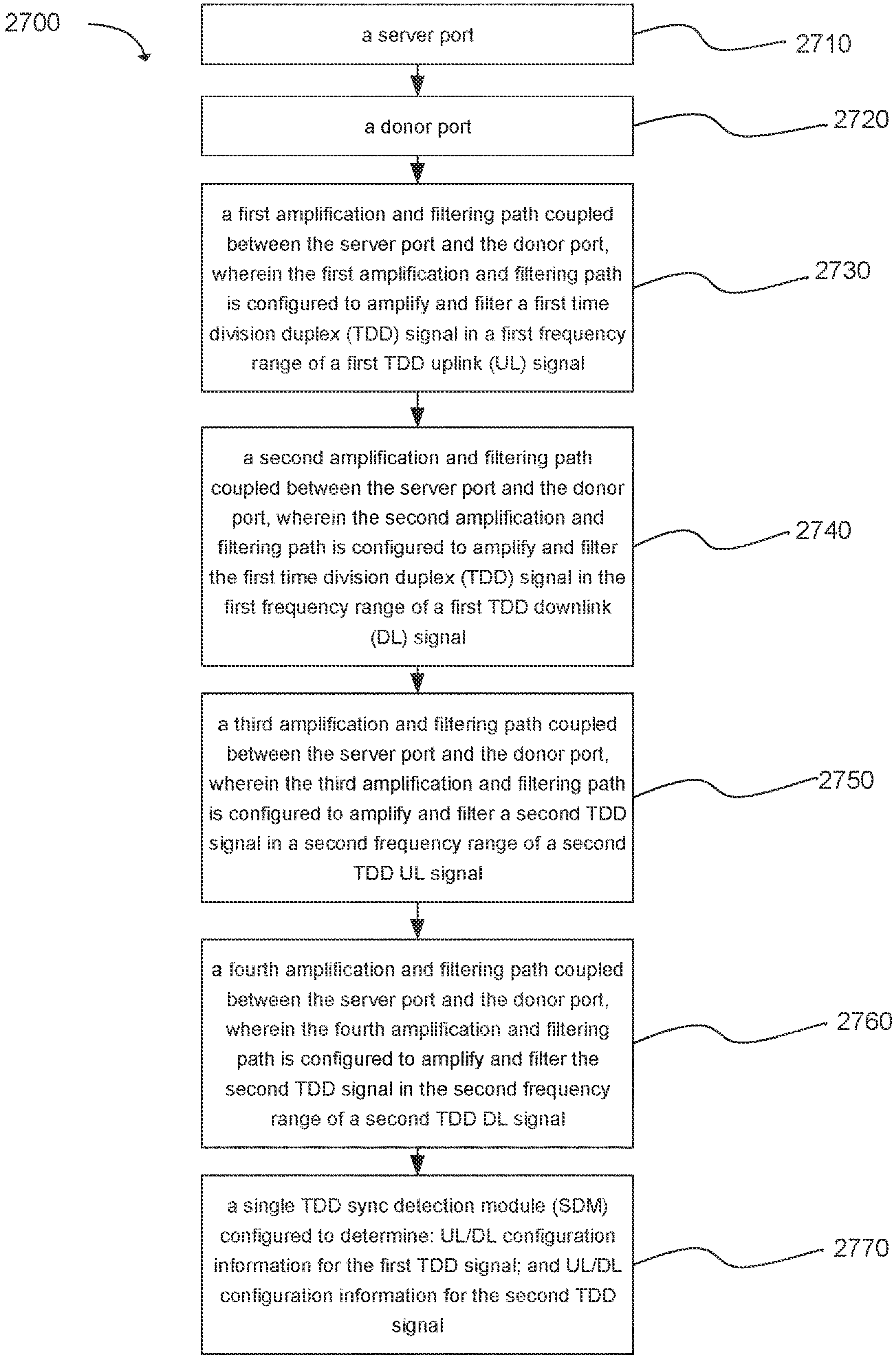
FIG. 27 depicts a repeater in accordance with an example.

Another example provides a repeater 2700, as shown in the flow chart in FIG. 27. The repeater can comprise a server port, as shown in block 2710. The repeater can comprise a donor port, as shown in block 2720. The repeater can comprise a first amplification and filtering path coupled between the server port and the donor port, wherein the first amplification and filtering path is configured to amplify and filter a first time division duplex (TDD) signal in a first frequency range of a first TDD uplink (UL) signal, as shown in block 2730. The repeater can comprise a second amplification and filtering path coupled between the server port and the donor port, wherein the second amplification and filtering path is configured to amplify and filter the first time division duplex (TDD) signal in the first frequency range of a first TDD downlink (DL) signal, as shown in block 2740. The repeater can comprise a third amplification and filtering path coupled between the server port and the donor port, wherein the third amplification and filtering path is configured to amplify and filter a second TDD signal in a second frequency range of a second TDD UL signal, as shown in block 2750. The repeater can comprise a fourth amplification and filtering path coupled between the server port and the donor port, wherein the fourth amplification and filtering path is configured to amplify and filter the second TDD signal in the second frequency range of a second TDD DL signal, as shown in block 2760. The repeater can comprise a single TDD sync detection module (SDM) configured to determine: UL/DL configuration information for the first TDD signal; and UL/DL configuration information for the second TDD signal, as shown in block 2770.

In another example, a repeater can comprise a first port and a second port. In one example, a first amplification and filtering path can be coupled between the first port and the second port. The first amplification and filtering path can be configured to amplify and filter a first TDD UL signal in a first frequency range. In one example, a second amplification and filtering path can be coupled between the first port and the second port. The second amplification and filtering path can be configured to amplify and filter a first TDD DL signal in a first frequency range. In some embodiments, the first amplification and filtering path and the second amplification and filtering path can include some of the same components. For example, one or more of an LNA, a PA, a filter, and the like can be used on both the first amplification and filtering path and the second amplification and filtering path.

In another example, the first frequency range or the second frequency range can be one or more of: Third Generation Partnership Project (3GPP) long term evolution (LTE) time division duplex (TDD) frequency bands 33-53; or 3GPP fifth generation (5G) TDD frequency bands n34, n38, n39, n40, n41, n50, n51, n77, n78, n79, n257, n258, n260, or n261.

In another example, a modem can be configured to generate an UL/DL indication signal for the first frequency range. The modem can be further configured to send the UL/DL indication signal to the repeater. The modem can be a long term evolution (LTE) layer-1 modem that can be configured to generate the UL/DL indication signal without using LTE layer-2 or LTE layer-3. The modem can support LTE layer-2 and LTE layer-3 functionality.

In another example, as previously illustrated in FIGS. 14*a* and 14*b*, a downlink direction can progress from layer 1 to layer 3 and an uplink direction can progress from layer 3 to layer 1. Layer 1 of the LTE stack can support: (i) DL and UL parameters (e.g., resource blocks, subcarriers per resource block, and subcarrier bandwidth), (ii) physical parameters (e.g., cyclic prefix (CP) length), (iii) 3GPP operation bands (e.g., FDD and TDD bands), (iv) frame structure (e.g., type 1 FDD, type 2 TDD), (v) UL/DL configurations (e.g., TDD configurations 0-6), (vi) modulation and demodulation (e.g., quaternary phase shift keying (QPSK), (vii) channel coding (e.g., turbo coding), (viii) DL physical channels (e.g., physical downlink shared channel (PDSCH), physical downlink control channel (PDCCH), Physical Control Format Indicator Channel (PCFICH, and the like), and (ix) UL physical channels (physical uplink shared channel (PUSCH), physical uplink control channel (PUCCH), and the like). Layer 2 of the LTE stack can include the medium access control (MAC) layer, the radio link control (RLC) layer, the packet data convergence protocol (PDCP) layer. Layer 3 of the LTE stack can include the radio resource control (RRC) layer and the non-access stratum (NAS) layer. In this example, an LTE packet can progress from the PHY in layer 1 to the MAC the RLC, and the PDCP in layer 2, and to the RRC and NAS in layer 3. In this example, an LTE packet can progress from the NAS and RRC in layer 3 to the PDCP, the RLC, and the MAC in layer 2, and to the PHY in layer 1.

In another example, the repeater can be configured to receive the UL/DL indication signal for the first frequency range from the modem. The repeater can be further configured to generate a switching signal for a first set of one or more switches to switch between the first amplification and filtering path and the second amplification and filtering path based on the UL/DL indication signal. The repeater can be further configured to send the switching signal to the first set of one or more switches to enable amplification of the first TDD UL signal or the first TDD DL signal.

In another example, the repeater can further comprise a third amplification and filtering path coupled between the first port and the second port, and a fourth amplification and filtering path coupled between the first port and the second port. The third amplification and filtering path can be configured to amplify and filter a second TDD UL signal in a second frequency range. The fourth amplification and filtering path can be configured to amplify and filter a second TDD DL signal in the second frequency range.

In another example, the modem can be further configured to generate a second UL/DL indication signal for the second frequency range. The modem can be further configured to send the second UL/DL indication signal to the repeater. In this example, the repeater can be further configured to receive the second UL/DL indication signal for the second frequency range and generate a second switching signal for a second set of one or more switches to switch between the third amplification and filtering path and the fourth amplification and filtering path based on the second UL/DL indication signal. The repeater can be further configured to send the second switching signal to the second set of one or more switches to enable amplification of the second TDD UL signal or the second TDD DL signal. In another example, the repeater can be configured to use the UL/DL indication signal to switch between an UL TDD signal and a DL TDD signal.

In another example, the modem can be further configured to receive synchronization information for the first frequency range or the second frequency range from a base station transmitting the first TDD DL signal or the second TDD DL signal, respectively.

In another example, the modem can be further configured to store the UL/DL indication signal for the first frequency range or the second frequency range. In this example, the modem can be further configured to use the UL/DL indication signal for the first frequency range as stored at the modem to reacquire the UL/DL indication information for the first frequency range in a subsequent time period. In this example, the modem can be further configured to use the UL/DL indication signal for the second frequency range as stored at the modem to reacquire the UL/DL indication information for the second frequency range in a subsequent time period.

In another example, the modem can be configured to generate the UL/DL indication signal for the first frequency range or the second frequency range from the synchronization information and the UL/DL configuration information for the first frequency range or the second frequency range, respectively.

Figure 28A:
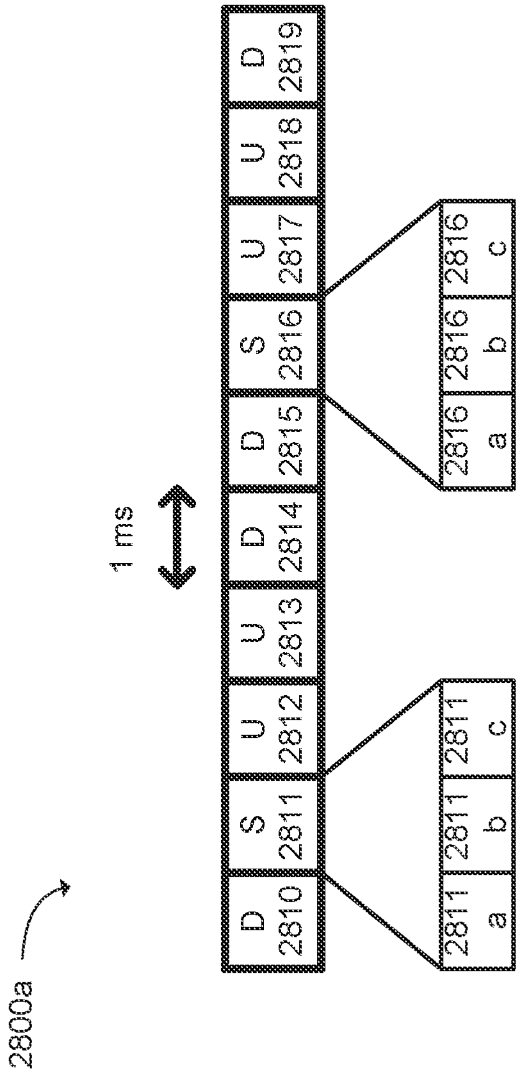
FIG. 28*a* illustrates a time division duplex (TDD) long term evolution (LTE) frame structure in accordance with an example.

In another example, as illustrated in FIG. 28*a*, a TDD LTE frame structure can include a ten-millisecond radio frame 2800*a* comprising 10 one-millisecond subframes 2810, 2811, 2812, 2813, 2814, 2815, 2816, 2817, 2818, and 2819 including downlink (D) subframes, special (S) subframes, and uplink (U) subframes. The special subframes 2811 and 2816 can include downlink pilot time slots (DwPTS), 2811*a* and 2816*a*, respectively. The special subframes can include guard periods, 2811*b* and 2816*b*, respectively. The special subframes can include uplink pilot time slots (UpPTS), 2811*c* and 2816*c*, respectively.

Figure 28B:
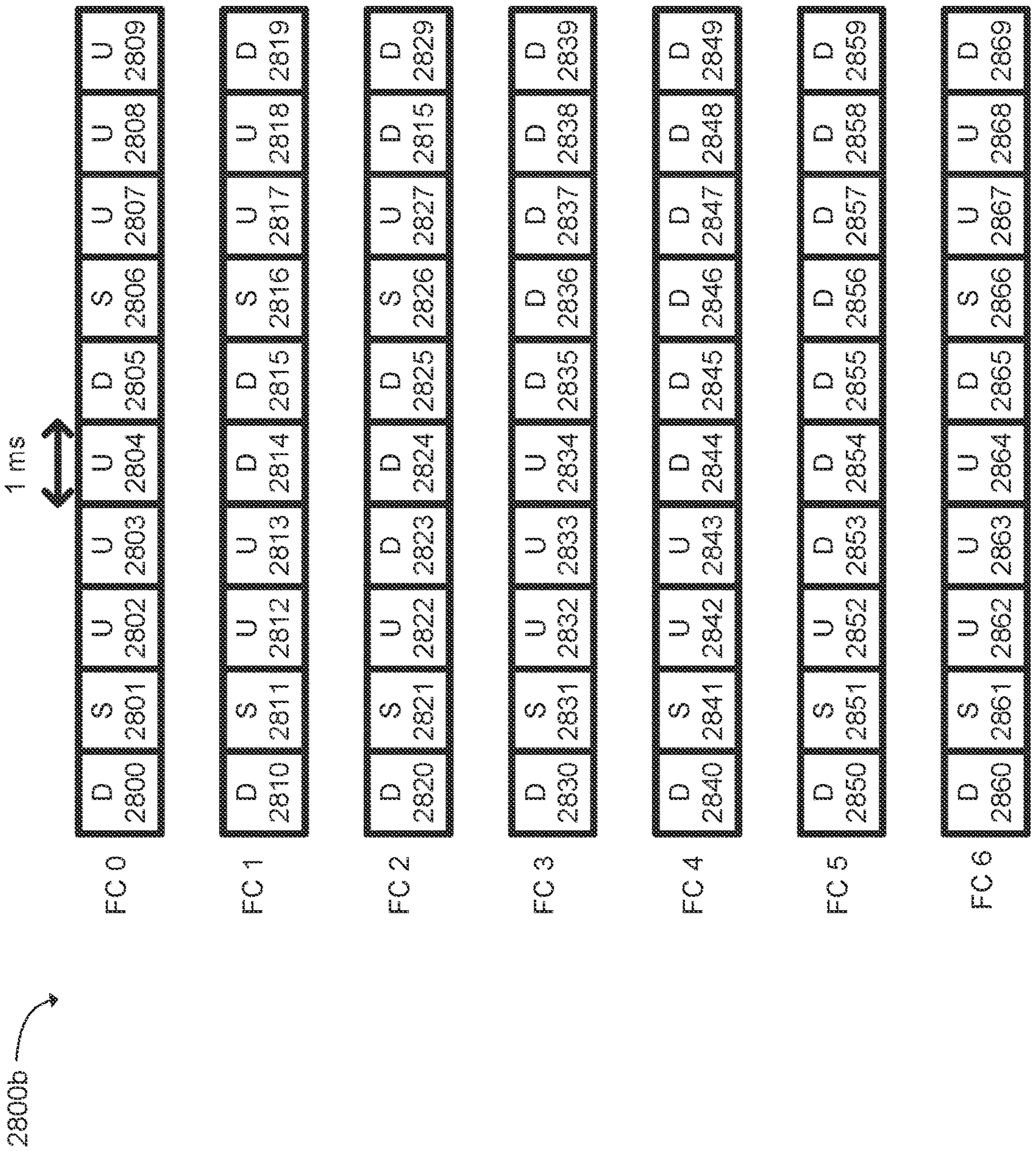
FIG. 28*b* illustrates a time division duplex (TDD) long term evolution (LTE) frame structure in accordance with an example.

In another example, as illustrated in FIG. 28*b*, a TDD LTE frame structure 2800*b* can include 7 different frame configurations (FC) (e.g., FC0, FC1, FC2, FC3, FC4, FC5, and FC6). Each of the 7 different frame configurations can include a different configuration of uplink subframes (U), special subframes (S), and downlink subframes (D) (e.g., 2800-1509, 2810-1519, 2820-1529, 2830-1539, 2840-1549, 2850-1559, and 2860-1569). The 7 different frame configurations (e.g., FC0, FC1, FC2, FC3, FC4, FC5, and FC6) can begin with a downlink subframe, which can be used for frame descriptor information (e.g., physical control format indicator channel (PCFICH) and physical downlink control channel (PDCCH)). A UE can be configured to receive the frame structure information in the first subframe (e.g., 2800, 2810, 2820, 2830, 2840, 2850, and 2860). The third subframe (e.g., 2802, 2812, 2822, 2832, 2842, 2852, 2862) in each of the different FCs (e.g., FC0, FC1, FC2, FC3, FC4, FC5, and FC6) can be used for uplink transmission.

In another example, when the subframe switches from downlink to uplink (e.g., 2800 to 2802, 2810 to 2812, 2820 to 2822, 2830 to 2832, 2840 to 2842, 2850 to 2852, 2860 to 2862, 2805 to 2807, 2815 to 2817, 2825 to 2827, and 2865 to 2867), there can be a special subframe between the downlink subframe and the uplink subframe (e.g., special subframes 2801, 2811, 2821, 2831, 2841, 2851, 2861, 2806, 2816, 2826, and 2866). In another example, there may be no special subframe when switching from uplink to downlink (e.g., after subframes 2804, 2813, 2818, 2822, 2827, 2834, 2843, 2852, 2864, and 2868).

Figure 28C:
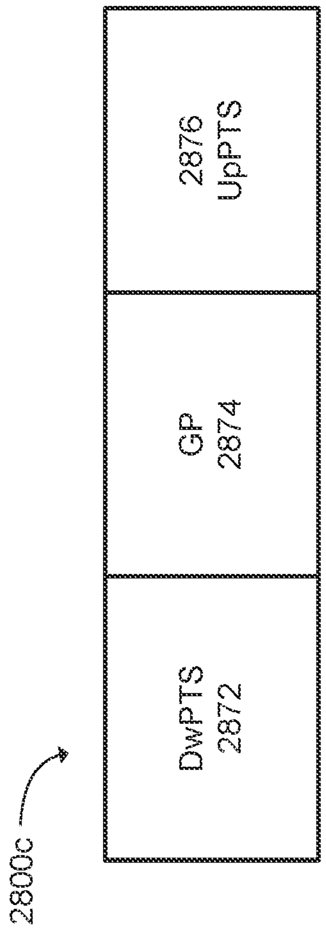
FIG. 28*c* illustrates a special subframe structure in accordance with an example.

In another example, as illustrated in FIG. 28*c*, a special subframe structure 2800*c* can be used for switching transmission from downlink to uplink and can include a downlink pilot time slot (DwPTS) 2872, a guard period (GP) 2874, and an uplink pilot time slot (UpPTS) 2876. The lengths of the DwPTS 2872, GP 2874, and UpPTS 2876 can have configurable lengths with a total sum of the DwPTS 2872, GP 2874, and UpPTS 2876 adding up to 1 millisecond (ms) or 14 symbols. The DwPTS 2872 can be configured as a DL subframe that can carry reference signals and control information and data when sufficient duration is configured. The DwPTS 2872 can also carry a primary synchronization signal (PSS). The GP 2874 can be used to control switching between UL and DL transmission. Because switching between transmission directions can have a hardware delay for both the UE and the BS, the GP 2874 can compensate for this hardware delay. The GP 2874 can be adequate to cover the propagation delay of DL interference. In another example, a maximum supportable cell size can be determined by the length of the GP, which can be from 1 to 10 symbols in length, with an OFDM symbol having a symbol period of about 0.5 ms for every 7 OFDM symbols for a normal cyclic prefix (CP) (e.g., 71.43 microseconds (mcs) per symbol). The UpPTS 2876 can be used for sounding reference signals (SRS) and physical random-access channels (PRACH) from the UE.

Figure 28D:
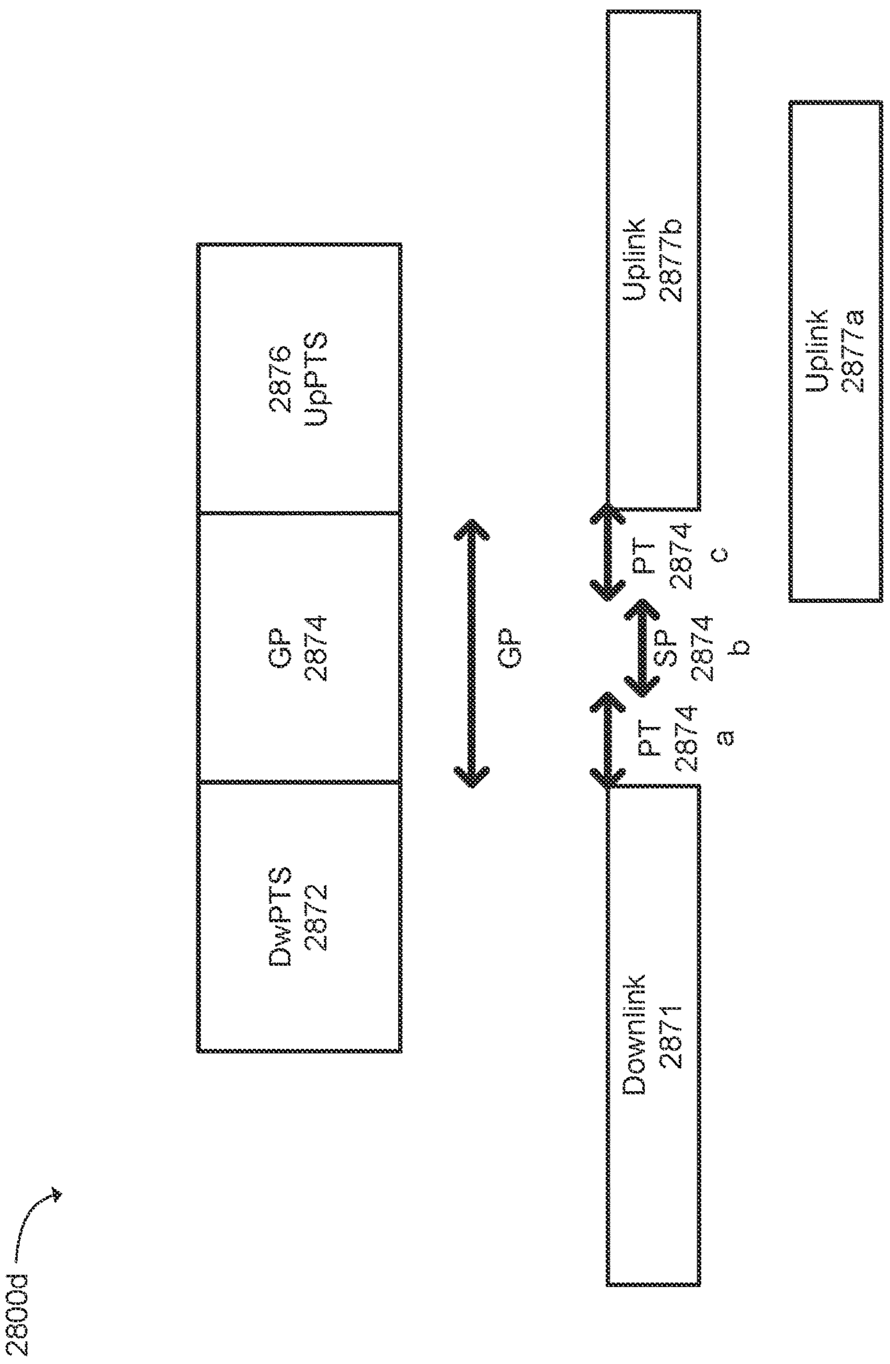
FIG. 28*d* illustrates a guard period for switching from downlink (DL) to uplink (UL) in accordance with an example.

In another example, as illustrated in FIG. 28*d*, a special subframe 2800*d* can include a DwPTS 2872, a GP 2874, and a UpPTS 2876. The guard period for switching from the DL subframe to the UL subframe can enable UL transmissions from multiple UEs to arrive at substantially the same time at the BS. A guard period for switching for switching from an UL subframe to a DL subframe may not be used because the BS can be transmitting without transmission by UEs, and the BS can issue a timing advance (TA) to the UE. The BS can end DL transmission after downlink 2871, and the downlink subframe can reach the UE before the end of a propagation time (PT) 2874*a*. The UE can be configured to switch transmission before the end of the transmission/receiving (Tx-Rx) switching timer (SP) 2874*b* and before the beginning of the uplink 2877*a*. The UL can reach the BS before the end of the PT 2874*c* and before the beginning of the uplink 2877*b*. In one example, the guard period can be the sum of the round-trip distance (RTD) and the SP. The RTD can be equal to the propagation time multiplied by 2.

In another example, as depicted in the table 2800*e* in FIG. 28*e*, the special subframe can impact the cell size. In TDD, there can be 9 special subframe configurations with a different number of OFDM symbols for DwPTS, GP, and UpPTS. The special subframe guard period can impact the cell size. The special subframe can compensate for the UL propagation delay and a longer GP can compensate for a higher propagation delay which can result in a larger cell size.

In another example, a special subframe can have 10 OFDM symbols in a GP. The total symbol time can be about 714.3 mcs, which each OFDM symbol being about 71.43 mcs. Because the velocity of light is about 300m per mcs, the round-trip distance can be about 214 km, and the cell radius can be about 107 km. The GP can indicate a maximum cell size and other parameters such as random-access channel (RACH) format, transmit power, receiver sensitivity, and target cell throughput.

In another example, as illustrated in FIGS. 16 and 17, a modem can be configured to receive a time division duplex (TDD) signal including synchronization information for a frequency range and uplink/downlink (UL/DL) configuration information for the frequency range from a TDD DL signal from a BS. The modem can be configured to receive a frame structure type (e.g., type2 TDD) and UL/DL frame configurations (e.g., TDD configurations 0 through 6). In this example, the modem can generate an UL/DL indication signal for the frequency range of the TDD signal from the synchronization information and the UL/DL configuration information, and send the UL/DL indication signal to a repeater without using timing advance information from the UE. The modem can accommodate varying degrees of timing advance from a plurality of UEs in the cell served by the repeater.

In another example, the repeater can determine the LTE TDD frame configuration from the LTE TDD signal. During an initial cell search for synchronization, the UE can search for the primary synchronization signal (PSS) and the secondary synchronization signal (SSS) on the DL from the BS. The detection of these signals (e.g., PSS and SSS) via time (PSS) and frequency (SSS) correlation can enable the UE to complete time and frequency synchronization and acquire system parameters such as cell identity, cyclic prefix length, and access mode (e.g., FDD or TDD).

In another example, when the access mode of TDD has been determined, the UL/DL frame configuration can be determined. TDD cells can operate with a fixed LTE TDD frame configuration (e.g., FC 0 through 6) for the cell wherein the UL/DL subframe sequence and the special subframe timing can be identified. The subframe can comprise a guard period for the cell that can enable a UE to compensate for cell propagation delay by advancing the UE's uplink timing.

In another example, when the UE's UL is time advanced, the UE can have a time spread between the UE's UL and DL transmissions. To allow for timing advance and associated UL/DL timing spread, the repeater's UL timing can start immediately after the DwPTS symbols in the downlink (i.e. the repeater can be configured to switch from DL to UL immediately after the DwPTS in the special subframe). In another example, the repeater can be configured to switch from UL to DL immediately at the UL to DL boundary. Both UL timing advance and UL-to-DL timing spread can be accommodated in the repeater's UL slot.

In another example, the repeater can be configured to demodulate the TDD DL signal from the BS (e.g., LTE layer 1 signals) to receive the TDD frame and sub-frame timing from the primary synchronization signal (PSS) and the secondary synchronization signal (SSS). The PSS can provide information to the repeater to achieve frame synchronization and the SSS can provide information to achieve symbol synchronization.

In another example, the repeater can be configured to switch from the first TDD DL signal to the first TDD UL signal within a first selected time period after downlink pilot time slot (DwPTS) symbols in a special subframe of the first TDD DL signal; or switch from the first TDD UL signal to the first TDD DL signal within a second selected time period after a subframe boundary between a UL subframe of the first TDD signal and a DL subframe of the first TDD DL signal. The first selected time period can be less than one or more of: 1 mcs, 500 nanoseconds, 300 nanoseconds, 200 nanoseconds, or 100 nanoseconds, and the second selected time period can be less than one or more of: 1 mcs, 500 nanoseconds, 300 nanoseconds, 200 nanoseconds, or 100 nanoseconds. The repeater can be configured to switch from the first TDD DL signal to the first TDD UL signal without using a timing advance (TA) value received from the UE; or switch from the first TDD UL signal to the first TDD DL signal without the TA value received from the UE.

In another example, the guard period can be equal to about 2 multiplied by G, which can cover substantially the entire cell. In some cases, the sum of the timing advance and the timing spread can be smaller than 2 multiplied by G. In other cases, the UE may use nearly the entire 2 multiplied by G guard period budget. In any case, the repeater can accommodate intermediate values of a UE's timing advance without having previous information when the repeater is switched at predetermined boundaries, as shown in FIGS. 16 and 17.

In another example, the repeater's DL timing slot can be sufficient in duration to cover the DL subframe of 1 ms and the DwPTS symbols. The total number of symbols can be configured based on the TDD frame configuration and the special subframe configuration.

In another example, the UL/DL switch timing shown in FIGS. 16 and 17 can accommodate a propagation delay (TD) between the repeater and the UE when the total propagation delay (Td) (e.g., td1 from the BS to the repeater and the td2 from the repeater to the UE) is less than or equal to the allocated guard period divided by 2 based on the cell size. In this example, the repeater UL switching period can allow for a plurality of UEs with varying timing advances to be accommodated.

Figure 29:
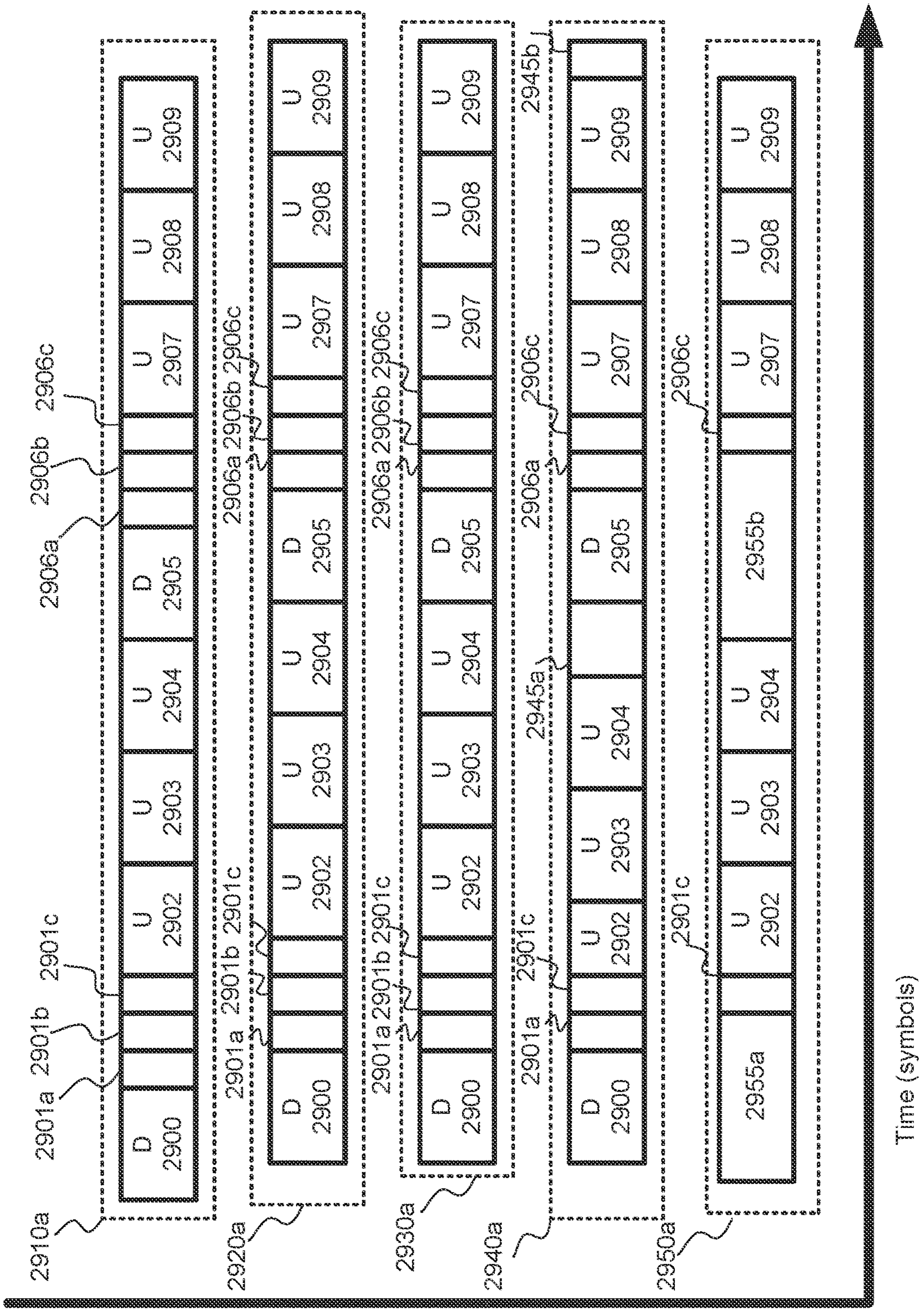
FIG. 29 illustrates a timing diagram showing negligible propagation delay between a repeater and a user equipment (UE) in accordance with an example.

In another example, as illustrated in FIG. 29, a timing diagram including a negligible propagation delay between the repeater and the UE can include an LTE TDD frame configuration 0 (e.g., subframes downlink (D) 2900, special (S) comprised of 2901*a* (DwPTS), 2901*b* (GP) and 2901*c* (UpPTS), uplink (U) 2902, U 2903, U 2904, D 2905, S 2906 comprised of 2906*a* (DwPTS), 2906*b* (GP), and 2906*c* (UpPTS), U 2907, U 2908, and U 2909) when: (A) transmitted from the BS, (B) received at the repeater, (C) transmitted from the repeater and received at the UE (D) transmitted from the UE, received at the repeater and transmitted from the repeater, and (E) received at the BS from the repeater. In this example, the propagation delay from BS to repeater on DL can be about G and the propagation delay from repeater to BS on UL can be about G, wherein G can be equal to about half of the guard period in the special subframe.

In this example, block 2910*a* shows the timing of LTE TDD frame configuration 0 transmitted from the BS when the maximum guard band is used. Subframe D 2900 begins at time 0. In another example, block 2920*a* shows the timing of LTE TDD frame configuration 0 received from the BS at time G. In another example, block 2930*a* shows the timing of LTE TDD frame configuration 0 transmitted from the repeater (with a delay of about 100 ns from the donor port to the server port of the repeater) and received at the UE (with negligible propagation delay). In another example, block 2940*a* shows the timing of LTE TDD frame configuration 0 transmitted from the UE and received at the repeater (with negligible propagation delay). In this example, block 2945*a* can be the result of the UE timing advance in block 2940*a* (e.g., the absence of 2901*b* in block 2940*a*) and 2945*b* can be the further result of the UE timing advance in subframe 2940*a*. In another example, block 2950*a* shows the timing of LTE TDD frame configuration 0 received at the BS from the repeater with a total propagation delay of about 2G. Blocks 2955*a* and 2955*b* can be the BS downlink and guard period. Block 2910*a* and block 2950*a* can be time-aligned in the UL subframes (e.g., 2901*c*, 2902, 2903, 2904, 2907, 2908, and 2909) because of the UE timing advance.

In another example, the repeater can be configured to switch from DL to UL immediately after the DwPTS in the special subframe (e.g., after 2901*a* in block 2920*a*) and the repeater can be configured to switch from UL to DL immediately at the UL to DL boundary (e.g., the boundary between 2904 and 2905). Therefore, 2900 and 2901*a* in block 2920 can be a repeater downlink slot and 2901*b*, 2901*c*, 2902, 2903, and 2904 can be a repeater uplink slot.

Figure 30:
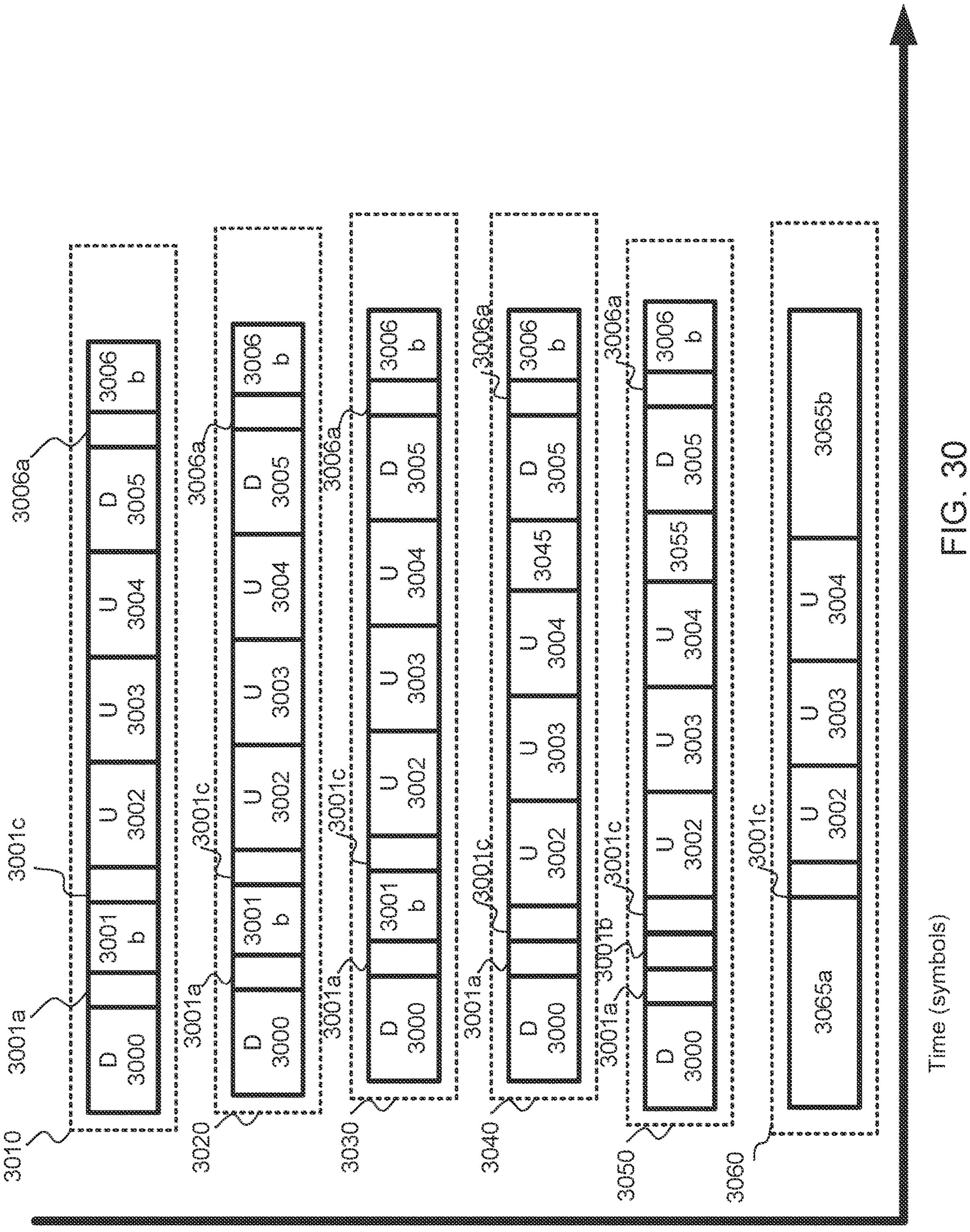
FIG. 30 illustrates a timing diagram showing propagation delay between a repeater and a user equipment (UE) in accordance with an example.

In another example, as illustrated in FIG. 30, a timing diagram including a significant propagation delay between the repeater and the UE can include an LTE TDD frame structure 0 (e.g., subframes downlink (D) 3000, special (S) 3001 comprised of 3001*a* (DwPTS), 3001*b* (GP), and 3001*c* (UpPTS), uplink (U) 3002, U 3003, U 3004, D 3005, 3006*a*, and 3006*b*) when: (A) transmitted from the BS, (B) received at the repeater from the BS, (C) received at the UE from the repeater, (D) transmitted from the UE to the repeater, (E) transmitted from the repeater to the BS, and (F) received at the BS. In this example, the propagation delay from BS to repeater on DL can be about G and the propagation delay from repeater to BS on UL can be about G, wherein G can be equal to about a quarter of the guard period in the special subframe. In this example, the propagation delay from BS to UE on the DL can be G, and the propagation delay from UE to BS can be G. The propagation delays in this example are for purposes of illustration only, and the propagation delay from the BS to repeater on DL, from the repeater to the UE on DL, from the UE to the repeater on UL, and from the repeater to the BS on UL can each have different values.

In this example, block 3010 shows the timing of LTE TDD frame configuration 0 transmitted from the BS when the maximum guard band is used. Subframe D 3000 begins at time 0. In another example, block 3020 shows the timing of LTE TDD frame configuration 0 received from the BS at time G at the repeater. In another example, block 3030 shows the timing of LTE TDD frame configuration 0 transmitted from the repeater (with a delay of about 100 ns from the donor port to the server port of the repeater) and received at the UE (with a propagation delay of an additional G). In another example, block 3040 shows the timing of LTE TDD frame configuration 0 transmitted from the UE and received at the repeater (with propagation delay of an additional G). Block 3045 can be the time spread between UL and DL due to the timing advance. In another example, block 3050 shows the timing of LTE TDD frame configuration 0 transmitted from the repeater. Block 3055 can be the time spread between UL and DL due to the timing advance. In another example, block 3060 shows the timing of LTE TDD frame configuration 0 received at the BS from the repeater. Blocks 3065*a* and 3065*b* can be the BS downlink and guard period. Block 3010 and block 3060 can be time-aligned in the UL subframes (e.g., 3001*c*, 3002, 3003, and 3004) because of the UE timing advance. Block 3020 and block 3050 can be synchronized in DL subframe 3005, and block 3030 and block 3040 can be synchronized in DL subframe 3005.

In the example illustrated in FIG. 30, the repeater switch points can be the same as the repeater switch points in FIG. 29. For example, the repeater can be configured to switch from DL to UL immediately after the DwPTS in the special subframe (e.g., after 3001*a* in block 3020) and the repeater can be configured to switch from UL to DL immediately at the UL to DL boundary (e.g., the boundary between 3004 and 3005). Therefore, 3000 and 3001*a* in block 3020 can be a repeater downlink slot and 3001*b*, 3001*c*, 3002, 3003, and 3004 can be a repeater uplink slot. This rule can also be used for TDD frame configurations 0 through 5 where there is a single UL and DL timing per frame. For TDD frame configuration 6, in which there are two different UL and DL timing slots per frame, the repeater can also be configured to switch from DL to UL immediately after the DwPTS in the special subframe and the repeater can be configured to switch from UL to DL immediately at the UL to DL boundary.

In another example, an LTE layer 3 modem can be registered on the cell to receive timing advance and medium access control (MAC) control. In this example, the timing can be valid for the location of the repeater. In some examples, the timing may not be valid for a plurality of UEs with varying timing advances.

In another example, the modem can be configured to generate the UL/DL indication signal for a frequency range without using a subscriber identity module (SIM) or a SIM card. The modem may not register, connect, or attached to a particular network, which allows operation without a SIM. Operating a modem without a SIM card can enable the modem to receive the synchronization information and the UL/DL configuration information from multiple cellular carriers without having a contract with multiple cellular carriers or paying fees to each of the cellular carriers. Further, operating a modem without a SIM card can prevent security issues arising from unauthorized SIM card intrusions. Further, the hardware complexity of the modem can be reduced with a reduction in the number of components.

Figure 31:
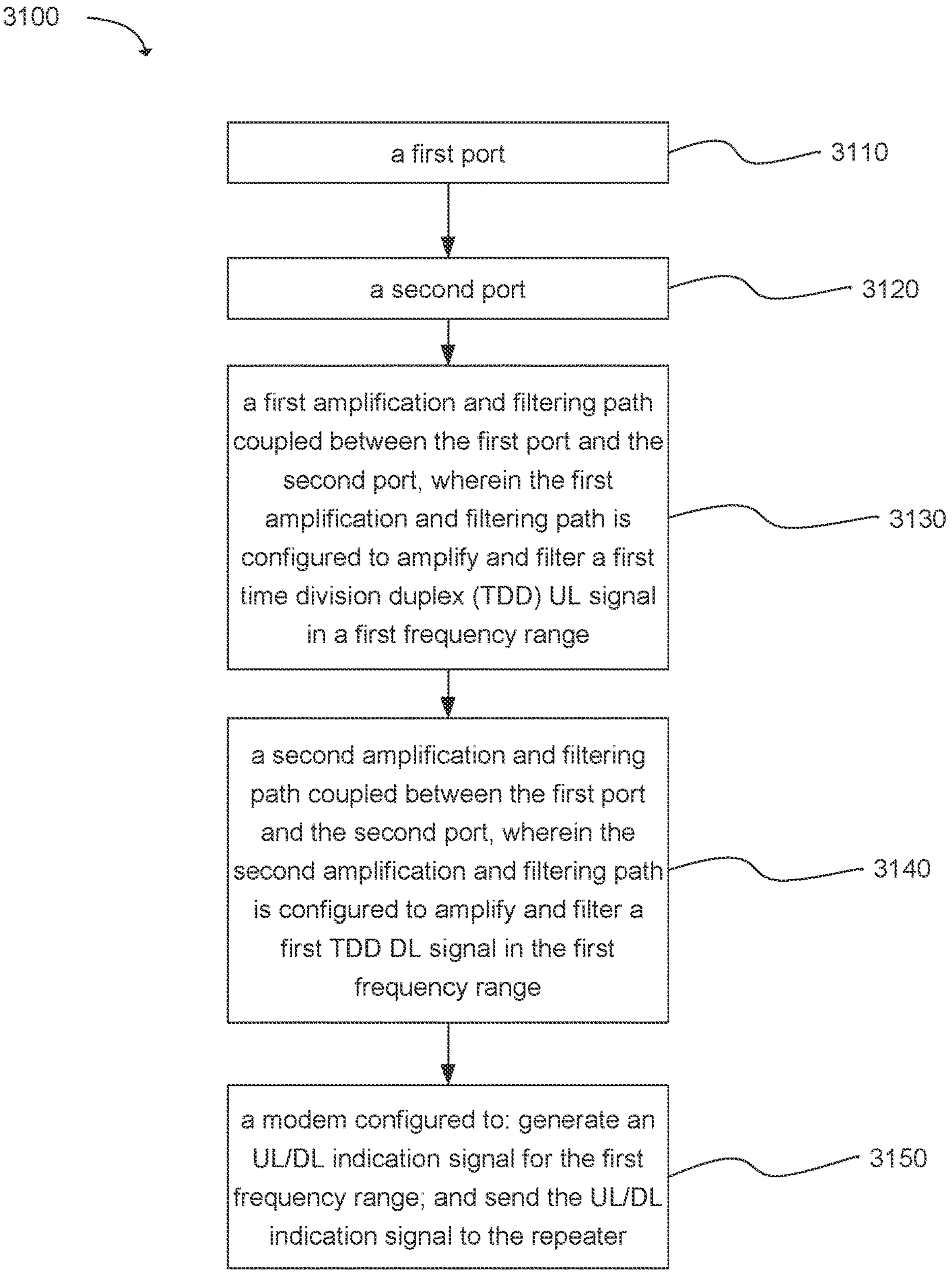
FIG. 31 depicts a repeater in accordance with an example.

Another example provides a repeater 3100, as shown in the flow chart in FIG. 31. The repeater can comprise: a first port, as shown in block 3110. The repeater can comprise: a second port, as shown in block 3120. The repeater can comprise a first amplification and filtering path coupled between the first port and the second port, wherein the first amplification and filtering path is configured to amplify and filter a first time division duplex (TDD) UL signal in a first frequency range, as shown in block 3130. The repeater can comprise a second amplification and filtering path coupled between the first port and the second port, wherein the second amplification and filtering path is configured to amplify and filter a first TDD DL signal in the first frequency range, as shown in block 3140. The repeater can comprise a modem configured to: generate an UL/DL indication signal for the first frequency range; and send the UL/DL indication signal to the repeater, as shown in block 3150.

Figure 32:
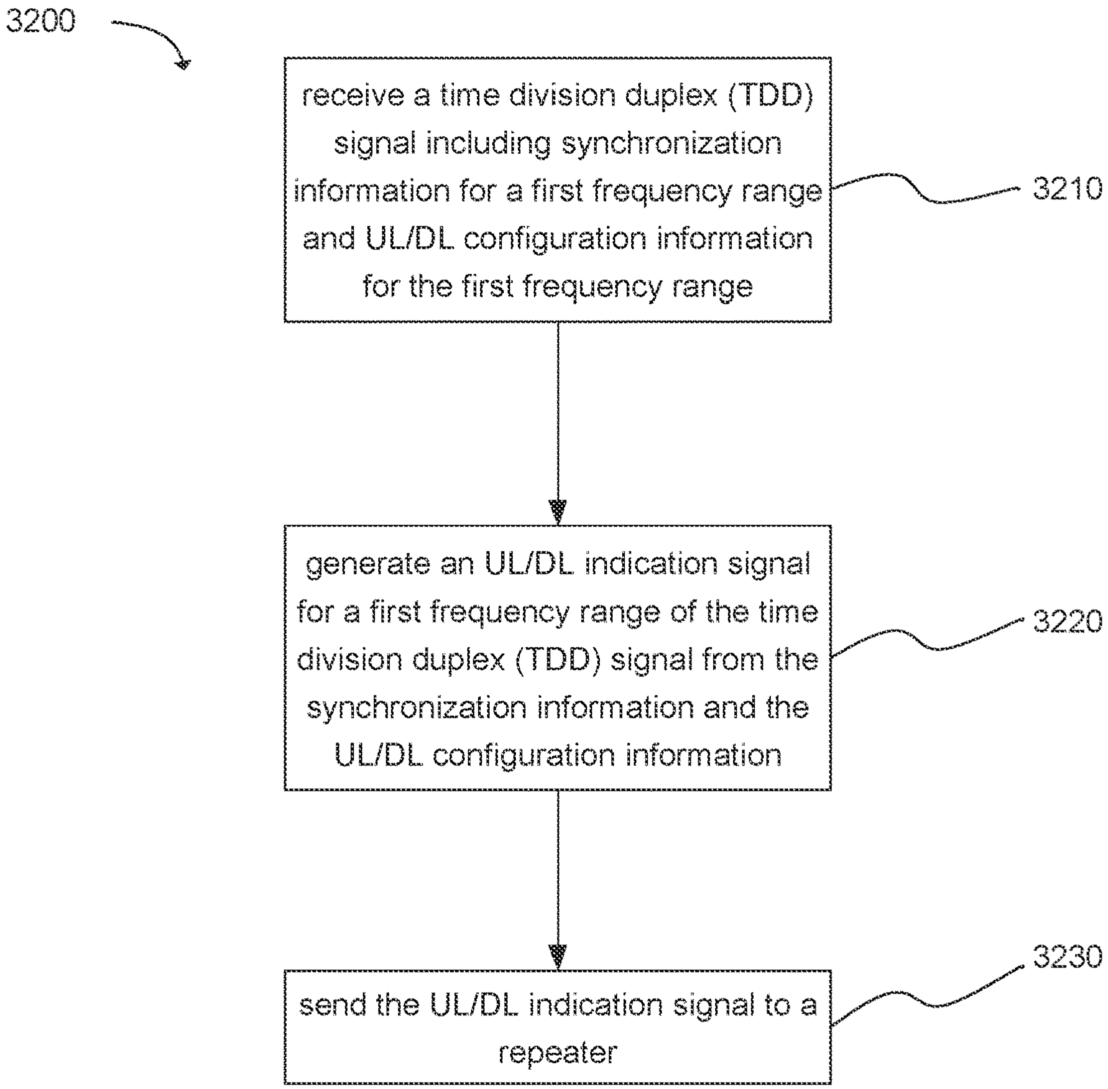
FIG. 32 depicts a modem in accordance with an example.

Another example provides a modem 3200, as shown in the flow chart in FIG. 32. The repeater can be configured to receive a time division duplex (TDD) signal including synchronization information for a first frequency range and UL/DL configuration information for the first frequency range, as shown in block 3210. The repeater can be configured to generate an UL/DL indication signal for a first frequency range of the time division duplex (TDD) signal from the synchronization information and the UL/DL configuration information, as shown in block 3220. The repeater can be configured to send the UL/DL indication signal to a repeater, as shown in block 3230.

Repeater with Integrated Modem for Remote Monitoring

After installation of a signal booster, repeater, or bi-directional amplifier (BDA) it can be difficult to determine the status of the signal booster, repeater, or bi-directional amplifier without using remote monitoring. Without remote monitoring, a technician may need to return to the location where the signal booster, repeater, or BDA has been installed in order to fix any problems with the signal booster, repeater, or BDA. This presents a few problems: first, the signal booster, repeater, or BDA may be non-functional for an extended period of time before it can be determined that the signal booster, repeater, or BDA is non-functional; second, it can be more costly and time-consuming to have a technician diagnose and fix any problems with the repeater; third, the signal booster, repeater, or BDA may incur significant downtime while the technician is repairing the non-functional booster, repeater, or BDA.

A modem, which can be a certified wireless modem, can be used for remote monitoring of the signal booster, repeater, or BDA. In one embodiment, a modem can be communicatively coupled between an indoor (server) antenna and a multiplexer (splitter, duplexer, circulator, etc.), using a one or more of a coupler and an antenna, to allow the modem to transmit information from a BDA control circuit and communicate information to the BDA control circuit. There are advantages with placing the modem at this location in comparison to other locations where the modem could be placed as will be described in proceeding paragraphs.

Using a modem can provide awareness of non-functional or improperly performing BDAs and can efficiently address problems out in the field. This can reduce the associated downtime of the BDA. For purposes of this application, BDA is synonymous with repeater and signal booster, and all three terms can be used interchangeably.

Figure 33:
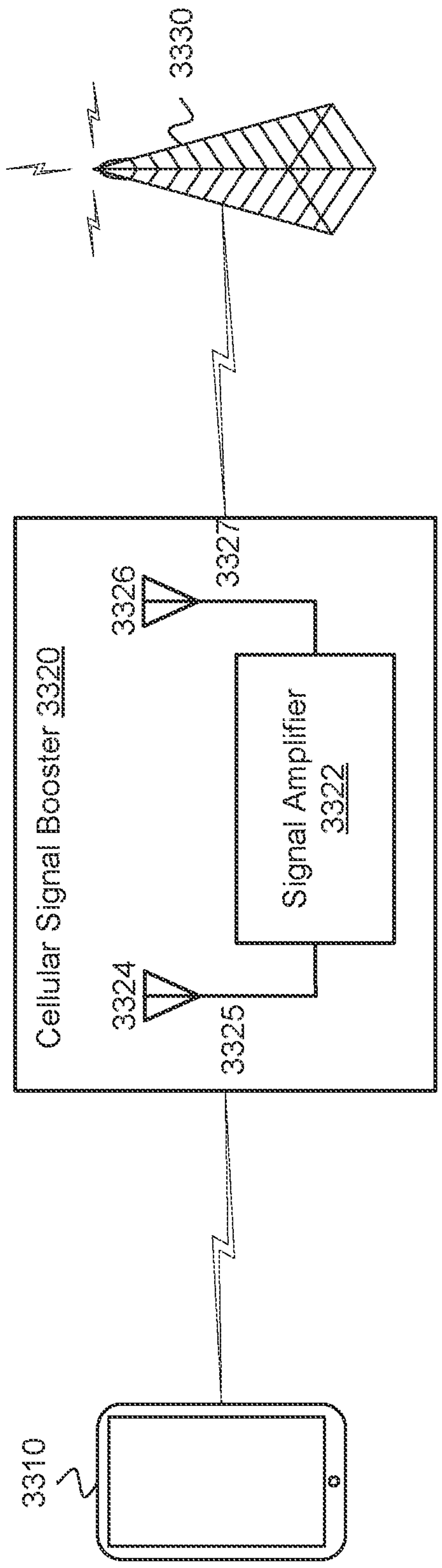
FIG. 33 illustrates a signal booster in communication with a wireless device and a base station in accordance with an example.

FIG. 33 illustrates an exemplary signal booster 3320 in communication with a wireless device 3310 and a base station 3330. The signal booster 3320 (also referred to as a cellular signal amplifier) can improve the quality of wireless communication by amplifying, filtering, and/or applying other processing techniques via a signal amplifier 3322 to uplink signals communicated from the wireless device 3310 to the base station 3330 and/or downlink signals communicated from the base station 3330 to the wireless device 3310. In other words, the signal booster 3320 can amplify or boost uplink signals and/or downlink signals bi-directionally. In one example, the signal booster 3320 can be at a fixed location, such as in a home or office. Alternatively, the signal booster 3320 can be attached to a mobile object, such as a vehicle or a wireless device 3310.

In one configuration, the signal booster 3320 can include a device antenna 3324 (e.g., an inside antenna or server antenna or a coupling antenna) and a node antenna 3326 (e.g., an outside antenna or donor antenna). The device antenna 3324 and/or the node antenna can be integrated. The node antenna 3326 can receive the downlink signal from the base station 3330. The downlink signal can be provided to the signal amplifier 3322 via a second coaxial cable 3327 or other type of radio frequency connection operable to communicate radio frequency signals. The signal amplifier 3322 can include one or more cellular signal amplifiers for amplification and filtering. The downlink signal that has been amplified and filtered can be provided to the device antenna 3324 via a first coaxial cable 3325 or other type of radio frequency connection operable to communicate radio frequency signals. The device antenna 3324 can wirelessly communicate the downlink signal that has been amplified and filtered to the wireless device 3310.

Similarly, the device antenna 3324 can receive an uplink signal from the wireless device 3310. The uplink signal can be provided to the signal amplifier 3322 via the first coaxial cable 3325 or other type of radio frequency connection operable to communicate radio frequency signals. The signal amplifier 3322 can include one or more cellular signal amplifiers for amplification and filtering. The uplink signal that has been amplified and filtered can be provided to the node antenna 3326 via the second coaxial cable 3327 or other type of radio frequency connection operable to communicate radio frequency signals. The node antenna 3326 can communicate the uplink signal that has been amplified and filtered to a node, such as base station 3330.

In one example, the signal booster 3320 can send uplink signals to a node and/or receive downlink signals from the node. While FIG. 33 shows the node as a base station 3330, this is not intended to be limiting. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one example, the signal booster 3320 can include a battery to provide power to various components, such as the signal amplifier 3322, the device antenna 3324 and the node antenna 3326. The battery can also power the wireless device 3310 (e.g., phone or tablet). Alternatively, the signal booster 3320 can receive power from the wireless device 3310.

In one configuration, the signal booster 3320 can be a Federal Communications Commission (FCC)-compatible consumer signal booster. As a non-limiting example, the signal booster 3320 can be compatible with FCC Part 20 or 47 Code of Federal Regulations (C.F.R.) Part 20.21 (Mar. 21, 2013). In addition, the signal booster can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R.

The signal booster 3320 can be configured to automatically self-monitor its operation to ensure compliance with applicable noise and gain limits. The signal booster 3320 can either self-correct or shut down automatically if the signal booster's operations violate the regulations defined in 47 CFR Part 20.21.

In one configuration, the signal booster 3320 can improve the wireless connection between the wireless device 3310 and the base station 3330 (e.g., cell tower) or another type of wireless wide area network (WWAN) access point (AP). The signal booster 3320 can boost signals for cellular standards, such as the 3GPP Long Term Evolution (LTE) Release 8, 9, 10, 11, 12, 13, 14, 15, or 16, and 3GPP Release 15 fifth generation (5G) Release 15 or 16. In one configuration, the signal booster 3320 can boost signals for 3GPP LTE Release 16.1.0 (March 2019) or other desired releases. The signal booster can also operate on the frequency bands recited in the Third Generation Partnership Project (3GPP) Technical Specification (TS) 36.104 (Release 16 Mar. 2019). The frequency bands include, but are not limited to, Evolved Universal Mobile Telecommunications System (UMTS) Terrestrial Radio Access operating bands 1-76 that are recited in Table 5.5-1 3GPP TS 36.104, Version 16.1.0 (2019-03).

In another configuration, the signal booster 3320 can boost signals from the 3GPP Technical Specification (TS) 38.104 (Release 15 Mar. 2019) bands or 5G frequency bands. In addition, the signal booster 120 can boost selected frequency bands based on the country or region in which the signal booster is used, including any of bands n1-n86, n257-n261, or other bands, as disclosed in 3GPP TS 38.104 V15.5.0 (2019-03).

The number of LTE frequency bands and the level of signal improvement can vary based on a particular wireless device, cellular node, or location. Additional domestic and international frequencies can also be included to offer increased functionality. Selected models of the signal booster 3320 can be configured to operate with selected frequency bands based on the location of use. In another example, the signal booster 3320 can automatically sense from the wireless device 3310 or base station 3330 (or GPS, etc.) which frequencies are used, which can be a benefit for international travelers.

After installation of a signal booster, repeater, or bi-directional amplifier (BDA) it can be difficult to determine the status of the signal booster, repeater, or bi-directional amplifier without using remote monitoring. A modem, which can be a certified wireless modem, can be used for remote monitoring of the signal booster, repeater, or bi-directional amplifier. Using a modem can provide awareness of non-functional or improperly performing BDAs and can efficiently address problems out in the field. This can reduce the associated downtime of the BDA.

Figure 34:
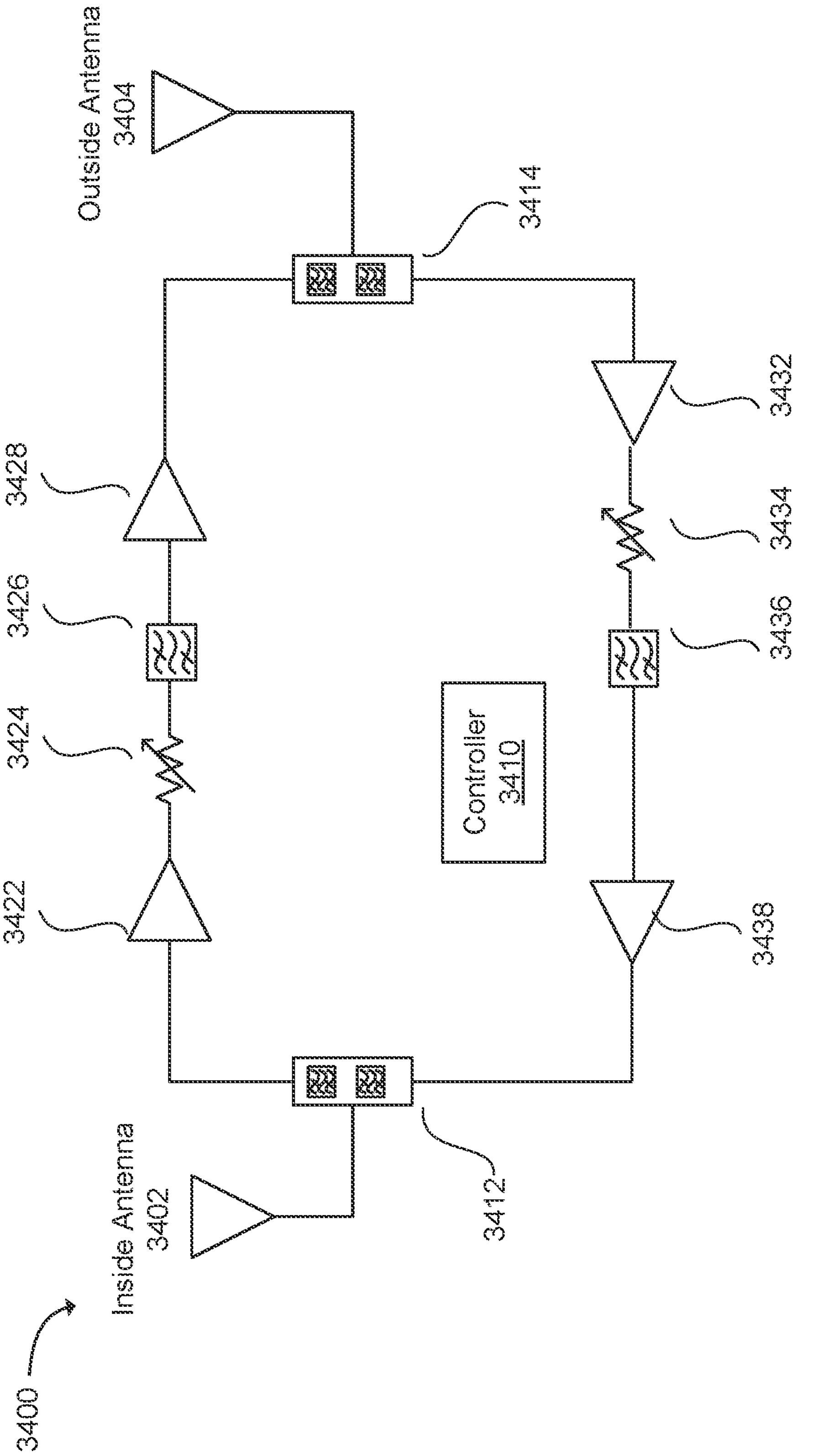
FIG. 34 illustrates a bi-directional amplifier in accordance with an example.

As illustrated in FIG. 34, a repeater can comprise an inside antenna 3402 and an outside antenna 3404. The inside antenna can be coupled to a diplexer or duplexer 3412. The outside antenna can be coupled to a diplexer or duplexer 3414. A first path can comprise a low noise amplifier (LNA) 3422, a variable attenuator 3424, a filter 3426, and a power amplifier (PA) 3428. The LNA 3422 can amplify a low power signal with minimal degradation of the signal to noise ratio of the low power signal. A PA 3428 can adjust and amplify the power level of the low power signal by a desired amount. A second path can comprise an LNA 3432, a variable attenuator 3434, a filter 3436, and a PA 3438. The first path can be a downlink amplification path or an uplink amplification path. The second path can be a downlink amplification path or an uplink amplification path. The repeater 3400 can also comprise a controller 3410. In one example, the controller 3410 can include one or more processors and memory.

Figure 35:
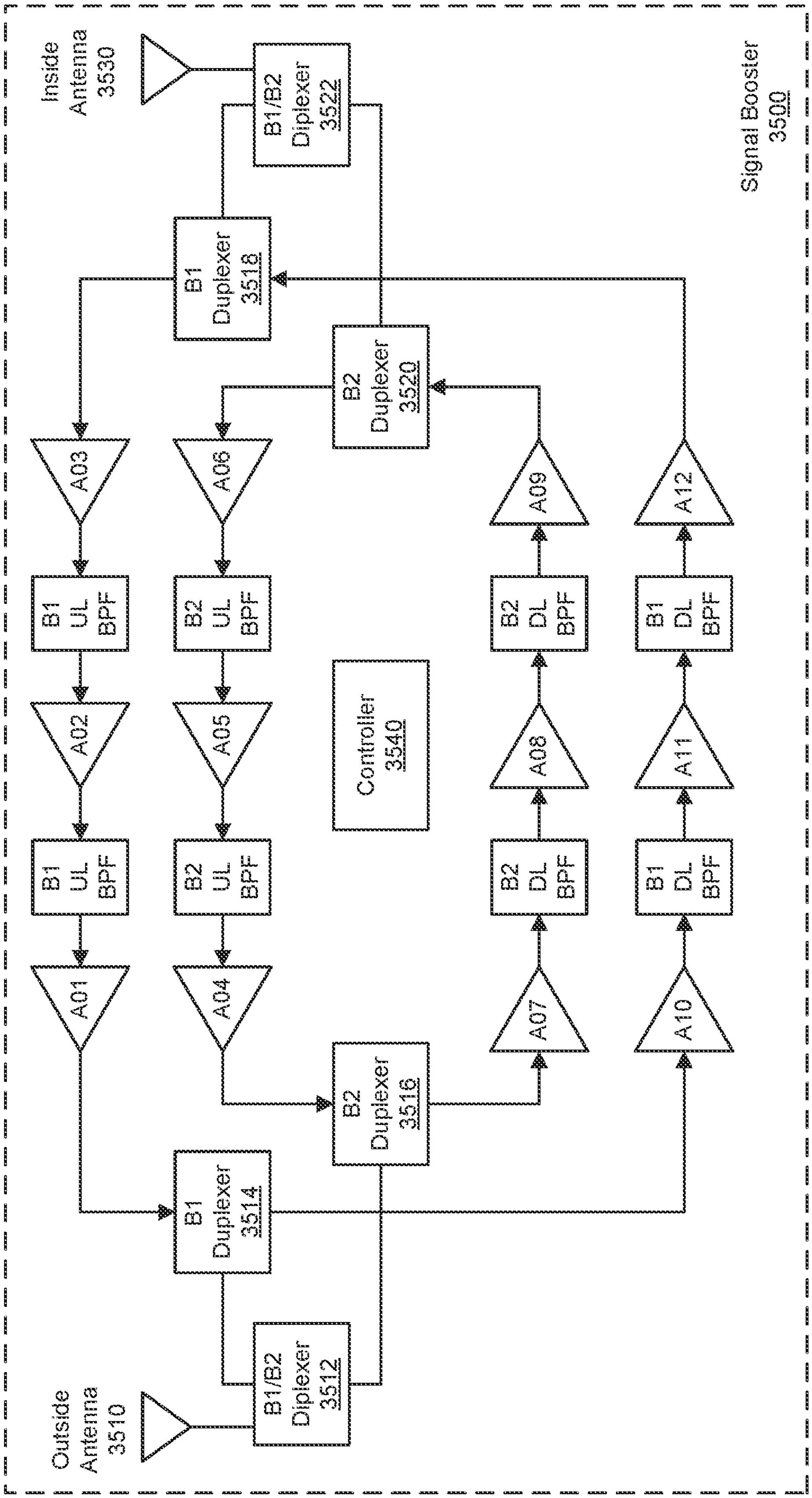
FIG. 35 illustrates a multi-band bi-directional amplifier in accordance with an example.

As illustrated in FIG. 35, in another example, a repeater can be a multiband bi-directional wireless signal booster 3500 configured to amplify an uplink signal and a downlink signal in multiple bands using a separate signal path for each uplink frequency band and downlink frequency band. In one embodiment, adjacent bands can be included on a same signal path.

An outside antenna 3510, or an integrated node antenna, can receive a downlink signal. For example, the downlink signal can be received from a base station. The downlink signal can be provided to a first B1/B2 diplexer 3512, wherein B1 represents a first frequency band and B2 represents a second frequency band. The first B1/B2 diplexer 3512 can direct selected portions of a received signal to a B1 downlink signal path and a B2 downlink signal path. Therefore, a downlink signal that is associated with B1 can travel along the B1 downlink signal path to a first B1 duplexer 3514. A portion of the received signal that is within the B2 band can travel along the B2 downlink signal path to a first B2 duplexer 3516. After passing the first B1 duplexer 3514, the downlink signal can travel through a series of amplifiers (e.g. A10, A11, and A12) and downlink bandpass filters (BPF) to a second B1 duplexer 3518. In addition, the B2 downlink signal passing through the B2 duplexer 3516, can travel through a series of amplifiers (e.g. A07, A08, and A09) and downlink band pass filters (BPF) to a second B2 duplexer 3520. At this point, the downlink signals (B1 or B2) have been amplified and filtered in accordance with the type of amplifiers and BPFs included in the multiband bi-directional wireless signal booster 3500. The downlink signals from the second B1 duplexer 3518 or the second B2 duplexer 3520, respectively, can be provided to a second B1/B2 diplexer 3522. The second B1/B2 diplexer 3522 can direct the B1/B2 amplified downlink signal to an inside antenna 3530, or an integrated device antenna. The inside antenna 3530 can communicate the amplified downlink signal to a wireless device, such as a UE.

In another example, the inside antenna 3530 can receive an uplink (UL) signal from a wireless device. The uplink signal can include a Band 1 signal and a Band 2 signal. The uplink signal can be provided to the second B1/B2 diplexer 3522. The second B1/B2 diplexer 3522 can direct the signals, based on their frequency, to a B1 uplink signal path and a B2 uplink signal path. Therefore, an uplink signal that is associated with B1 can travel along the B1 uplink signal path to a second B1 duplexer 3518, and an uplink signal that is associated with B2 can travel along the B2 uplink signal path to a second B2 duplexer 3520. The second B1 duplexer 3518 can direct the B1 uplink signal to travel through a series of amplifiers (e.g. A01, A02, and A03) and uplink bandpass filters (BPF) to the first B1 duplexer 3514. In addition, the second B2 duplexer 3520 can direct the B2 uplink signal to travel through a series of amplifiers (e.g. A04, A05, and A06) and downlink band pass filters (BPF) to the first B2 duplexer 3516. At this point, the uplink signals (B1 and B2) have been amplified and filtered in accordance with the type of amplifiers and BPFs included in the bi-directional wireless signal booster 3500. The uplink signals from the first B1 duplexer 3514 and the first B2 duplexer 3516, respectively, can be provided to the first B1/B2 diplexer 3512. The first B1/B2 diplexer 3512 can direct the B1 and B2 amplified uplink signals to the outside antenna 3510, or an integrated device antenna. The outside antenna 3510 can communicate the amplified uplink signals to a base station. The signal booster 3500 can also comprise a controller 3410. In one example, the controller 3540 can include one or more processors and memory.

Figure 36:
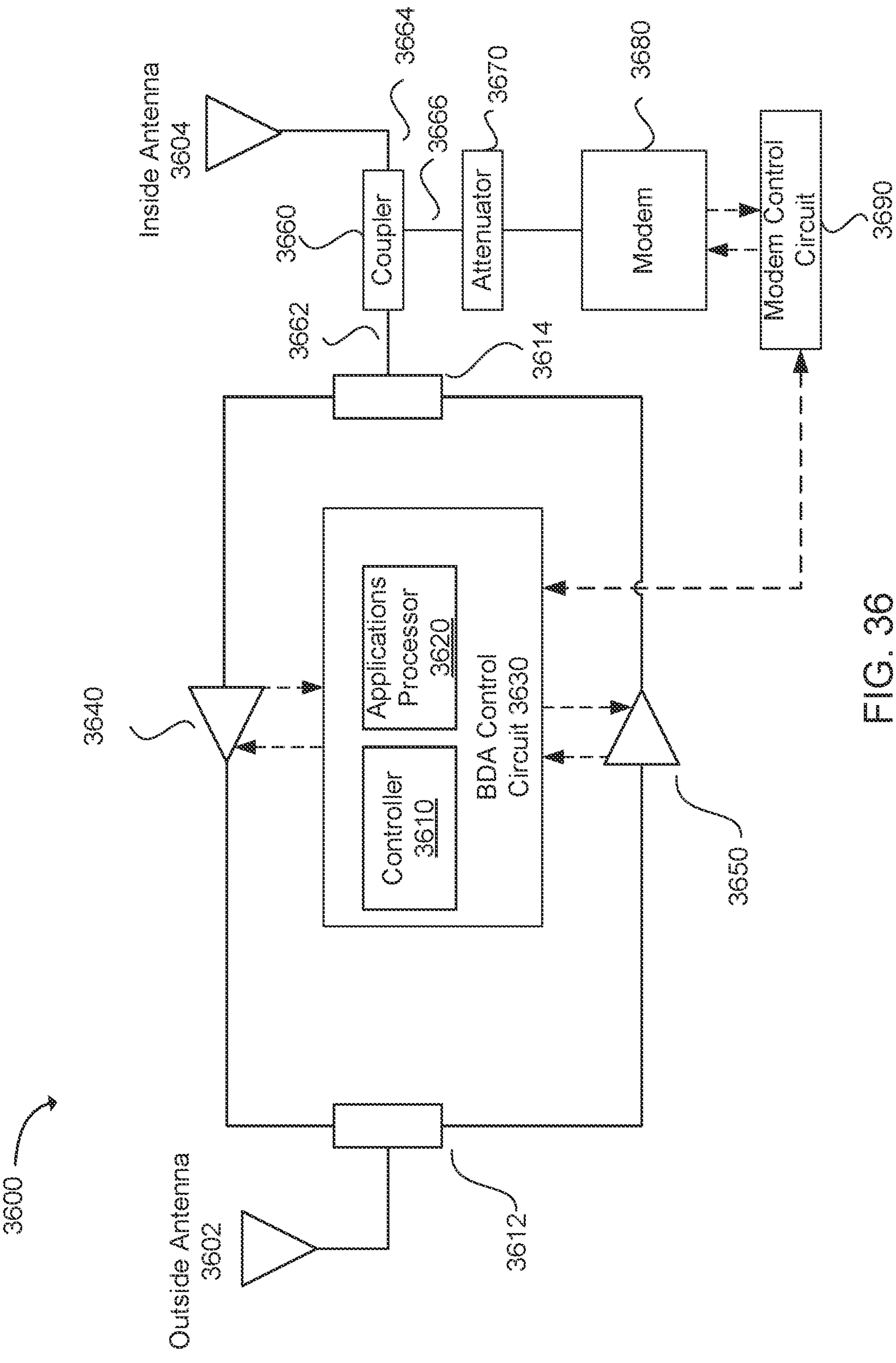
FIG. 36 illustrates a bi-directional amplifier remote monitoring system in accordance with an example.

As illustrated in FIG. 36, in another example, a bi-directional amplifier remote monitoring system can comprise an inside antenna 3604 and an outside antenna 3602. The inside antenna 3604 can be coupled to a diplexer or duplexer or multiplexer 3614. The outside antenna can be coupled to a diplexer or duplexer or multiplexer 3612. The solid lines in FIG. 36 are signal lines and the dashed lines in FIG. 36 are sensing and control lines.

In another example, a first amplification path 3650 can comprise a low noise amplifier (LNA), a variable attenuator, a bandpass filter, and a power amplifier (PA). The LNA can amplify a low power signal while minimally degrading the signal to noise ratio. A PA can adjust and amplify the power level by a desired amount. A second amplification path 3640 can comprise an LNA, a variable attenuator, a bandpass filter, and a PA. The first path can be a downlink amplification path or an uplink amplification path. The second path can be a downlink amplification path or an uplink amplification path.

In another example, the bi-directional amplifier remote monitoring system can also comprise a bi-directional amplifier (BDA) control circuit 3630. The BDA control circuit can comprise a controller 3610 and an applications processor 3620. The controller 3610 can comprise one or more processors and memory. The applications processor 3620 can be configured to provide monitoring information via a wireless modem or an Ethernet interface for wired monitoring. The monitoring information can include, but is not limited to: baseband data packets, firmware version information (e.g. application processor, booster RF processor, modem), booster identification information (e.g. serial number or model number), user configuration information (e.g. network preference), heartbeat information (e.g. a signal sent periodically, such as every 1, 5, or 15 minutes, or another desired periodicity), a radio frequency (RF) status, path status information (e.g. information regarding full gain, automatic gain control (AGC), oscillation, or shutdown), path output power, downlink path received signal strength indicator (RSSI), band oscillation count, uptime (i.e. time since booster powered on), oscillation status, alerts, power reset information, oscillation detected information, RF band shutdown detected information, hardware error detected information, AGC active information, remote configuration change information, local configuration change information, button press information, or other desired monitoring information. The BDA control circuit 3630 can be electrically connected to send and receive sensing and control information on the downlink amplification path or the uplink amplification path.

In another example, the bi-directional amplifier remote monitoring system can also comprise a modem 3680. The modem can be a wireless modem and can be configured to communicate via wireless local area networks (W-LANs), such as Wi-Fi or Bluetooth, and wireless wide area networks (W-WANs), such as a cellular connection. The modem can be configured to be electrically connected to the bi-directional amplifier to enable the modem to send data to the bi-directional amplifier and receive data from the bi-directional amplifier. The modem can be configured to be electrically coupled to a downlink of the bi-directional amplifier to receive LTE firmware over the air updates (FOTA) updates.

In another example, the modem 3680 can be configured to include a modem control circuit 3690. The modem control circuit 3690 can be configured to communicate sensing and control information with the BDA control circuit 3630. The BDA control circuit 3630 can be configured to communicate sensing and control information with the modem control circuit 3690.

In another example, the bi-directional amplifier remote monitoring system can also comprise a directional coupler 3660. The directional coupler 3660 can have a first port 3662, a second port 3664, and a third port 3666. The first port 3662 can be configured to be coupled to a bi-directional coupler first port. The second port 3664 can be configured to be coupled to a server antenna port or inside antenna port 3604. The third port 3666 can be configured to be coupled to the modem 3680.

In another example, the directional coupler 3660 can be configured to direct a downlink signal with a selected amount of attenuation from the bidirectional amplifier first port 3662 to the modem 3680. The downlink signal can be communicated on a downlink path of the bi-directional amplifier 3600 to the coupler 3660.

In another example, the directional coupler 3660 can be configured to direct a modem signal with a selected amount of attenuation from the modem 3680, through the coupler 3660, to the bi-directional amplifier first port 3662 for communication on an uplink path of the bi-directional amplifier. The modem signal can be communicated from the second amplification path 3640 to the applications processor 3620 and/or controller 3610 in the BDA control circuit 3630. The modem signal can be coupled with a selected amount of attenuation from the modem 3680 with an uplink signal of the bi-directional amplifier 3600 at a repeater first port 3614 for communication via an uplink path of the bi-directional amplifier 3600 for transmission to a base station. The modem signal transmitted to the base station can include the monitoring information discussed in the preceding paragraphs. The monitoring information can be received at the base station and routed to a predetermined location (i.e. a cell phone or computer). In one example, the monitoring information can be stored on a server located in a cloud computing environment. The monitoring information can then be accessed by individuals having the security rights to access the monitoring information on the server.

In another example, the directional coupler 3660 can provide a selected amount of attenuation on the path between the first port and the third port. The coupler typically allows substantially all of a signal along a certain path—such as from the multiplexer 3614 to the inside antenna 3604 to be passed with minimal loss. A very small amount of the signal can be tapped off by the coupler and sent along the path to the modem 3680. The attenuator can be used to provide additional attenuation if the signal from the coupler 3660 has more power than desired. The directional coupler 3660 can be configured to couple a downlink signal, that is received from a base station, from the repeater first port 3614 to the modem 3680. The downlink signal can be coupled with a selected amount of attenuation. The downlink signal transmitted from the base station to the modem 3680 can include the monitoring information discussed in the preceding paragraphs. The monitoring information may be sent from the server in the cloud location. The server may be the same server used to store information received on an uplink. Alternatively, the monitoring information can be sent from a different server or from a user equipment (UE) to the modem 3680 for communication to the BDA control circuit 3630.

The amount of attenuation can comprise a quantity substantially equal to 20 decibels (dB). In another example, the coupled signal can be attenuated by an amount greater than 10 dB.

In another example, an attenuator 3670 can be coupled between the third port of the directional coupler and the modem 3680 to provide a selected amount of attenuation of the modem signal or the downlink signal. The amount of attenuation can comprise a quantity substantially equal to 20 dB or an amount greater than 10 dB.

In another example, the total amount of attenuation provided by the directional coupler 3660 and the attenuator 3670 can be selected to exceed a mobile station coupling loss (MSCL), which is the path loss between the inside antenna and a user equipment (UE). The total amount of attenuation can be selected to exceed 360 dB, or another desired threshold, so that the overall attenuation from the coupler 3660 and the attenuator is greater than the MSCL. This can prevent the modem from interfering with the operation of the bi-directional amplifier. This can also prevent the total amount of attenuation from capturing the AGC and affecting the signal to the UE.

In another example, the directional coupler 3660 and/or the attenuator 3670 can be configured to reduce a maximum gain of a downlink signal output from the repeater to a selected signal level gain between the directional coupler 3660 and the wireless modem 3680 in accordance with FCC regulations or another regulatory body. The amount of gain can be determined based on the type of repeater and use of the repeater. For example, the selected signal level gain of a stationary wireless repeater can be approximately 65-72 dB, as determined by the FCC, or another regulatory body. A mobile wireless repeater in a cradle can have a gain of 23 dB as determined by the FCC, or another regulatory body. A directly connected repeater can also have a maximum gain of 15 dB, as determined by the FCC or another regulatory body.

In another example, the directional coupler 3660 can be further configured to substantially pass an uplink signal. The uplink signal can be received from the server antenna or inside antenna 3604. The uplink signal can pass from the second port of the directional coupler to the first port of the directional coupler to enable the uplink signal to be communicated through the directional coupler to the bi-directional amplifier first port with minimal loss.

In another example, various devices might be used in place of the directional coupler including a splitter, a diplexer, or a circulator. However, a splitter can introduce 3 dB of loss on the paths of the bi-directional amplifier which can degrade the uplink noise figure and reduce the downlink power amplification. A diplexer in place of a directional coupler may not function correctly either because the modem may operate in the same frequency bands as the bi-directional amplifier. A circulator may also not function as desired, because the uplink signals from the inside antenna port or server port can feed directly into the path of the modem which may cause only the reflected energy to pass into the bi-directional amplifier. The directional coupler can minimize the through path loss while allowing communication through the bi-directional amplifier. The directivity of the coupler can minimize the reflection of the signal into the server port or inside antenna port.

In another example, the bi-directional amplifier can be configured to pass signals comprising a single band on the uplink or downlink paths. Alternatively, the bi-directional amplifier can be configured to pass signals comprising multiple bands on the uplink or downlink paths.

For example, the bi-directional amplifier can be configured to pass uplink frequencies in 3GPP LTE bands 12, 13, 5, 25, and/or band 4. 3GPP LTE Band 12 uplink can include operating frequencies between 698 megahertz (MHz) and 716 MHz. 3GPP LTE Band 13 uplink can include operating frequencies between 776 MHz and 787 MHz. 3GPP LTE Band 5 uplink can include operating frequencies between 824 MHz and 849 MHz. 3GPP LTE Band 25 uplink can include operating frequencies between 1850 MHz and 1915 MHz. 3GPP LTE Band 4 uplink can include operating frequencies between 1710 MHz and 1755 MHz.

In another example, the bi-directional amplifier can be configured to pass downlink frequencies in 3GPP LTE bands 12, 13, 5, 25, or band 4. 3GPP LTE Band 12 downlink can include an operating band between 728 MHz and 746 MHz. 3GPP LTE Band 13 downlink can include an adjacent operating band between 746 MHz and 757 MHz. 3GPP LTE Band 5 downlink can include an operating band between 869 MHz and 894 MHz. 3GPP LTE Band 25 downlink can include an operating band between 11930 MHz and 1995 MHz. 3GPP LTE Band 4 downlink can include an operating band between 2110 MHz and 2155 MHz.

In another example, a bi-directional amplifier (BDA) can be integrated with remote monitoring capability. The BDA with remote monitoring capability can comprise a repeater with a first repeater port, a second repeater port, and a control circuit. The repeater can further comprise one or more uplink paths coupled between the first repeater port and the second repeater port. The repeater can further comprise one or more downlink paths coupled between the first repeater port and the second repeater port.

The BDA with remote monitoring capability can further comprise a wireless modem and a directional coupler. The directional coupler can have a first port, second port, and third port. The first port can be configured to be coupled to the first repeater port. The second port can be configured to be coupled to a server antenna port. The third port can be configured to be coupled to the wireless modem.

The directional coupler and modem can be configured to be coupled to the server antenna port because this configuration can provide adequate power from the modem to a base station. Alternatively, if the directional coupler and modem were coupled to the donor antenna port, then there might be additional loss on the donor antenna port that can degrade the sensitivity of the bi-directional amplifier. When a modem is communicatively coupled between an outdoor (donor) antenna and a multiplexer (splitter, duplexer, circulator, etc.), using a one or more of a coupler and an antenna, then 20 decibels (dB) of power may be lost from the booster to the base station. In addition, communicatively coupling a modem between an outdoor (donor) antenna and a multiplexer (splitter, duplexer, circulator, etc.) can also introduce additional loss on the donor side of the signal booster, repeater, or BDA. The coupler can add additional pass-through loss because energy can be tapped off, which can increase the downlink noise figure.

The directional coupler can be configured to direct a downlink signal from the one or more downlink paths from the first repeater port to the wireless modem. The downlink signal can be attenuated by a selected amount. The directional coupler can be configured to direct a modem signal from the wireless modem to the first repeater port for communication on one or more uplink paths of the repeater. The modem signal can be communicated from the uplink path of the repeater to the applications processor and/or controller in the BDA control circuit. The modem signal can have a selected amount of attenuation.

Figure 37:
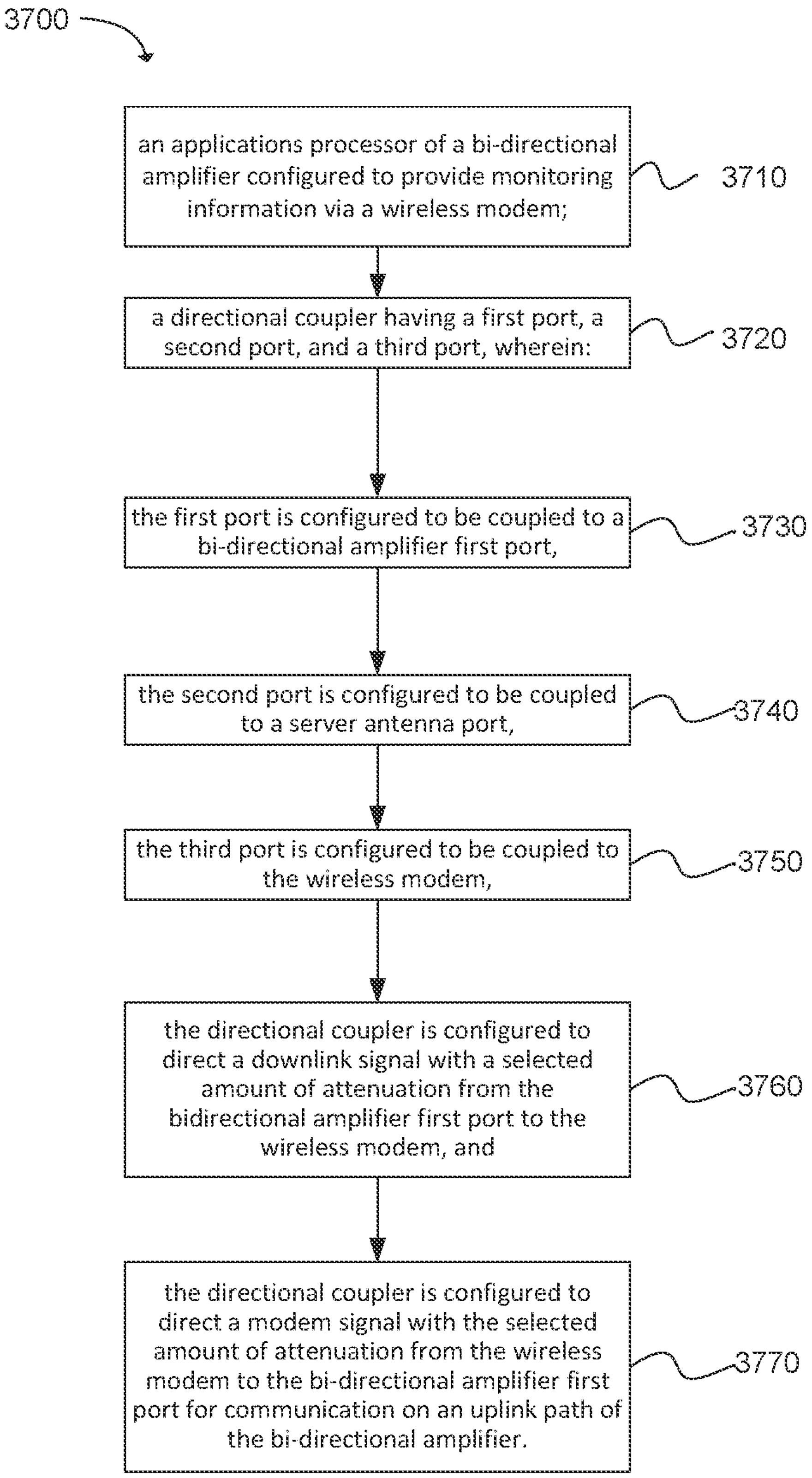
FIG. 37 depicts a bi-directional amplifier remote monitoring system in accordance with an example.

Another example provides a bi-directional amplifier remote monitoring system 3700, as shown in the flow chart in FIG. 37. The bi-directional amplifier remote monitoring system comprises an applications processor of a bi-directional amplifier configured to provide monitoring information via a wireless modem, as shown in block 3710. The bi-directional amplifier remote monitoring system further comprises a directional coupler having a first port, a second port, and a third port, as shown in block 3720. The bi-directional amplifier remote monitoring system further comprises that the first port is configured to be coupled to a bi-directional amplifier first port, as shown in block 3730. The bi-directional amplifier remote monitoring system further comprises that the second port is configured to be coupled to a server antenna port, as shown in block 3740. The bi-directional amplifier remote monitoring system further comprises that the third port is configured to be coupled to the wireless modem, as shown in block 3750. The bi-directional amplifier remote monitoring system further comprises that the directional coupler is configured to direct a downlink signal with a selected amount of attenuation from the bidirectional amplifier first port to the wireless modem, as shown in block 3760. The bi-directional amplifier remote monitoring system further comprises that the directional coupler is configured to direct a modem signal with the selected amount of attenuation from the wireless modem to the bi-directional amplifier first port for communication on an uplink path of the bi-directional amplifier, as shown in block 3770.

Figure 38:
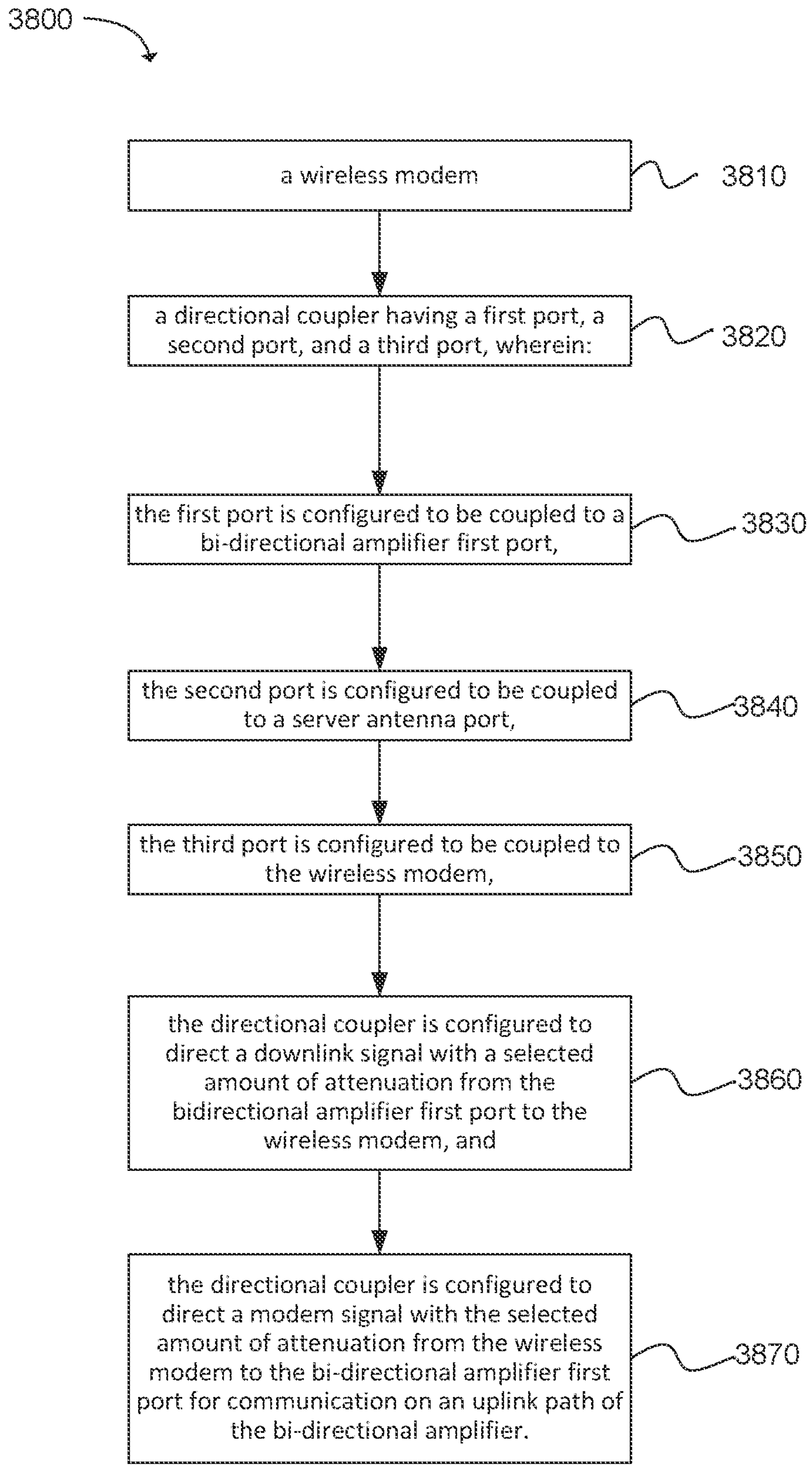
FIG. 38 depicts a bi-directional amplifier remote monitoring system in accordance with an example.

Another example provides a bi-directional amplifier remote monitoring system 3800, as shown in the flow chart in FIG. 38. The bi-directional amplifier remote monitoring system comprises a wireless modem, as shown in block 3810. The bi-directional amplifier remote monitoring system further comprises a directional coupler having a first port, a second port, and a third port, as shown in block 3820. The bi-directional amplifier remote monitoring system further comprises that the first port is configured to be coupled to a bi-directional amplifier first port, as shown in block 3830. The bi-directional amplifier remote monitoring system further comprises that the second port is configured to be coupled to a server antenna port, as shown in block 3840. The bi-directional amplifier remote monitoring system further comprises that the third port is configured to be coupled to the wireless modem, as shown in block 3850. The bi-directional amplifier remote monitoring system further comprises that the directional coupler is configured to direct a downlink signal with a selected amount of attenuation from the bidirectional amplifier first port to the wireless modem, as shown in block 3860. The bi-directional amplifier remote monitoring system further comprises that the directional coupler is configured to direct a modem signal with the selected amount of attenuation from the wireless modem to the bi-directional amplifier first port for communication on an uplink path of the bi-directional amplifier, as shown in block 3870.

Figure 39:
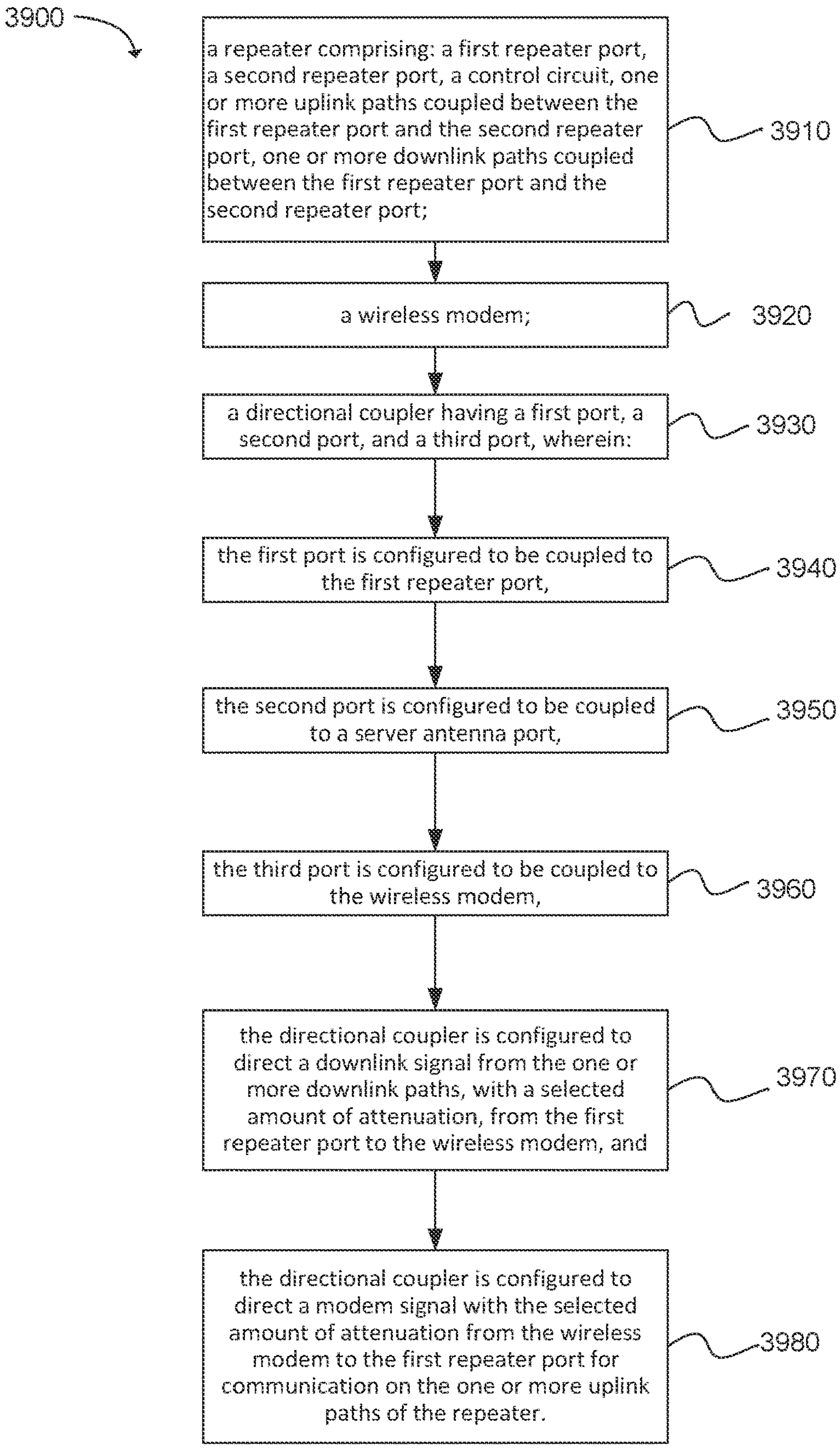
FIG. 39 depicts a bi-directional amplifier (BDA) with remote monitoring capability in accordance with an example.

Another example provides a bi-directional amplifier (BDA) with remote monitoring capability 3900, as shown in the flow chart in FIG. 39. The BDA comprises a repeater comprising: a first repeater port, a second repeater port, a control circuit, one or more uplink paths coupled between the first repeater port and the second repeater port, one or more downlink paths coupled between the first repeater port and the second repeater port, as shown in block 3910. The BDA further comprises a wireless modem, as shown in block 3920. The BDA further comprises a directional coupler having a first port, a second port, and a third port, as shown in block 3930. The BDA further comprises that the first port is configured to be coupled to the first repeater port, as shown in block 3940. The BDA further comprises that the second port is configured to be coupled to a server antenna port, as shown in block 3950. The apparatus further comprises that the third port is configured to be coupled to the wireless modem, as shown in block 3960. The BDA further comprises the directional coupler is configured to direct a downlink signal from the one or more downlink paths, with a selected amount of attenuation, from the first repeater port to the wireless modem, as shown in block 3970. The BDA further comprises the directional coupler is configured to direct a modem signal with the selected amount of attenuation from the wireless modem to the first repeater port for communication on the one or more uplink paths of the repeater, as shown in block 3980.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The low energy fixed location node, wireless device, and location server can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object-oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater comprising:

a first port;

a second port;

a first amplification and filtering path coupled between the first port and the second port, wherein the first amplification and filtering path is configured to amplify and filter a first time division duplex (TDD) signal in a first frequency range of a first TDD uplink (UL) signal or a first TDD downlink (DL) signal; and a TDD scanning sync detection module (SSDM) configured to:

determine UL/DL configuration information for the first TDD signal;

identify one or more frequency ranges associated with a plurality of cellular carriers;

scan the one or more frequency ranges;

identify cellular carrier specific information for the one or more frequency ranges associated with the plurality of cellular carriers; and provide the cellular carrier specific information to the repeater;

a controller configured to:

use the UL/DL configuration information for the first TDD signal to switch between the first TDD UL signal and the first TDD DL signal for the first amplification and filtering path, wherein the TDD SSDM is further configured to:

receive synchronization information for the first TDD signal to enable the controller to switch between the first TDD UL signal and the first TDD DL signal wherein:

the synchronization information for the first TDD signal is received from a base station transmitting the first TDD DL signal.

2. The repeater of claim 1, further comprising one or more processors and memory configured to communicate the cellular carrier specific information of the plurality of cellular carriers for display.

3. The repeater of claim 1, further comprising one or more processors and memory configured to use the cellular carrier specific information at the repeater to select one or more of a cellular band, a channel, a filter type or a filter bandwidth based on the cellular carrier specific information.

4. The repeater of claim 1, wherein the one or more frequency ranges are limited to a capability of the repeater to communicate in the one or more frequency ranges.

5. The repeater of claim 1, wherein the SSDM is further configured to scan the one or more frequency ranges of the plurality of cellular carriers without a subscriber identity module (SIM) card.

6. The repeater of claim 1, further comprising:

a first display comprising one or more of:

an integrated display, or a mobile display, or a remote display.

7. The repeater of claim 1, further comprising one or more processors and memory of the repeater that are configured to communicate the cellular-carrier specific information for transmission and storage of the cellular-carrier specific information in a private computer server in a cloud computing environment.

8. The repeater of claim 1, wherein the cellular carrier specific information for display includes one or more of:

a carrier name, one or more operating frequencies, one or more channels, a direction of a cell tower from an n-band repeater, a location of a cell tower, a time and date of a transmission, a reference signal received power (RSRP), a reference signal received quality (RSRQ), a received signal strength indicator (RSSI), an arbitrary strength unit (ASU), a reference signal (RS) signal to noise ratio (SNR) (RSSNR), an Evolved-UMTS Terrestrial Radio Access Network (E-UTRAN) cell identifier (ECI), a physical cell identifier (PCI), a tracking area code (TAC), automatic gain control (AGC) information for control of the n-band repeater, antenna steering information for control of one or more antennas associated with the n-band repeater, or antenna positioning information for control of a position of one or more antennas associated with the n-band repeater.

9. The repeater of claim 1, wherein the SSDM is comprised of one or more of:

a layer 1 modem, or a layer 2 or layer 3 modem, or a scanning receiver, or a field-programmable gate array (FPGA), or an application-specific integrated circuit (ASIC).

10. The repeater of claim 1, wherein the repeater is compatible with regulations defined for consumer signal boosters.

11. The repeater of claim 10, wherein the regulations defined for consumer signal boosters include 47 Code of Federal Regulations (C.F.R.) Part 20.21 (Apr. 18, 2018).

12. A repeater comprising:

a first port;

a second port;

a first amplification and filtering path coupled between the first port and the second port, wherein the first amplification and filtering path is configured to amplify and filter a first time division duplex (TDD) uplink (UL) signal or a first TDD downlink (DL) signal in a first frequency range;

a wireless modem configured to:

generate an UL/DL indication signal for the first frequency range;

send the UL/DL indication signal to the repeater;

identify one or more frequency ranges associated with a plurality of cellular carriers;

scan the one or more frequency ranges;

identify monitoring information for the one or more frequency ranges associated with the plurality of cellular carriers; and provide the monitoring information to the repeater; and a directional coupler having at least a first port, a second port, and a third port, wherein:

the first port of the directional coupler is configured to be coupled to the first port of the repeater;

the second port of the directional coupler is configured to be coupled to a server antenna port of the repeater; and the third port of the directional coupler is configured to be coupled to the wireless modem; and the directional coupler is configured to couple a modem signal from the wireless modem with an uplink signal at the repeater first port for communication via an uplink path of the repeater for transmission to a base station.

13. The repeater of claim 12, wherein the repeater further comprises one or more processors and memory configured to communicate the monitoring information of the plurality of cellular carriers for transmission and storage of the monitoring information in a private computer server in a cloud computing environment.

14. The repeater of claim 12, wherein the monitoring information includes one or more of:

baseband data packets, firmware version information, booster identification information, user configuration information, heartbeat information, a radio frequency (RF) status, path status information, path output power, downlink path received signal strength indicator (RSSI), band oscillation count, uptime, oscillation status, alerts, power reset information, oscillation detected information, RF band shutdown detected information, hardware error detected information, automatic gain control (AGC) active information, remote configuration change information, local configuration change information, or button press information.

15. The repeater of claim 12, wherein the directional coupler is configured to couple a downlink signal, that is received from the base station, from the repeater first port to the wireless modem, and wherein the downlink signal is coupled with a selected amount of attenuation.

16. The repeater of claim 12, wherein the wireless modem is configured to be communicatively coupled to the repeater to enable the modem to send data to the repeater and receive data from the repeater.

17. The repeater of claim 12, wherein the monitoring information is cellular carrier-specific information that includes one or more of:

a carrier name, one or more operating frequencies, one or more channels, a direction of a cell tower from an n-band repeater, a location of a cell tower, a time and date of a transmission, a reference signal received power (RSRP), a reference signal received quality (RSRQ), a received signal strength indicator (RSSI), an arbitrary strength unit (ASU), a reference signal (RS) signal to noise ratio (SNR) (RSSNR), an Evolved-UMTS Terrestrial Radio Access Network (E-UTRAN) cell identifier (ECI), a physical cell identifier (PCI), a tracking area code (TAC), automatic gain control (AGC) information for control of the n-band repeater, antenna steering information for control of one or more antennas associated with the n-band repeater, or antenna positioning information for control of a position of one or more antennas associated with the n-band repeater.

* * * * *